US008913157B2

(12) United States Patent
Osako et al.

(10) Patent No.: US 8,913,157 B2
(45) Date of Patent: Dec. 16, 2014

(54) MECHANICAL NOISE SUPPRESSION APPARATUS, MECHANICAL NOISE SUPPRESSION METHOD, PROGRAM AND IMAGING APPARATUS

(75) Inventors: Keiichi Osako, Tokyo (JP); Toshiyuki Sekiya, Kanagawa (JP); Toshiyuki Kumakura, Tokyo (JP); Mototsugu Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 222 days.

(21) Appl. No.: 13/183,531

(22) Filed: Jul. 15, 2011

(65) Prior Publication Data

US 2012/0026345 A1 Feb. 2, 2012

(30) Foreign Application Priority Data

Jul. 30, 2010 (JP) ................................ P2010-172874

(51) Int. Cl.
*H04N 5/76* (2006.01)
*H04B 15/00* (2006.01)
*G10L 21/0208* (2013.01)
*G10L 25/27* (2013.01)

(52) U.S. Cl.
CPC ............. *G10L 21/0208* (2013.01); *G10L 25/27* (2013.01)
USPC ....................................... 348/231.4; 381/94.1

(58) Field of Classification Search
USPC .............................. 381/94.1, 94.2; 348/231.3
See application file for complete search history.

(56) References Cited

U.S. PATENT DOCUMENTS

2006/0229869 A1* 10/2006 Nemer .......................... 704/226
2008/0075300 A1* 3/2008 Isaka ............................ 381/94.2
2008/0126084 A1* 5/2008 Lee et al. ...................... 704/219
2010/0211382 A1* 8/2010 Sugiyama ..................... 704/205
2011/0035123 A1* 2/2011 Katrak et al. ................... 701/55
2011/0305351 A1* 12/2011 Kimura ........................ 381/94.1
2012/0245947 A1* 9/2012 Neuendorf et al. ........... 704/500

FOREIGN PATENT DOCUMENTS

JP 2006-279185 A 10/2006

OTHER PUBLICATIONS

Steven F. Boll, "Suppression of Acoustic Noise in Speech Using Spectral Subtraction", IEEE Transactions on Acoustics, Speech, and Signal Processing, vol. ASSP-27, No. 2, Apr. 1979, pp. 113-120.

* cited by examiner

*Primary Examiner* — Sinh Tran
*Assistant Examiner* — Shabaz Nazrul
(74) *Attorney, Agent, or Firm* — Sony Corporation

(57) ABSTRACT

A mechanical noise suppression apparatus includes: a framing section adapted to divide an input signal into frames of a predetermined time length; a Fourier transform section adapted to transform framed signals obtained by the framing section into a frequency spectrum of a frequency domain; a mechanical noise reduction section adapted to correct the frequency spectrum of the input signal obtained by the Fourier transform section based on frequency spectrum information of mechanical noise to suppress the mechanical noise; an inverse Fourier transform section adapted to return the frequency spectrum corrected by the mechanical noise reduction section into framed signals of a time domain; and a frame synthesis section adapted to carry out frame synthesis of the framed signals of frames obtained by the inverse Fourier transform section to obtain an output signal in which the mechanical noise is suppressed.

18 Claims, 39 Drawing Sheets

100: SOUND SYSTEM

100: SOUND SYSTEM

EXAMPLE OF P-C TABLE

| AVERAGE POWER P | CORRECTION COEFFICIENT C |
|---|---|
| 45 | 1 |
| 55 | 1 |
| 65 | 1 |
| 67 | 0.95 |
| 68 | 0.90 |
| 70 | 0.6 |

100B: SOUND SYSTEM

IMAGE VIEW OF SPECTRAL SUBTRACTION

IMAGE VIEW OF SPECTRAL SUBTRACTION

MECHANICAL NOISE SUPPRESSION APPARATUS, MECHANICAL NOISE SUPPRESSION METHOD, PROGRAM AND IMAGING APPARATUS

CROSS-REFERENCE TO RELATED APPLICATION

The present application claims priority from Japanese Patent Application No. JP 2010-172874 filed in the Japanese Patent Office on Jul. 30, 2010, the entire content of which is incorporated herein by reference.

BACKGROUND

This disclosure relates to a mechanical noise suppression apparatus, a mechanical noise suppression method, a program and an imaging apparatus, and more particularly to a mechanical sound suppression apparatus and so forth for reducing mechanical noise such as motor noise upon optical zooming during video shooting in an imaging apparatus which includes a video shooting function with sound.

In recent years, as an imaging apparatus of a digital camera and so forth, an imaging apparatus has been proposed which includes a video shooting function with sound in addition to a camera function. An imaging apparatus of the type described has a problem in that mechanical noise such as motor noise upon optical zooming during video shooting is mixed into peripheral sound collected by a microphone, resulting in degradation of the recorded sound.

As a technique for removing noise mixed in a sound signal, a spectral subtraction method is known and disclosed, for example, in S. F. Boll, "Suppression of acoustic noise in speech using spectral subtraction," IEEE Trans. Acoustics, Speech, and Signal Process, Vol. 27, No. 2, pp. 113-120, 1979 (hereinafter referred to as Non-Patent Document 1). According to the spectral subtraction method, a spectrum within a no-sound period is estimated as a noise spectrum, and a signal obtained by multiplying the noise spectrum by a predetermined coefficient, that is, by a subtract coefficient, is subtracted from an input sound spectrum to remove a noise component.

With the method of estimating a spectrum within a no-sound period as a noise spectrum, mechanical noise generated independently of peripheral sound cannot be removed as noise as in such an imaging apparatus having a video shooting function with sound as described above. Therefore, it is proposed in Japanese Patent Laid-Open No. 2006-279185 (hereinafter referred to as Patent Document 1) to retain a frequency spectrum of mechanical noise upon optical zooming during video shooting in advance and subtract, upon zooming operation, the frequency spectrum of the mechanical noise from a spectrum of an input signal to reduce the mechanical noise.

FIG. 37 shows a configuration of a sound recording apparatus having a noise removing function disclosed in Patent Document 1. Referring to FIG. 37, a motor 21 moves a lens optical system such as a zoom lens in a direction of an optical axis. A motor driving section 21*a* is a driving mechanism for driving the motor 21 to rotate. A control section 32 receives an operation signal of a zoom key or the like included in a key inputting section 36 and outputs a motor driving controlling signal to the motor driving section 21*a*. Further, the control section 32 controls a spectrum changeover section 56 based on a driving timing of the motor 21 during video shooting with sound.

A sound inputting section 51 amplifies a sound signal Sa inputted thereto through a microphone not shown by a predetermined gain and supplies the amplified sound signal Sa to a framing section 52. In this instance, for example, if a zooming operation is carried out during video shooting with sound, then motor noise, that is, zooming noise, which is generated upon the zooming operation, is inputted to the framing section 52 together with the sound signal Sa through the sound inputting section 51. The framing section 52 divides the sound signal Sa inputted thereto from the sound inputting section 51 in a unit of a frame for a predetermined period of time. A Fourier transform section 53 Fourier transforms the sound signal Sa divided in a unit of a frame by the framing section 52 into a input sound spectrum Sb which indicates power for individual frequencies.

In a motor noise spectrum storage section 54, a motor noise spectrum Sc obtained by spectralizing motor noise which is an object of noise removal is stored as a noise spectrum. A subtract section 55 carries out a process of removing noise components based on the input sound spectrum Sb obtained by the Fourier transform section 53 and the motor noise spectrum Sc stored in the motor noise spectrum storage section 54. In particular, the subtract section 55 subtracts a signal obtained by multiplying the motor noise spectrum Sc stored in advance in the motor noise spectrum storage section 54 as a noise spectrum by a predetermined subtract coefficient $\alpha$ from the input sound spectrum Sb.

The spectrum changeover section 56 carries out changeover between the input sound spectrum Sb obtained from the Fourier transform section 53 and a sound spectrum Sd after the noise removal obtained from the subtract section 55 in response to a selection signal outputted from the control section 32 to supply the input sound spectrum Sb or the sound spectrum Sd to an inverse Fourier transform section 57. In particular, the spectrum changeover section 56 supplies, upon driving of the motor 21 such as during a zooming operation, the sound spectrum Sd after the noise removal to the inverse Fourier transform section 57 but supplies, in any other case, the input sound spectrum Sb to the inverse Fourier transform section 57.

The inverse Fourier transform section 57 inverse Fourier transforms the input sound spectrum Sb or the sound spectrum Sd after the noise removal inputted thereto through the spectrum changeover section 56 to obtain an original sound signal Se for each frame unit. A waveform synthesis section 58 synthesizes the sound signals Se for the individual frame units obtained by the inverse Fourier transform section 57 to restore a sound signal Sf which is continuous in a time series. The sound signal Sf is used as a final sound signal for recording and is recorded into a recording medium such as a memory together with video data obtained from the imaging system.

SUMMARY

The spectral subtraction method used in Patent Document 1 is described with reference to FIG. 38. An input signal x(t) is converted into a frequency spectrum X(f, $\tau$) of the frequency domain by fast Fourier transform (FFT). Here, (f, $\tau$) represents a frequency spectrum of a frame $\tau$ of the fth frequency.

Then, a subtraction process of subtracting a power spectrum |N(f, $\tau$)|2 of noise from a power spectrum |X(f, $\tau$)|2 of the input signal x(t) is carried out, and a power spectrum |Y(f, $\tau$)|2 is obtained by the subtraction process. It is to be noted that the noise spectrum N(f, $\tau$) is obtained by estimation using the input signal x(t), assumption of a model of noise in advance or the like. If a result of the subtraction exhibits a negative value, then a suitable value is substituted.

In particular, the subtraction process described is carried out in accordance with the following expression (1):

$$|Y(f,\tau)|^2 = \begin{cases} |X(f,\tau)|^2 - \alpha|N(f,\tau)|^2 & |X(f,\tau)|^2 \geq \alpha|N(f,\tau)|^2 \\ \beta|X(f,\tau)|^2 & \text{otherwise} \end{cases} \quad (1)$$

where α is a fixed coefficient set to a value, for example, between 1 and 2, and also β is a fixed coefficient set to a value, for example, between 0 to 0.1.

After the subtraction, the amplitude spectrum |Y(f, τ)| of a result of the subtraction is multiplied by a deflection angle arg{X(f, τ)} of the frequency spectrum X(f, τ) of the input signal x(t) as represented by the following expression (2) to obtain a frequency spectrum Y(f, τ) as a result of the subtraction:

$$Y(f,\tau)=arg\{X(f,\tau)\}|Y(f,\tau)| \quad (2)$$

Then, the frequency spectrum Y(f, τ) is converted into an output signal y(f) of the time domain by an inverse fast Fourier transform (IFFT).

FIGS. 39 and 40 illustrate spectral subtraction. In particular, FIG. 39 illustrates spectral subtraction in the case where a correct result is obtained. An input signal includes a target sound component and a true noise component. If an estimated noise component to be subtracted from the input signal is equal to the true noise component, then the output signal includes the correct target sound component.

On the other hand, FIG. 40 illustrates spectral subtraction in the case where an erroneous result is obtained. An input signal includes a target sound component and a true noise component. If the estimated noise component to be subtracted from the input signal has an error from the true noise component, then the output signal does not include the correct target sound component. In this instance, excessive erasure or insufficient erasure of noise occurs.

In Patent Document 1, the spectral subtraction method is used for suppression of mechanical noise as described hereinabove. However, in this Patent Document 1, an error between a true noise component included in an input signal and mechanical noise measured in advance is not taken into consideration. Therefore, excessive erasure or insufficient erasure of mechanical noise appears in the subtract section 55, and degradation of the sound quality cannot be avoided.

A large number of factors cause an error between a true noise component included in an input signal and mechanical noise measured in advance. The factors may include such as follows:

(a) Difference in machine assembly position or screw tightening force (b) Abrasion or time-dependent variation of parts by mechanical driving (c) Temperature variation (d) Variation in posture (manner or angle of holding of the camera)

(e) Motor for driving camera zooming

FIG. 41 illustrates frequency spectra of zooming noise, that is, mechanical noise, actually recorded by three imaging apparatuses with a video shooting function with sound including a set A, another set B and a further set C. As seen from FIG. 41, characteristics of the frequency spectra of zooming noise or mechanical noise are quite different from one another. Therefore, for example, if, in the set B, the subtract section 55 in Patent Document 1 carries out a subtraction process using a noise spectrum produced by the set A, then excessive erasure or insufficient erasure of mechanical noise occurs with the subtract section 55, resulting in sound quality degradation.

In this manner, mechanical noise suppression using the spectral subtraction method cannot sufficiently cope with a dispersion of mechanical noise. Here, for the convenience of description, the expression of the spectral subtraction is transformed. In particular, the foregoing description is directed to subtraction of a spectrum, that is, to a "subtraction method," a mechanism of a "multiplication type" is introduced newly.

The following expression (3) is a transformed form of the expression (2) given hereinabove wherein the right side is transformed:

$$\begin{aligned} Y(f,\tau) &= \arg\{X(f,\tau)\}|Y(f,\tau)| \\ &= \frac{X(f,\tau)}{|X(f,\tau)|}\sqrt{|X(f,\tau)|^2 - \alpha|N(f,\tau)|^2} \\ &= X(f,\tau)\sqrt{1-\alpha\frac{|N(f,\tau)|^2}{|X(f,\tau)|^2}} \\ &= X(f,\tau)\cdot G(f,\tau) \end{aligned} \quad (3)$$

From the expression (3), the frequency spectrum Y(f, t) can be represented as the product of the frequency spectrum X(f, τ) of the input signal x(t) and a gain function G(f, τ)=√(1−α)|N(f, τ)|2/|X(f, τ)|2. In other words, the spectrum subtraction of the subtraction type can be represented by that of the multiplication type.

The gain function G(f, τ)=√(1−α|N(f, τ)|2/|X(f, τ)|2) is described. |N(f, τ)|2/|X(f, τ)|2 in the gain function G(f, τ) is a ratio between the power of the noise, that is, the mechanical noise, and the power of the input signal. The value of the gain function G(f, τ) is fluctuated by the power ratio.

FIG. 42 illustrates a graph obtained by plotting the behavior of the gain function G(f, τ). In the example of FIG. 42, α=1. When |N(f, τ)|2≥|X(f, τ)|2, G(f, τ)=0.05, in other words, β=0.05. In FIG. 42, in order to facilitate understandings, the axis of abscissa indicates not |N(f, τ)|2/|X(f, τ)|2 but a dB value of |X(f, τ)|2/|N(f, τ)|2 with the denominator and the numerator exchanged for each other. In this instance, the noise decreases rightwardly but increases leftwardly conversely. The power |N(f, τ)|2 of the noise, that is, the mechanical noise, of the denominator is fixed, and consequently, the gain varies depending upon the magnitude of the power |X(f, τ)|2 of the input signal.

Also in Patent Document 1, a countermeasure against a dispersion in mechanical noise, that is, motor noise, is taken. In particular, in the case where the dispersion in mechanical noise is great, the subtract coefficient α for subtraction is set to a higher value. To vary the subtract coefficient α is equivalent to transform of the gain function G(f, τ) if it is considered in the multiplication type represented by the expression (3) given hereinabove.

FIG. 43 illustrates plotted curves of the behavior of the gain function G(f, τ) at α=1, 2 and 3. As can be recognized also from FIG. 43, as the subtract coefficient α increases, the gain function G(f, τ) generally shifts successively rightwardly. In the case where the dispersion is great and much mechanical noise or motor noise is included, since the level of |X(f, τ)|2 increases, |X(f, τ)|2/|N(f, τ)|2 is successively displaced rightwardly. As the subtract coefficient α increases, the range within which the gain is β increases. Since the mechanical noise or motor noise is suppressed by a greater amount as the gain decreases, the suppression range can be increased by increasing the subtract coefficient $\alpha$. Therefore, it is possible to cope with a case in which the dispersion is great and much mechanical noise or motor noise is included.

However, as can be seen apparently also from FIG. 43, even if the subtract coefficient $\alpha$ is varied, only it is possible to carry out control of shifting the gain function $G(f, \tau)$ leftwardly or rightwardly. In other words, even if the subtract coefficient $\alpha$ is varied, the variation form of the gain corresponding to the variation of $|X(f, \tau)|2/|N(f, \tau)|2$ indicated by a broken line framework in FIG. 44 does not vary. Therefore, the dispersion countermeasure against mechanical noise or motor noise which indicates various characteristics cannot be considered satisfactory.

Further, in mechanical noise suppression using the spectral subtraction method, for example, when $\alpha=1$, the gain function $G(f, \tau)$ indicates a sudden variation of the gain value where $|X(f, \tau)|2/|N(f, \tau)|2$ is 0 dB as indicated by a broken line ellipsis in FIG. 45. Therefore, distortion appears with the output signal and has a bad influence on the sound quality.

On the other hand, in mechanical noise suppression using the spectral subtraction method, for example, when $\alpha=1$, the gain function $G(f, \tau)$ is $\beta$ where $|X(f, \tau)|2/|N(f, \tau)|2$ is lower than 0 dB as indicated by a broken line ellipsis in FIG. 46. Therefore, the value of $|X(f, \tau)|$ which originally is low is suppressed further. Consequently, other components than the noise component are suppressed, and sound quality degradation is caused by the excessive suppression.

Further, in Patent Document 1, the subtract section 55 carries out a process of removing a noise component based on the input sound spectrum Sb obtained by the Fourier transform section 53 and the motor noise spectrum Sc stored in the motor noise spectrum storage section 54. In other words, the same motor noise spectrum Sc is always used by the subtract section 55, and information regarding sound to be recorded during video shooting such as a frequency characteristic or power is not taken into consideration. Therefore, also mechanical noise which cannot actually be perceived is suppressed, and there is a problem that desired sound is degraded inadvertently.

Therefore, it is desirable to provide a mechanical noise suppression apparatus, a mechanical noise suppression method, a program and an imaging apparatus which can implement a fixed reduction effect of mechanical noise independently of a dispersion in mechanical noise among individual apparatus by a simple configuration. Alto it is desirable to provide a mechanical noise suppression apparatus, a mechanical noise suppression method, a program and an imaging apparatus which can reduce mechanical noise while degradation of desired sound by a user is suppressed to the utmost in accordance with the surrounding environment.

According to an embodiment of the present disclosure, there is provided a mechanical noise suppression apparatus including a framing section adapted to divide an input signal into frames of a predetermined time length, a Fourier transform section adapted to transform framed signals obtained by the framing section into a frequency spectrum of a frequency domain, a mechanical noise reduction section adapted to correct the frequency spectrum of the input signal obtained by the Fourier transform section based on frequency spectrum information of mechanical noise to suppress the mechanical noise, an inverse Fourier transform section adapted to return the frequency spectrum corrected by the mechanical noise reduction section into framed signals of a time domain, and a frame synthesis section adapted to carry out frame synthesis of the framed signals of frames obtained by the inverse Fourier transform section to obtain an output signal in which the mechanical noise is suppressed. The mechanical noise reduction section includes a power ratio calculation section adapted to calculate, for each frequency, a power ratio between the frequency spectrum of the input signal and the frequency spectrum of the mechanical noise based on the frequency spectrum of the input signal obtained by the Fourier transform section and the frequency spectrum information of the mechanical noise, a gain readout section adapted to read out, for each frequency, a gain corresponding to the power ratio calculated by the power ratio calculation section from a gain function table in which set values of the gain corresponding to individual values of the power ratio are stored, and a frequency spectrum correction section adapted to multiply, for each frequency, the frequency spectrum of the input signal obtained by the Fourier transform section by the gain read out by the gain readout section to obtain a corrected frequency spectrum.

In the mechanical noise suppression apparatus, an input signal is divided into frames of a predetermined time length by the framing section, and the framed signals are transformed into a frequency spectrum of a frequency domain by the Fourier transform section. Then, the frequency spectrum of the input signal is corrected based on frequency spectrum information of mechanical noise by the mechanical sound reduction section. Then, the frequency spectrum corrected by the mechanical noise reduction section is returned into framed signals of a time domain by the inverse Fourier transform section. Then, frame synthesis of the framed signals of frames obtained by the inverse Fourier transform section is carried out by the frame synthesis section to obtain an output signal in which the mechanical noise is suppressed. For example, the mechanical noise is, in an imaging apparatus having a peripheral sound recording function, for example, mechanical noise such as motor sound which is generated in relation to a specific imaging operation such as, for example, a zooming operation.

In the mechanical noise reduction section, the frequency spectrum of the input signal is corrected based on the frequency spectrum of the mechanical noise by the power ratio calculation section, gain readout section and frequency spectrum correction section. In particular, for each frequency, a power ratio between the frequency spectrum of the input signal and the frequency spectrum of the mechanical noise is calculated based on the frequency spectrum of the input signal obtained by the Fourier transform section and the frequency spectrum information of the mechanical noise by the power ratio calculation section.

Then, for each frequency, a gain corresponding to the power ratio calculated by the power ratio calculation section is read out from the gain function table, in which set values of the gain corresponding to individual values of the power ratio are stored, by the gain readout section. Then, for each frequency, the frequency spectrum of the input signal obtained by the Fourier transform section is multiplied by the gain read out by the gain readout section to obtain a corrected frequency spectrum by the frequency spectrum correction section.

In this manner, in the mechanical noise suppression apparatus of the present disclosure, the frequency spectrum of the input signal is multiplied, for each frequency, by the gain read out from the gain function table, in which the set values of the gain corresponding to the individual values of the power ratio are stored, to correct the frequency spectrum of the input signal to suppress the mechanical noise. In this instance, the shape of the grain function to be set in the gain function table can be set freely in accordance with a dispersion of the mechanical noise. Consequently, a fixed reduction effect of the mechanical noise can be implemented by a simple and easy configuration irrespective of a dispersion of mechanical noise among individual apparatus.

The mechanical noise suppression apparatus may be configured such that each of the set values of the gain stored in the gain function table is low when the power ratio is in the proximity of 0 dB and smoothly increases as the power ratio increases from the proximity of 0 dB such that a gradient thereof does not become discontinuous. In this instance, since the value of the gain does not vary suddenly, such a situation that the output signal is distorted to degrade the sound quality can be prevented.

Further, the mechanical noise suppression apparatus may be configured such that each of the set values of the gain stored in the gain function table smoothly increases as the power ratio decreases from the proximity of 0 dB such that the gradient thereof does not become discontinuous. In this instance, since the gain is increased at a position at which the value of the frequency spectrum of the input signal is low, suppression of a component other than the mechanical noise at this position can be suppressed. Therefore, sound quality degradation by excessive suppression can be prevented.

The mechanical noise suppression apparatus may further include a spectrum information changing section adapted to change the frequency spectrum information of the mechanical noise to be used by the mechanical noise reduction section based on information regarding the input signal, which may be a frequency characteristic, power or the like of the input signal. With the mechanical noise suppression apparatus, mechanical noise can be suppressed while degradation of sound desired by a user is suppressed to the utmost in accordance with a surrounding environment.

According to another embodiment of the present disclosure, there is provided a mechanical noise suppression apparatus including a framing section adapted to divide an input signal into frames of a predetermined time length, a Fourier transform section adapted to transform framed signals obtained by the framing section into a frequency spectrum of a frequency domain, a mechanical noise reduction section adapted to correct the frequency spectrum of the input signal obtained by the Fourier transform section based on frequency spectrum information of mechanical noise to suppress the mechanical noise, a spectrum information changing section adapted to change the frequency spectrum information of the mechanical noise to be used by the mechanical noise reduction section based on information regarding the input signal, an inverse Fourier transform section adapted to return the frequency spectrum corrected by the mechanical noise reduction section into framed signals of a time domain, and a frame synthesis section adapted to carry out frame synthesis of the framed signals of frames obtained by the inverse Fourier transform section to obtain an output signal in which the mechanical noise is suppressed.

In the mechanical noise suppression apparatus, an input signal is divided into frames of a predetermined time length by the framing section, and the framed signals are transformed into a frequency spectrum of a frequency domain by the Fourier transform section. Then, the frequency spectrum of the input signal is corrected based on the frequency spectrum information of mechanical noise by the mechanical noise reduction section. Then, the frequency spectrum corrected in this manner is returned into framed signals of a time domain by the inverse Fourier transform section. Then, frame synthesis of the framed signals of frames obtained by the inverse Fourier transform section is carried out by the frame synthesis section to obtain an output signal in which the mechanical noise is suppressed. For example, the mechanical noise is, in an imaging apparatus having a peripheral sound recording function, for example, mechanical noise such as motor sound which is generated in relation to a specific imaging operation such as, for example, a zooming operation.

In the mechanical noise suppression apparatus, the frequency spectrum information of the mechanical noise to be used by the mechanical noise reduction section is changed based on information regarding the input signal such as a frequency characteristic, power and so forth by the spectrum information changing section. For example, the spectrum information changing section is configured such that it corrects the frequency spectrum information of the mechanical noise stored in a noise table based on the information regarding the input signal to change the frequency spectrum information of the mechanical noise to be used by the mechanical noise reduction section.

The mechanical noise suppression apparatus may be configured such that the spectrum information changing section calculates a parameter representative of a characteristic amount of peripheral sound based on the information regarding the input signal, acquires a correction coefficient based on the calculated parameter, and multiplies the frequency spectrum information of the mechanical noise stored in the noise table by the acquired correction coefficient to correct the frequency spectrum information of the mechanical noise.

In this instance, the mechanical noise suppression apparatus may be configured such that the parameter representative of the characteristic amount is a linear predictive coefficient representative of a spectrum envelope of the frequency spectrum of the input signal, and the spectrum information changing section acquires, based on the linear predictive coefficient representative of the spectrum envelope, a correction coefficient for each frequency such that the value thereof decreases in a corresponding relationship to a mountain portion of the spectrum envelope and multiplies, for each frequency, the frequency spectrum information of the mechanical noise by the acquired correction coefficient to correct the frequency spectrum information of the mechanical noise.

Or, the mechanical noise suppression apparatus may be configured such that the characteristic amount parameter is an average power of the input signal, and the spectrum information changing section acquires, based on the average power of the input signal, a correction coefficient common to different frequencies such that the value thereof is low when the average power is high and multiplies the frequency spectrum information of the mechanical noise for each frequency by the acquired correction coefficient to correct the frequency spectrum information of the mechanical noise.

The mechanical noise suppression apparatus may further include a plurality of noise tables which store the frequency spectrum information of the mechanical noise which is used in a case in which the average power of the input signal is different from each other, and the spectrum information changing section may change over the noise table from which the frequency spectrum information of the mechanical noise is to be read out based on the average power of the input signal to change the frequency spectrum information of the mechanical noise to be used by the mechanical sound reduction section.

In this manner, in the mechanical noise suppression apparatus, the frequency spectrum information of mechanical noise to be used in the mechanical noise reduction section is changed based on the information regarding the input signal such as a frequency characteristic, power and so forth. Therefore, excessive suppression of suppressing also mechanical noise which is not actually perceived can be prevented from being carried out, and degradation of desired sound by excessive suppression can be prevented. In other words, mechanical noise can be reduced while degradation of desired sound of the user is suppressed to the utmost in response to a surrounding environment.

With the mechanical noise suppression apparatus of the present disclosure, a fixed noise reduction effect can be implemented with a simple configuration irrespective of a dispersion of mechanical noise among individual apparatus. Further, with the mechanical noise suppression apparatus, mechanical noise can be suppressed while degradation of sound desired by a user is suppressed to the upmost in accordance with a circumferential environment.

The above and other features and advantages of the present disclosure will become apparent from the following description and the appended claims, taken in conjunction with the accompanying drawings in which like parts or elements denoted by like reference symbols.

DETAILED DESCRIPTION OF THE PREFERRED EMBODIMENTS

In the following, embodiments of the present disclosure are described. The description is given in the following order.

1. First Embodiment
2. Second Embodiment
3. Third Embodiment
4. Modification

<1. First Embodiment>

Figure 1:
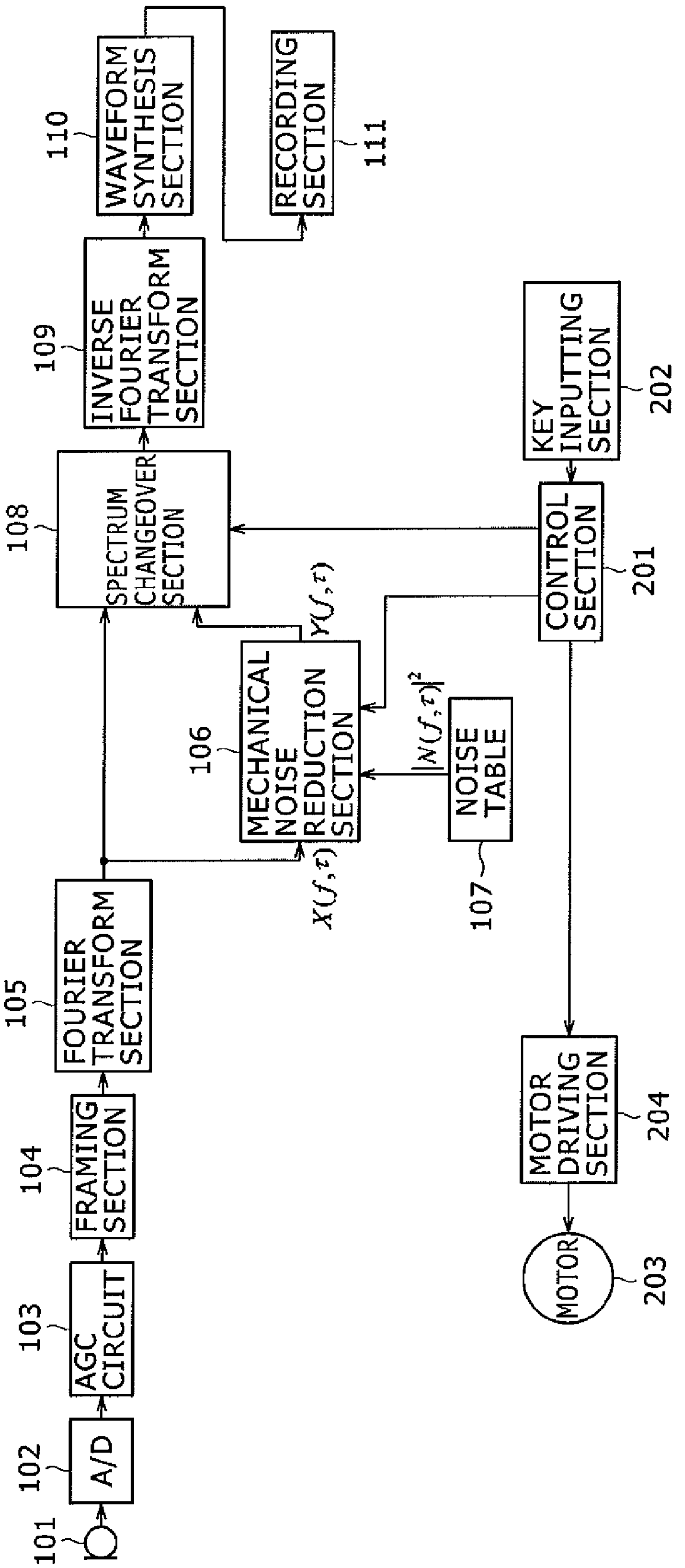
FIG. 1 is a block diagram showing an example of a configuration of a sound system of an imaging apparatus including a video shooting function with sound according to a first embodiment of the present disclosure.

Sound System of an Imaging Apparatus Including a Video Shooting Function with Sound FIG. 1 shows an example of a configuration of a sound system 100 of an imaging apparatus including a video shooting function with sound according to a first embodiment of the disclosure. Referring to FIG. 1, the sound system 100 shown includes a microphone 101, an A/D converter 102, an AGC (Automatic Gain Control) circuit 103, a framing section 104, and a Fourier transform section 105. The sound system 100 further includes a mechanical noise reduction section 106, a noise table 107, a spectrum changeover section 108, an inverse Fourier transform section 109, a waveform synthesis section 110, and a recording section 111.

Operation of the sound system 100 is controlled by a control section 201 which controls operation of the components of the imaging apparatus. A key inputting section 202 is connected to the control section 201. The key inputting section 202 includes a plurality of keys disposed thereon for allowing a user to carry out various operations of the imaging apparatus. A motor 203 is provided to move a zoom lens in the direction of an optical axis of the latter. A motor driving section 204 is a driving mechanism for driving the motor 203 to rotate. The control section 201 receives an operation signal of a zoom key included in the key inputting section 202 and outputs a motor driving controlling signal to the motor driving section 204. Further, the control section 201 controls, during video shooting with sound, the spectrum changeover section 108 based on a driving timing of the motor 203.

The microphone 101 which is an internal microphone is built in the imaging apparatus and collects peripheral sound or environmental sound to obtain a sound signal. Upon video shooting, a sound signal obtained by the microphone 101 is recorded together with an image signal. The A/D converter 102 converts a sound signal obtained by the microphone 101 from an analog signal into a digital signal. The AGC circuit 103 amplifies the sound signal after conversion into a digital signal by the A/D converter 102 with a gain in response to a level of the same.

The framing section 104 divides a sound signal obtained from the AGC circuit 103 into frames of a predetermined time length, that is, carries out framing of the sound signal, in order to carry out processing for each frame. The Fourier transform section 105 carries out a fast Fourier transform (FFT) process for the framed signals obtained by the framing section 104 to convert the framed signals into a frequency spectrum $X(f, \tau)$ of the frequency domain. Here, $(f, \tau)$ represents a frequency spectrum of a frame $\tau$ of the fth frequency.

The noise table 107 stores therein frequency spectrum information of mechanical noise collected and recorded in advance. The frequency spectrum information of the mechanical noise is that of motor driving sound corresponding to the motor 203. In the present embodiment, the frequency spectrum information is a power spectrum $|N(f, \tau)|2$. However, it may otherwise be an amplitude spectrum $|N(f, \tau)|$ or a frequency spectrum $N(f, \tau)$. It is to be noted that the driving sound generated by the motor 203 differs between zooming operations in the telephoto direction and the wide-angle direction. Therefore, values of frequency spectrum information of mechanical noise corresponding to zooming operations in the telephoto direction and the wide-angle direction are recorded in the noise table 107.

The mechanical noise reduction section 106 corrects the frequency spectrum $X(f, \tau)$ obtained by the Fourier transform section 105 based on the frequency spectrum information $|X(f, \tau)|2$ of mechanical noise stored in the noise table 107 to suppress the mechanical noise. This mechanical noise reduction section 106 acquires the corrected frequency spectrum $Y(f, \tau)$ by multiplying the frequency spectrum $X(f, \tau)$ by the gain function $G(f, \tau)$ as represented by the following expression (4):

$$Y(f,\tau)=X(f,\tau)\cdot G(f,\tau) \quad (4)$$

In this instance, the mechanical noise reduction section 106 carries out a mechanical noise reduction process based on zoom controlling information, that is, presence or absence of zooming and the zooming direction, from the control section 201. The mechanical noise reduction section 106 carries out a mechanical noise reduction process upon zooming operation, that is, upon driving of the motor 203. Further, the mechanical noise reduction section 106 reads out, upon zooming operation in the telephoto direction and the wide-angle direction, the frequency spectrum information $|N(f, \tau)|2$ of mechanical noise corresponding to the directions from the noise table 107.

Figure 2:
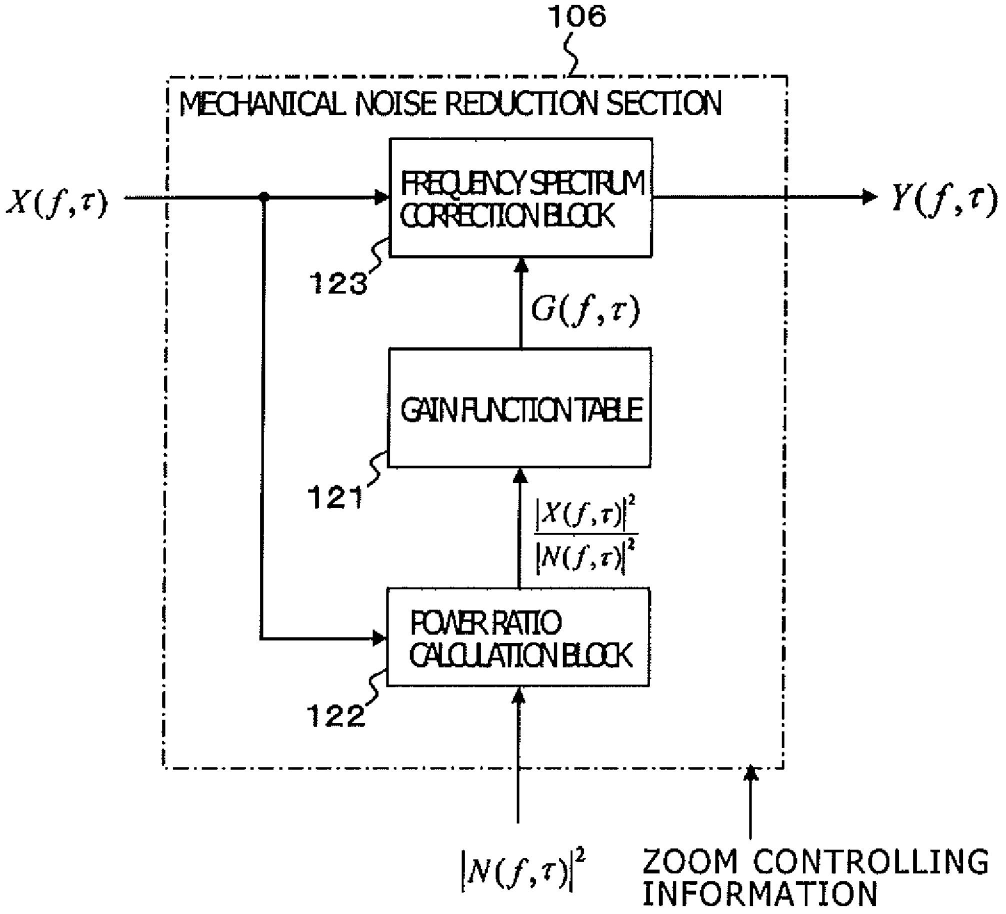
FIG. 2 is a block diagram showing an example of a mechanical noise reduction section of the sound system.

FIG. 2 shows an example of a configuration of the mechanical noise reduction section 106. Referring to FIG. 2, the mechanical noise reduction section 106 includes a gain function table 121, a power ratio calculation block 122, and a frequency spectrum correction block 123.

The gain function table 121 stores therein a gain function $G(f, \tau)$ set in advance (refer to the expression (4) given hereinabove). In particular, in the gain function table 121, set values of the gain corresponding to different values of the ratio between the power |X(f, τ)|2 of an input signal and the power |N(f, τ)|2 of the mechanical noise are stored.

Figure 3:
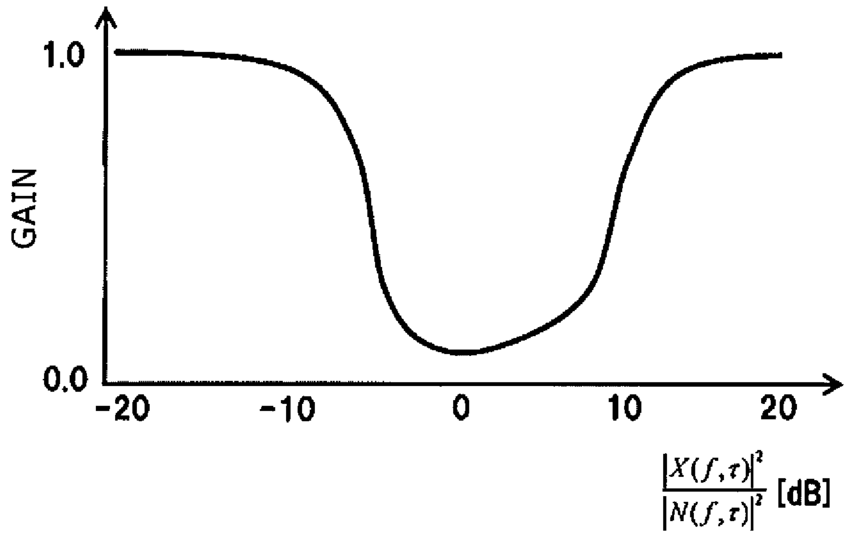
FIG. 3 is a diagrammatic view illustrating an example of a gain function stored in a gain function table of the mechanical noise reduction section.
Figure 42:
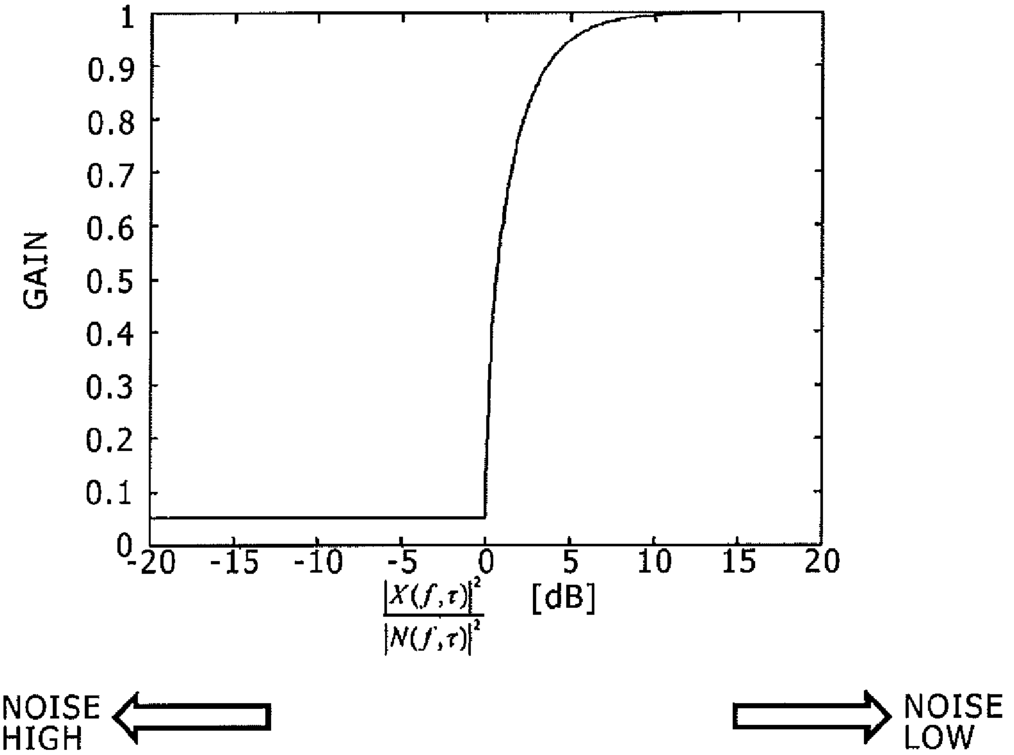
FIG. 42 is a diagram illustrating a graph obtained by plotting of the behavior of the gain function in the case where the spectrum subtraction of the subtraction type is represented by that of the multiplication type.
Figure 43:
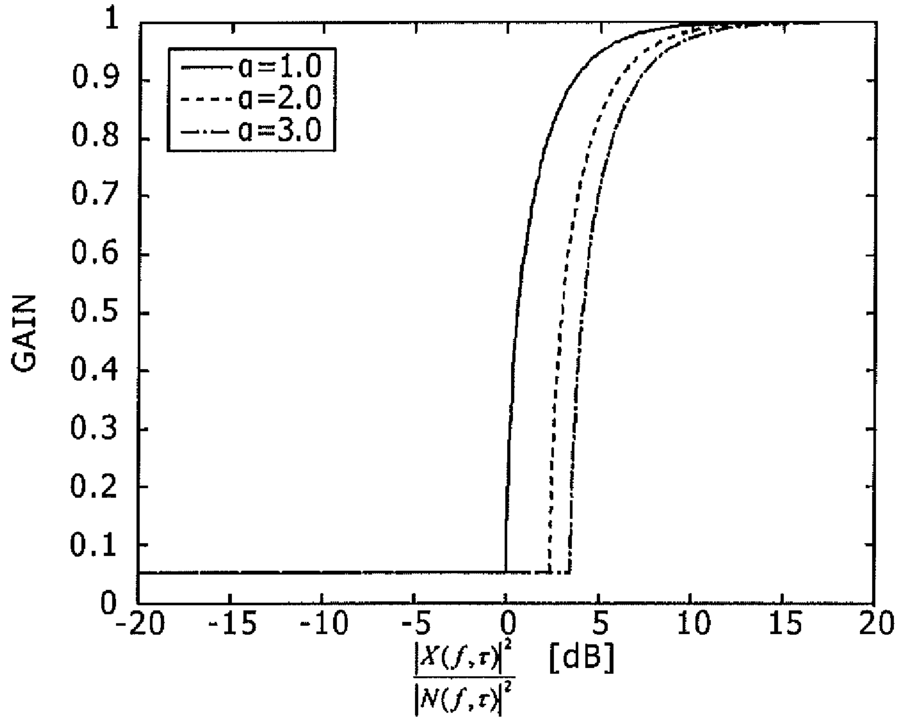
FIG. 43 is a diagram illustrating graphs obtained by plotting of the behavior of the gain function in the case where the subtract coefficient is 1, 2 and 3.
Figure 44:
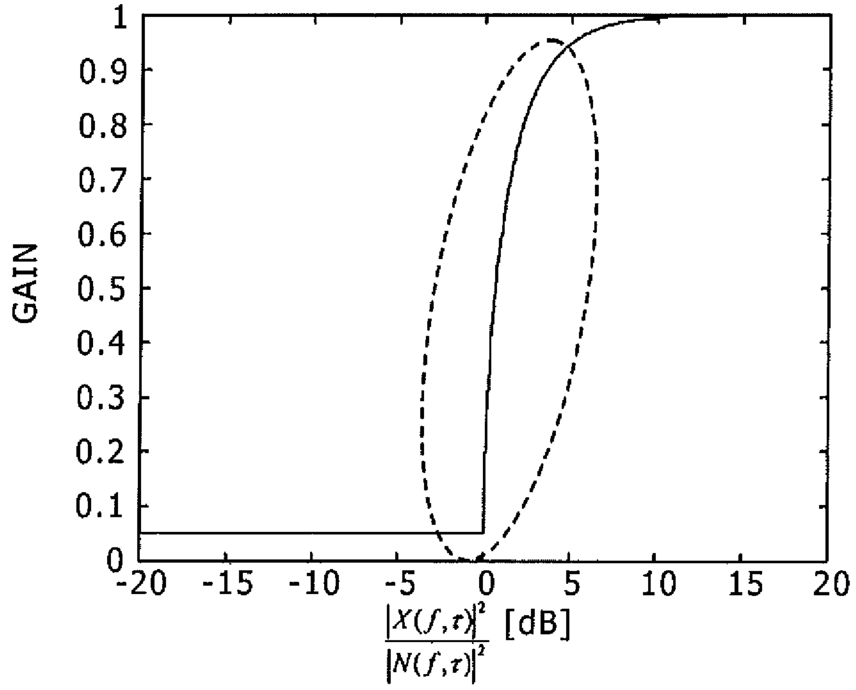
FIG. 44 is a diagram illustrating a disadvantage caused by a fact that, even if the subtract coefficient is varied, the variation form of the gain corresponding to a variety of the power ratio does not vary.
Figure 45:
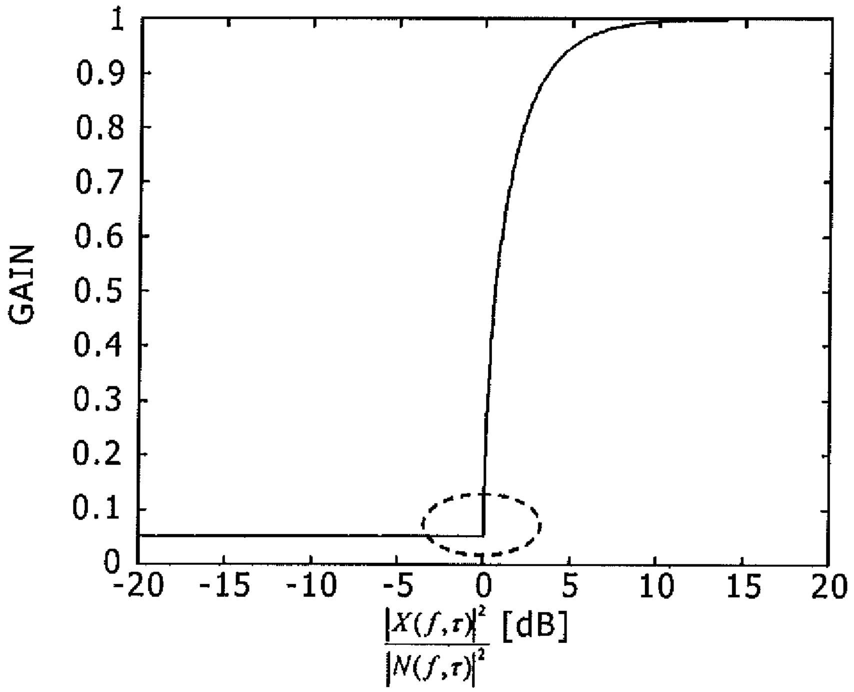
FIG. 45 is diagram illustrating a disadvantage caused by a fact that, upon mechanical noise suppression using the spectral subtraction method, the value of the gain varies suddenly at the power ratio of 0 dB.
Figure 46:
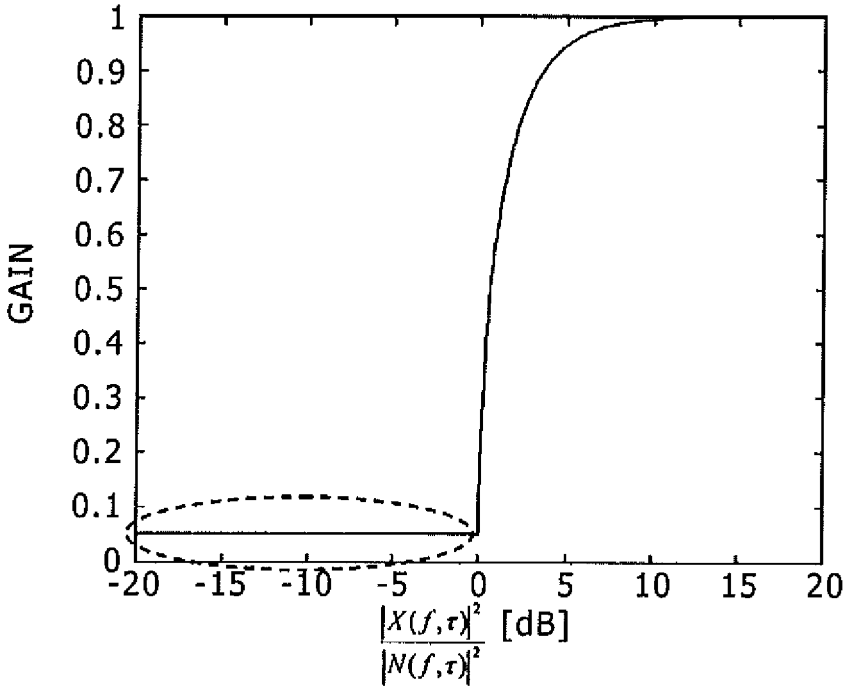
FIG. 46 is a diagram illustrating a disadvantage caused by a fact that, upon mechanical noise suppression using the spectral subtraction method, the gain is fixed where the power ratio is lower than 0 dB.

The gain function G(f, τ) stored in the gain function table 121 is set freely in an arbitrary form so that an output of good sound quality is obtained taking a dispersion of mechanical noise into consideration, different from the gain function G(f, τ) (refer to FIG. 42) represented by the expression (3) described hereinabove. FIG. 3 illustrates an example of the gain function G(f, τ) stored in the gain function table 121. In FIG. 3, the axis of abscissa indicates the dB value of the power ratio |X(f, τ)|2/|N(f, τ)|2, and the axis of ordinate indicates the gain.

The dispersion of mechanical noise has an influence on the magnitude of the frequency spectrum X(f, τ) of the input signal. Therefore, a form of the gain function G(f, τ) is important. Since the dispersion of mechanical noise exhibits various characteristics, by setting a gain function G(f, τ) suitable for each characteristic, an output of high quality can be obtained. Although, with the gain function G(f, τ) represented by the expression (3) given hereinabove, only leftward or rightward shifting can be carried out by change of the subtract coefficient α, the gain function G(f, τ) stored in the gain function table 121 can be set freely in an arbitrary form.

Figure 4:
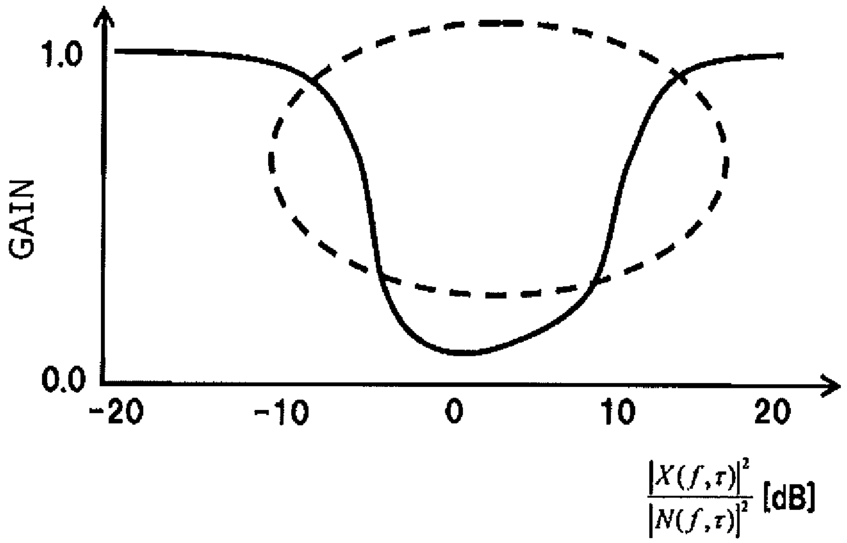
FIG. 4 is a diagrammatic view illustrating that the width of a dropping portion of the gain in the proximity of 0 dB varies in response to a dispersion of mechanical noise.

In the example of the gain function G(f, τ) of FIG. 3, the power ratio |X(f, τ)|2/|N(f, τ)|2 generally has a curved line shape whose gain drops in the proximity of 0 dB. In this instance, the place surrounded by a broken line ellipsis in FIG. 4 is changed in response to the dispersion of mechanical noise. In particular, where the dispersion is great, the width is increased, but where the dispersion is small, the width is decreased.

A setting method of the gain function G(f, τ) stored in the gain function table 121 is described. For example, the following two methods are available.

(1) In the first setting method, the designer audibly tunes the gain function G(f, τ). With this setting method, although time and labor are required for setting, a gain function G(f, τ) of high quality with a dispersion taken into consideration can be determined.

(2) In the second setting method, mechanical noise is measured with regard to a large number of apparatus in advance, and the gain function G(f, τ) is based on a dispersion in characteristic, that is, based on a variance of a spectrum. In the present setting method, the gain function G(f, τ) based on data can be determined.

Figure 5A:
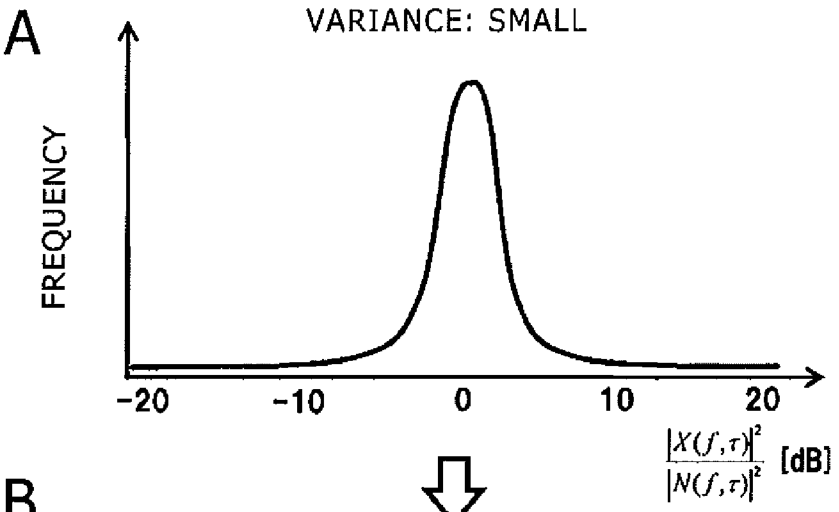
FIGS. 5A, 5B and 6A, 6B are diagrammatic views illustrating different setting methods of measuring mechanical noise of a large number of imaging apparatus in advance and setting the gain function stored in the gain function table based on a dispersion of a characteristic, that is, a variance of a spectrum among the imaging apparatus.
Figure 5B:
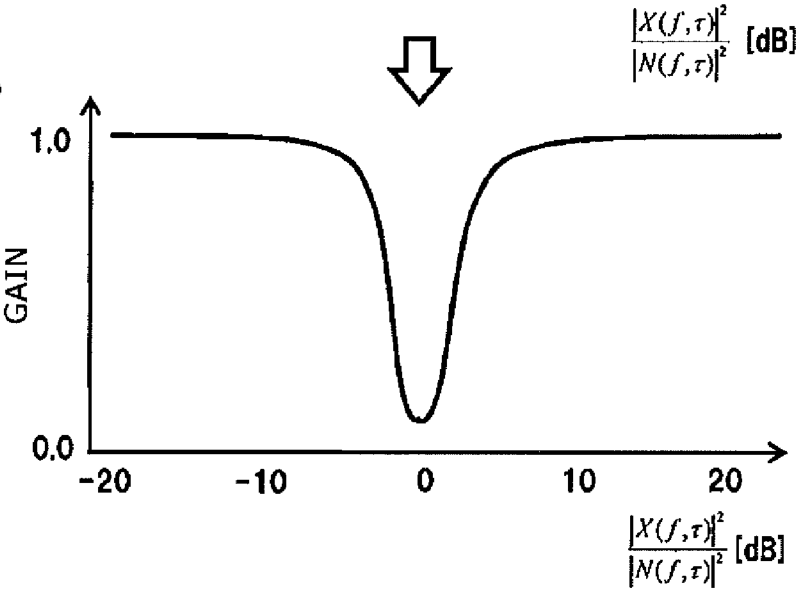
Figure 6A:
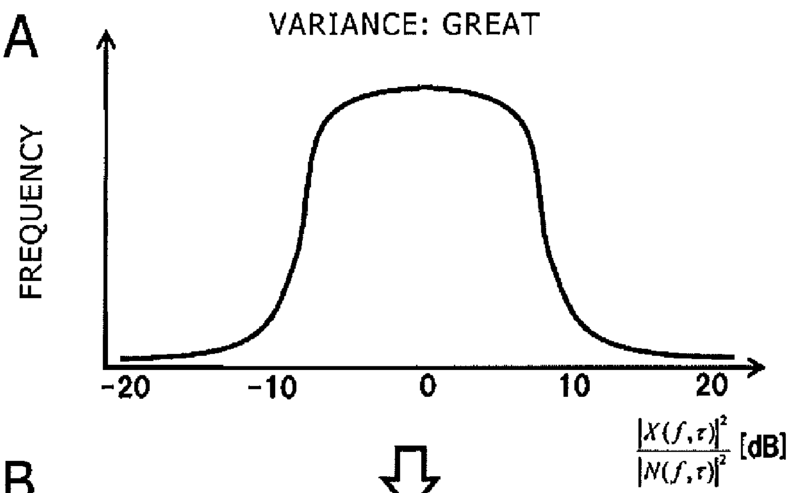
Figure 6B:
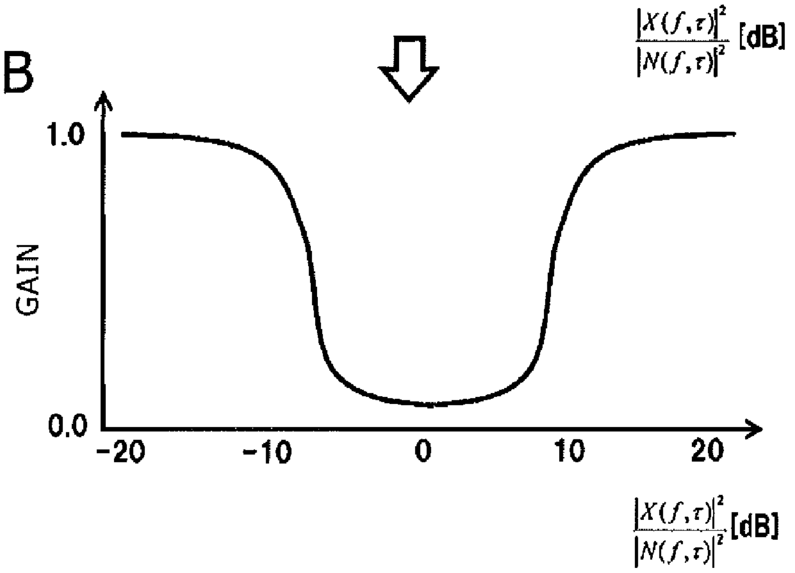

In the setting method of (2), for example, a variance of |X(f, τ)|2/|N(f, τ)|2, and a facies of the variance is inversed to obtain the gain function G(f, τ). FIG. 5A illustrates a setting method in the case where the variance of |X(f, τ)|2/|N(f, τ)|2 is small, that is, the dispersion is small. In this instance, the gain G(f, τ) is set in such a manner as illustrated in FIG. 5B, and the width of a valley portion is small. On the other hand, FIG. 6A illustrates a setting method in the case where the variance of |X(f, τ)|2/|N(f, τ)|2 is great, that is, the dispersion is large. In this instance, the gain G(f, τ) is set in such a manner as illustrated in FIG. 6B, and the width of a valley portion is large.

Figure 7:
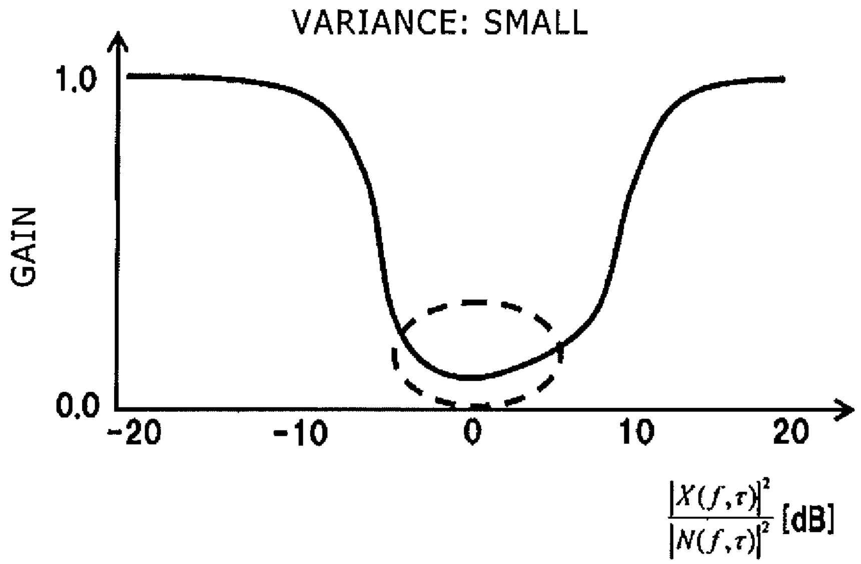
FIG. 7 is a diagrammatic view illustrating that the gain variation of the gain function stored in the gain function table is moderated around 0 dB of the power ratio.

In the example of the gain function of FIG. 3, different from the gain function G(f, τ) represented by the expression (3) given hereinabove (refer to FIG. 42), the variation of the gain is moderated around 0 dB of the power ratio |X(f, τ)|2/|N(f, τ)|2 as indicated by a broken line ellipsis in FIG. 7. In this instance, the set value of the gain smoothly increases such that the gradient may not be discontinuous as the power ratio increases from the proximity of 0 dB. By setting the gain function G(f, τ) in this manner, such a situation that the value of the gain varies suddenly in response to a variation of the power ratio |X(f, τ)|2/|N(f, τ)|2 does not occur, and the output signal is prevented from being distorted to degrade the sound quality.

Figure 8:
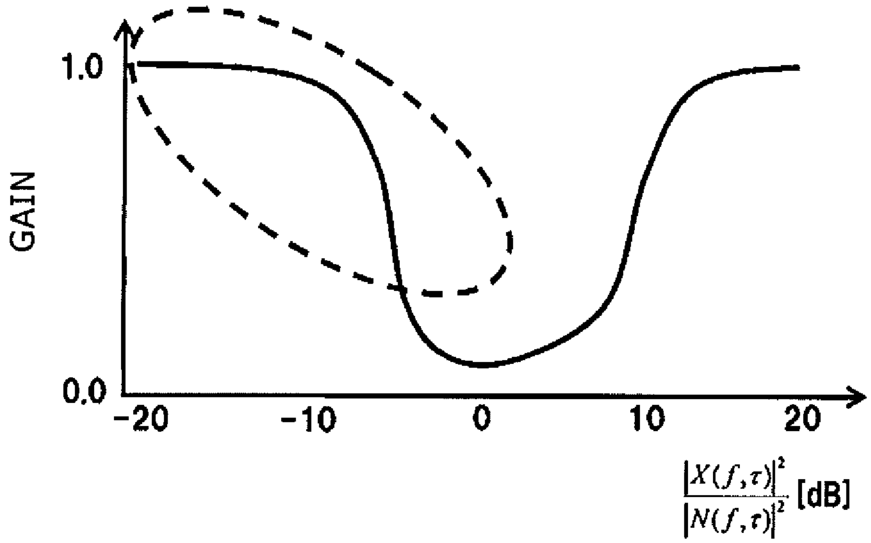
FIG. 8 is a diagrammatic view illustrating that the gain of the gain function stored in the gain function table increases smoothly as the power ratio decreases from around 0 dB.

Further, in the example of the gain function of FIG. 3, the gain smoothly increases as the power ratio |X(f, τ)|2/|N(f, τ)|2 decreases from the proximity of 0 dB as indicated by a broken line ellipsis in FIG. 8. This is different from the gain function G(f, τ) of the example in the past represented by the expression (3) given hereinabove (refer to FIG. 42). In the example in the past, when |X(f, τ)|2<|N(f, τ)|2, the frequency spectrum after the subtraction is in the negative, and therefore, a suitable value (β) is set. However, if this is carried out, then the value of X(f, τ) is further suppressed although it is originally low, and also components other than mechanical noise are suppressed. By setting the gain such that it increases smoothly as the power ratio |X(f, τ)|2/|N(f, τ)|2 decreases from the proximity of 0 dB, sound quality degradation by excessive suppression can be avoided.

Referring back to FIG. 2, the power ratio calculation block 122 calculates, for each frequency, the power ratio |X(f, τ)|2/|N(f, τ)|2 between the frequency spectrum of the input signal, that is, the input signal spectrum, and the frequency spectrum of mechanical noise, that is, the mechanical noise spectrum. In this instance, the power ratio calculation block 122 calculates the power ratio |X(f, τ)|2/|N(f, τ)|2 based on the frequency spectrum X(f, τ) of the input signal obtained by the Fourier transform section 105 and the frequency spectrum information |N(f, τ)|2 of mechanical noise stored in the noise table 107.

The frequency spectrum correction block 123 multiplies, for each frequency, the frequency spectrum X(f, τ) of the input signal obtained by the Fourier transform section 105 by the gain G(f, τ) to obtain a corrected frequency spectrum Y(f, τ). It is to be noted that the gain G(f, τ) is read out from the gain function table 121 based on the power ratio |X(f, τ)|2/|N(f, τ)|2 calculated by the power ratio calculation block 122. From this, the mechanical noise reduction section 106 further has a gain readout section though not shown.

Figure 9:
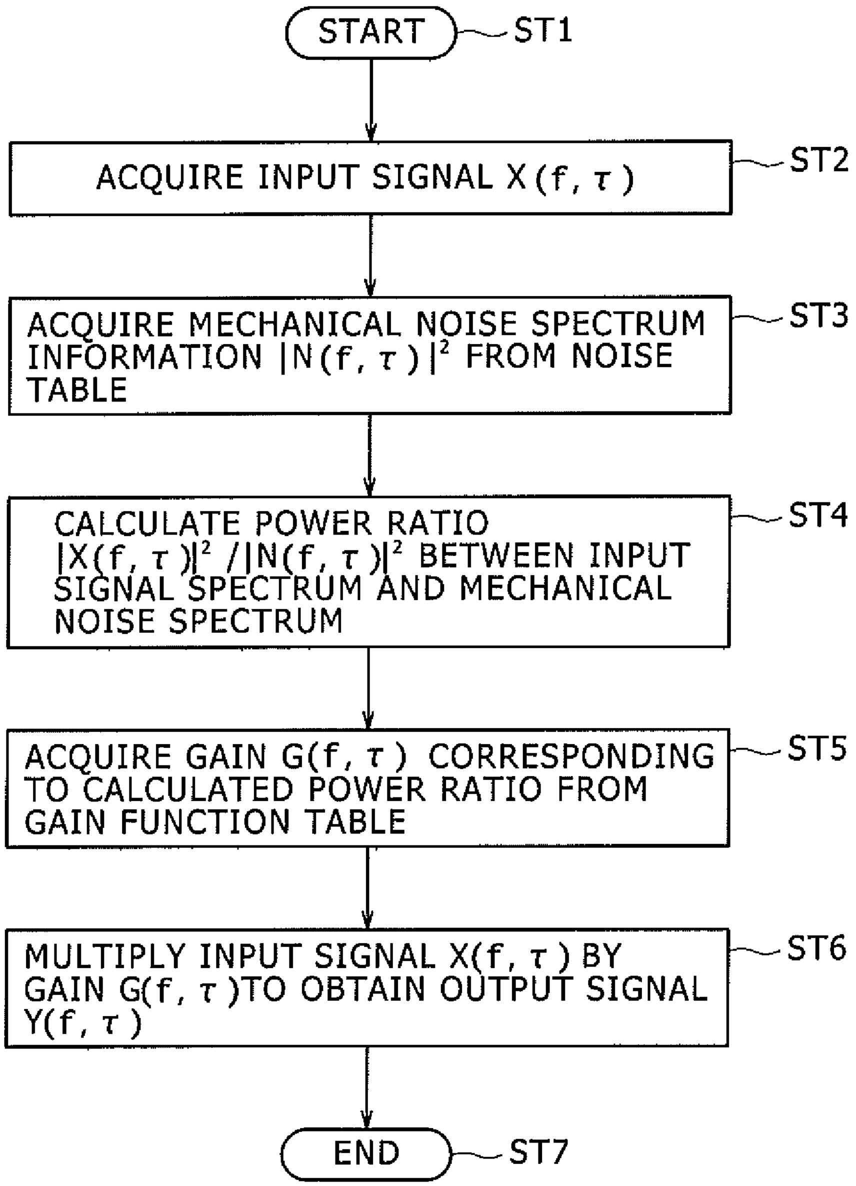
FIG. 9 is a flow chart illustrating an example of a mechanical noise suppression process of the mechanical sound reduction section.
Figure 10:
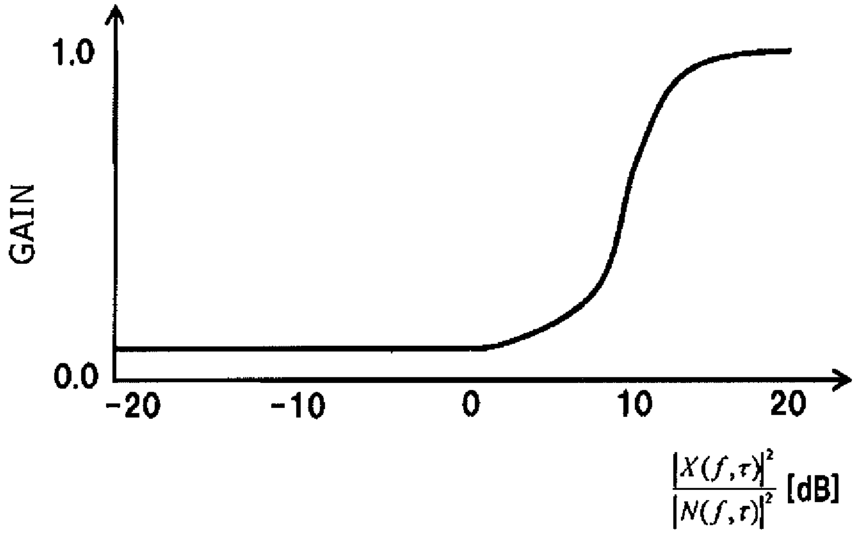
FIG. 10 is a view illustrating another example of the gain function set to the gain function table of the mechanical noise reduction section.

The flow chart of FIG. 9 illustrates an example of a processing procedure of the mechanical noise reduction section 106 shown in FIG. 2. It is to be noted that the flow chart illustrates a processing procedure of correcting the frequency spectrum X(f, τ) of the frequency f of the frame τ, and also correction of other frequency spectra is carried out by a similar procedure.

The mechanical noise reduction section 106 starts its processing at step ST1 and then advances the processing to step ST2. At step ST2, the mechanical noise reduction section 106 acquires a frequency spectrum X(f, τ) of the frequency f of the frame τ as an input signal from the Fourier transform section 105. Further, the mechanical noise reduction section 106 acquires a power spectrum |N(f, τ)|2 as mechanical noise spectrum information corresponding to the frequency f from the noise table 107 at step ST3.

Then at step ST4, the power ratio calculation block 122 of the mechanical noise reduction section 106 calculates a power ratio |X(f, τ)|2/|N(f, τ)|2 of the input signal spectrum and the mechanical noise spectrum. Then, the mechanical noise reduction section 106 reads out and acquires, based on the calculated power ratio, a gain G(f, τ) corresponding to the power ratio from the gain function table 121 at step ST5.

Then at step ST6, the frequency spectrum correction block 123 of the mechanical noise reduction section 106 multiplies the frequency spectrum X(f, τ) as the input signal by the gain G(f, τ) to obtain a corrected frequency spectrum Y(f, τ) as an output signal. The mechanical noise reduction section 106 ends its processing at step ST7 after the process at step ST6.

Referring back to FIG. 1, the spectrum changeover section 108 selectively outputs the frequency spectrum X(f, τ) obtained by the Fourier transform section 105 or the corrected frequency spectrum Y(f, τ) obtained by the mechanical noise reduction section 106. The changeover operation of the spectrum changeover section 108 is controlled by the control section 201. In this instance, the spectrum changeover section 108 outputs the frequency spectrum X(f, τ) when a zooming operation is not being carried out. On the other hand, during a zooming operation, the spectrum changeover section 108 outputs the corrected frequency spectrum Y(f, τ) in a state in which driving sound or mechanical noise is generated from the motor 203.

The inverse Fourier transform section 109 carries out, for each frame, an inverse fast Fourier transform (IFFT) process for the frequency spectrum outputted from the spectrum changeover section 108. This inverse fast Fourier transform section 109 carries out inverse processing to that by the Fourier transform section 105 described hereinabove to convert a frequency domain signal into a time domain signal to obtain framed signals.

The waveform synthesis section 110 synthesizes framed signals of frames obtained by the inverse Fourier transform section 109 to restore a sound signal which is continuous in a time series. The waveform synthesis section 110 configures a frame synthesis section. The recording section 111 records the sound signal obtained by the waveform synthesis section 110 on a recording medium such as a disk or a memory, for example, together with an image signal obtained by the image system.

Operation of the sound system 100 of the imaging apparatus including the video shooting function with sound shown in FIG. 1 during video shooting is described briefly. The microphone 101 collects peripheral sound to produce a sound signal. The sound signal is converted from an analog signal into a digital signal by the A/D converter 102 and is supplied to the framing section 104 through the AGC circuit 103. The framing section 104 divides the output sound signal from the AGC circuit 103 into frames of a predetermined time length in order to carry out processing for each frame.

Framed signals of the frames obtained by the framing section 104 are successively supplied to the Fourier transform section 105. The Fourier transform section 105 carries out a fast Fourier transform (FFT) process for the framed signals to convert them into a frequency spectrum X(f, τ) of the frequency domain. The frequency spectrum X(f, τ) is supplied to the spectrum changeover section 108 and the mechanical noise reduction section 106.

The mechanical noise reduction section 106 carries out, during a zooming operation, a mechanical noise reduction process based on zoom controlling information such as presence or absence of zooming and the zooming direction from the control section 201. In this instance, the mechanical noise reduction section 106 multiplies the frequency spectrum X(f, τ) by the gain function G(f, τ) to produce a frequency spectrum Y(f, τ) corrected so as to suppress mechanical noise, that is, driving sound of the motor 203. This frequency spectrum Y(f, τ) is supplied to the spectrum changeover section 108.

While a zooming operation is not carried out, the spectrum changeover section 108 selects the frequency spectrum X(f, τ) supplied from the Fourier transform section 105. This is because, at this time, the motor 203 is not in a driven state and the frequency spectrum X(f, τ) does not include a component of mechanical noise, that is, the driving sound of the motor 203. On the other hand, when a zooming operation is carried out, the spectrum changeover section 108 selects the frequency spectrum Y(f, τ) corrected so as to suppress mechanical noise, that is, the driving sound of the motor 203, obtained by the mechanical noise reduction section 106.

The frequency spectrum X(f, τ) or the corrected frequency spectrum Y(f, τ) from the spectrum changeover section 108 is supplied to the inverse Fourier transform section 109. The inverse Fourier transform section 109 carries out, for each frame, an inverse fast Fourier transform (IFFT) process for a frequency spectrum from the spectrum changeover section 108 to restore a framed signal of the time domain.

The framed signals are supplied to the waveform synthesis section 110. The waveform synthesis section 110 synthesizes such framed signals of the frames to regenerate a sound signal which is continuous in a time series. The sound signal is supplied to the recording section 111. The recording section 111 records the sound signal supplied from the waveform synthesis section 110 on a recording medium such as a disk or a memory, for example, together with an image signal obtained by the image system.

As described above, in the sound system 100 of the imaging apparatus including a video shooting function with sound shown in FIG. 1, during a zooming operation, the mechanical noise reduction section 106 carries out a mechanical noise reduction process. Further, in the sound system 100, during a zooming operation, the spectrum changeover section 108 selects the frequency spectrum Y(f, τ) corrected so as to suppress mechanical noise, that is, driving sound of the motor 203. Therefore, during a zooming operation, a sound signal whose mechanical noise, which is driving sound of the motor 203, is suppressed can be recorded.

Further, in the sound system 100 shown in FIG. 1, the mechanical noise reduction section 106 multiplies, for each frequency, the frequency spectrum X(f, τ) of the input signal by the gain read out from the gain function table 121 to carry out correction of the frequency spectrum. In this instance, the gain function G(f, τ) stored in the gain function table 121 can be set freely in an arbitrary form. In particular, while the dispersion of mechanical noise exhibits various characteristics, a gain function G(f, τ) suitable for any characteristic can be set in the gain function table 121. Consequently, a fixed noise reduction effect can be achieved independently of the dispersion of mechanical noise among different individuals by a simple and easy configuration, and an output of high quality can be obtained.

Further, in the sound system 100 shown in FIG. 1, the gain function G(f, τ) can be set in the gain function table 121 such that the gain indicates a moderate variation around 0 dB of the power ratio |X(f, τ)|2/|N(f, τ)|2 (refer to FIG. 3). Consequently, such a situation that the value of the gain varies suddenly in response to a variation of the power ratio does not occur, and the output signal can be prevented from being distorted to degrade the sound quality.

Further, in the sound system 100 shown in FIG. 1, the gain function G(f, τ) can be set in the gain function table 121 such that the gain indicates a moderate increase as the power ratio |X(f, τ)|2/|N(f, τ)|2 decreases from the proximity of 0 dB (refer to FIG. 3). Consequently, such a situation that the value of the frequency spectrum X(f, τ) which originally is low is suppressed by a great amount is prevented, and sound quality degradation by excessive suppression can be avoided.

It is to be noted that the foregoing description is directed to an example wherein the gain function G(f, τ) set in the gain function table 121 of the mechanical noise reduction section 106 generally exhibits a curved shape in which the gain drops in the proximity of 0 dB of the power ratio |X(f, τ)|2/|N(f, τ)|2 (refer to FIG. 3). The gain function G(f, τ) is set such that the gain increases smoothly as the power ratio |X(f, τ)|2/|N(f, τ)|2 decreases from the proximity of 0 dB as described hereinabove.

However, the gain function G(f, τ) to be set in the gain function table 121 of the mechanical noise reduction section 106 may possibly indicate some other shape. For example, the gain function G(f, τ) may be set such that the gain indicates a fixed value where the power ratio |X(f, τ) 12/|N(f, τ)|2 is lower than 0 dB, that is, where |X(f, τ)|2<|N(f, τ)|2 is satisfied, similarly as in the technique in the past.

<2. Second Embodiment>

Figure 11:
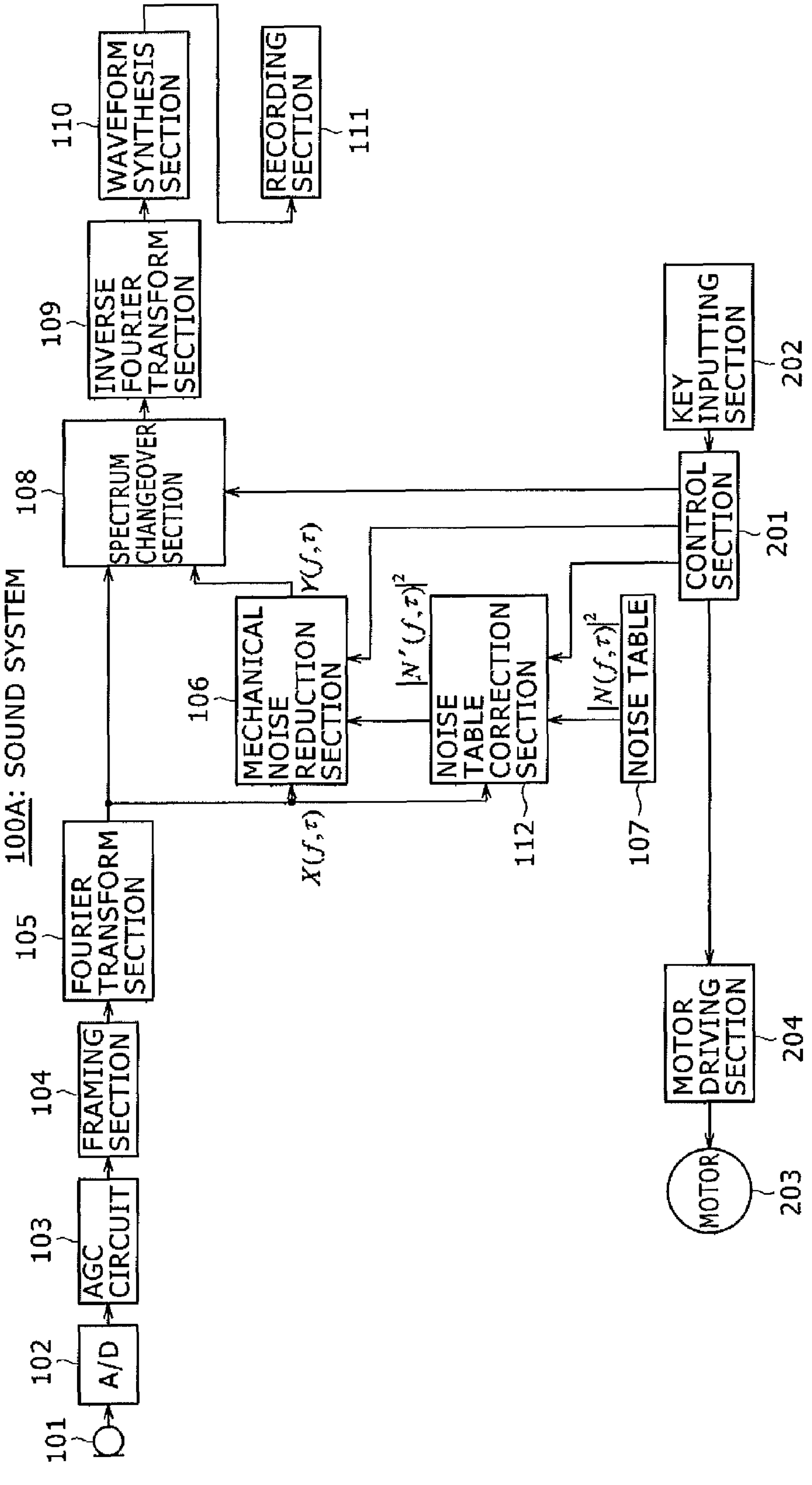
FIG. 11 is a block diagram showing an example of a configuration of a sound system of an imaging apparatus which includes a video shooting function with sound according to a second embodiment of the present disclosure.

Sound System of an Imaging Apparatus Including a Video Shooting Function with Sound FIG. 11 shows an example of a configuration of a sound system 100A of an imaging apparatus including a video shooting function with sound according to a second embodiment of the disclosure. The sound system 100A includes several common components to those of the sound system 100 of the first embodiment.

In particular, referring to FIG. 11, the sound system 100A includes a microphone 101, an A/D converter 102, an AGC circuit 103, a framing section 104 and a Fourier transform section 105. The sound system 100A further includes a mechanical noise reduction section 106, a noise table 107, a noise table correction section 112, a spectrum changeover section 108, an inverse Fourier transform section 109, a waveform synthesis section 110, and a recording section 111.

The noise table correction section 112 corrects frequency spectrum information |N(f, τ)|2 of mechanical noise stored in the noise table 107 to change frequency spectrum information of mechanical noise to be used in the mechanical noise reduction section 106. In this instance, the noise table correction section 112 carries out the correction based on a frequency spectrum X(f, τ) of an input signal obtained by the Fourier transform section 105. The noise table correction section 112 configures a spectrum information changing section.

The noise table correction section 112 carries out spectrum correction utilizing a masking characteristic. The noise table correction section 112 calculates a parameter indicative of a characteristic amount of peripheral noise based on the frequency spectrum X(f, τ) of the input signal, acquires a correction coefficient based on the parameter, and multiplies the frequency spectrum information |N(f, τ)|2 of the mechanical noise by the correction coefficient to carry out correction.

In this instance, the noise table correction section 112 carries out a noise table correction process based on the zoom controlling information such as presence or absence of zooming and the zooming direction from the control section 201. Upon a zooming operation, the noise table correction section 112 carries out the noise table correction process when the motor 203 is driven. Further, upon a zooming operation in the telephoto direction and the wide-angle direction, the noise table correction section 112 reads out frequency spectrum information |N(f, τ)|2 of mechanical noise corresponding to the zooming direction from the noise table 107 and corrects the same.

Figure 12:
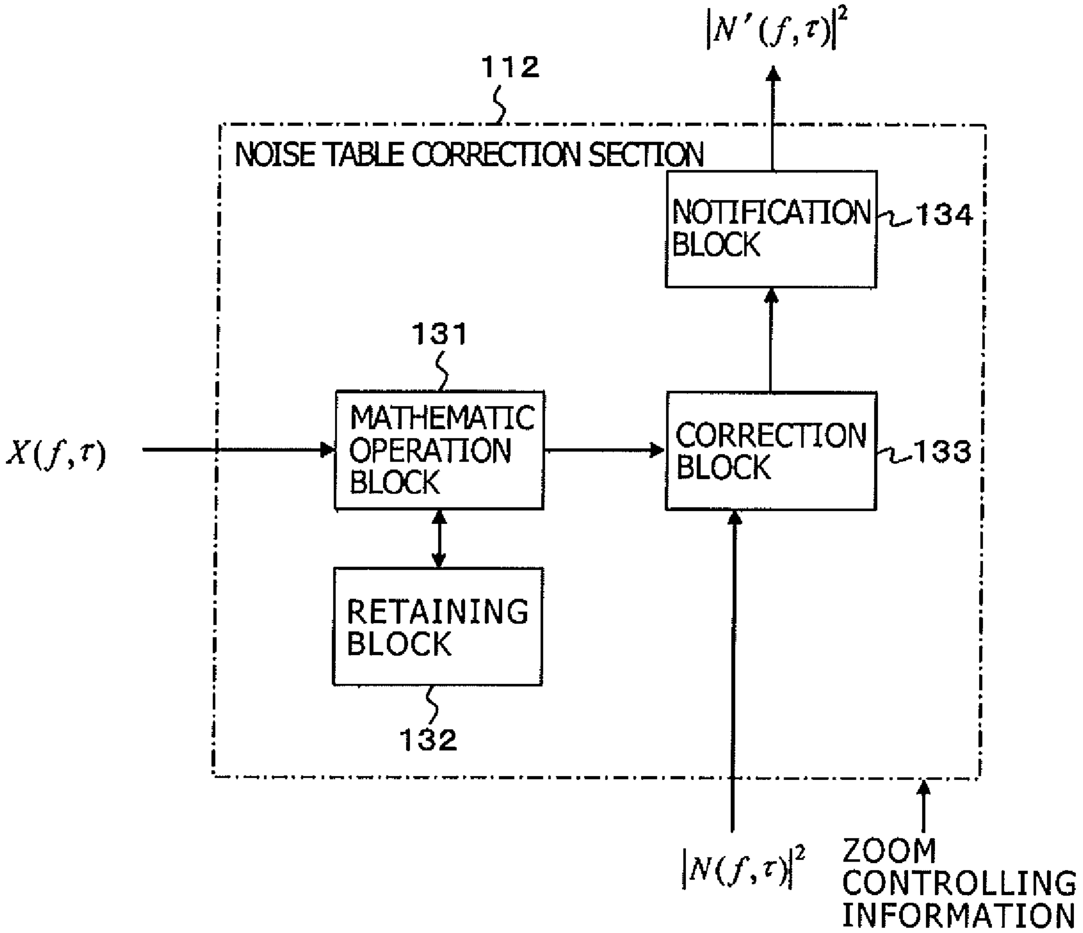
FIG. 12 is a block diagram showing an example of a configuration of a noise table correction section of the sound system.

FIG. 12 shows an example of a configuration of the noise table correction section 112. The noise table correction section 112 includes a mathematic operation block 131, a retaining block 132, a correction block 133, and a notification block 134. The mathematic operation block 131 calculates a parameter representative of a characteristic amount of peripheral noise based on the frequency spectrum X(f, τ) of the input signal and acquires a correction coefficient based on the parameter. In this instance, the mathematic operation block 131 acquires a correction coefficient for each frequency or a correction coefficient common to the frequencies.

In the case where a correction coefficient for each frequency is to be acquired, the parameter representative of a characteristic amount is, for example, a linear predictive coefficient representative of a spectrum envelope. In this instance, the mathematic operation block 131 determines a linear predictive coefficient representative of a spectrum envelope based on the frequency spectrum X(f, τ) of the input signal and acquires a correction coefficient of each frequency such that the value decreases corresponding to a mountain portion of the spectrum envelope. Details of acquisition of a correction coefficient for each frequency by the mathematic operation block 131 are hereinafter described.

On the other hand, in the case where a correction coefficient common to the frequencies is to be acquired, the parameter representative of a characteristic amount is an average power of the frequency spectrum X(f, τ) of the input signal. In this instance, the mathematic operation block 131 determines an average power based on the frequency spectrum X(f, τ) of the input signal and acquires a correction coefficient common to the frequencies such that the value decreases as the average power increases. Details of acquisition of a correction coefficient common to the frequencies by the mathematic operation block 131 are hereinafter described.

The retaining block 132 retains data necessary for a mathematic operation process by the mathematic operation block 131, a correction coefficient as a result of the mathematic operation and so forth. The correction block 133 corrects the frequency vector information |N(f, τ)|2 of mechanical noise read out from the noise table 107 by multiplying the same by the correction coefficient retained in the retaining block 132. The notification block 134 notifies the mechanical noise reduction section 106 of the frequency vector information |N'(f, τ)|2 of mechanical noise corrected by the correction block 133. While the mechanical noise reduction section 106 of the sound system 100 shown in FIG. 1 uses the frequency spectrum information |N(f, τ)|2 of mechanical noise, the mechanical noise reduction section 106 shown in FIG. 11 uses the corrected frequency spectrum information |N'(f, τ)|2 of mechanical noise.

Figure 13:
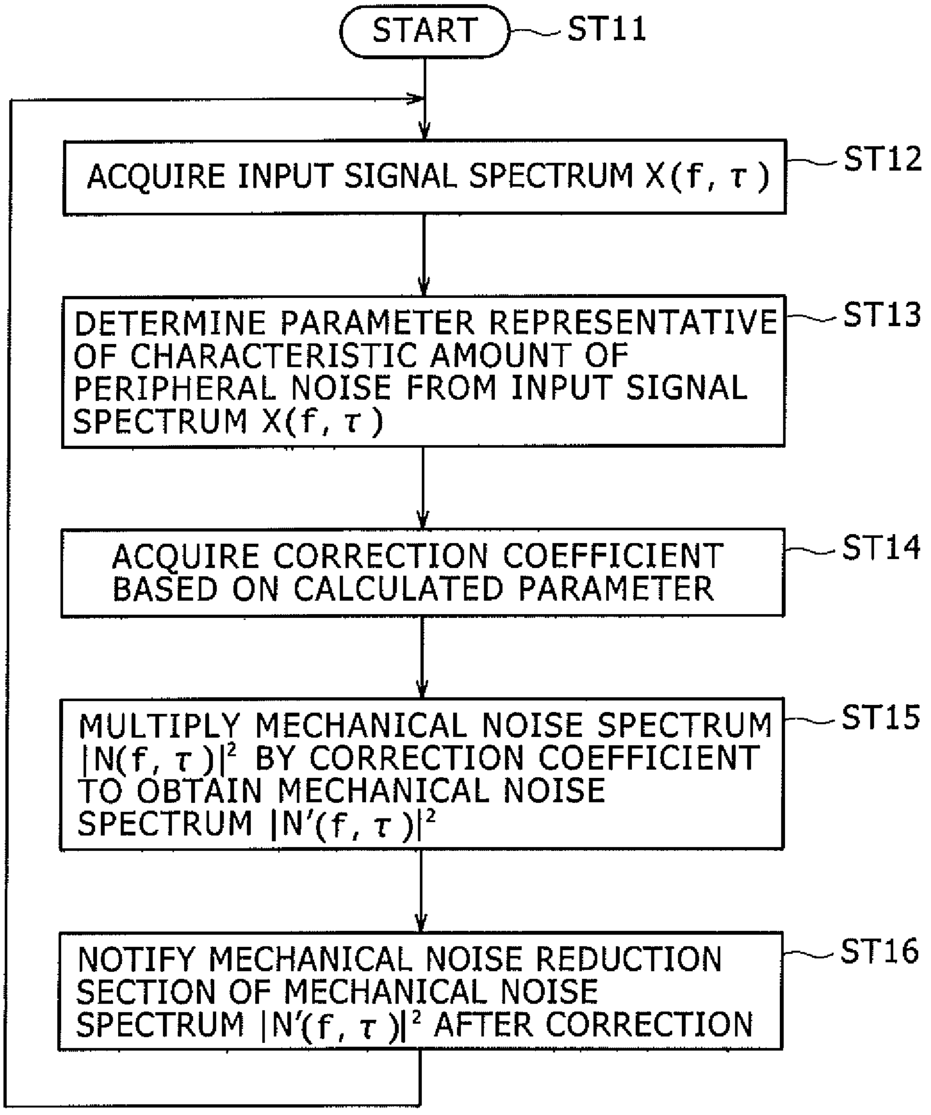
FIG. 13 is a flow chart showing an example of a processing procedure of the noise table correction section.

A flow chart of FIG. 13 illustrates an example of a processing procedure of the noise table correction section 112. Referring to FIG. 13, the noise table correction section 112 starts its processing at step ST11 and then advances the processing to step ST12. At step ST12, the noise table correction section 112 acquires a frequency spectrum X(f, of an input signal for a predetermined period of time from the Fourier transform section 105.

Then at step ST13, the mathematic operation block 131 of the noise table correction section 112 determines a parameter representative of a characteristic amount of peripheral noise from the frequency spectrum X(f, τ) of the input signal for the predetermined period of time acquired at step ST12. This parameter is a linear predictive coefficient representative of a spectrum envelope or an average power as described hereinabove.

Then at step ST14, the noise table correction section 112 acquires a correction coefficient based on the parameter calculated at step ST13. In this instance, in the case where the parameter is a linear predictive coefficient representative of a spectrum envelope, a correction coefficient for each frequency is acquired, but in the case where the parameter is an average power, a correction coefficient common to the frequencies is acquired.

Then at step ST15, the correction block 133 of the noise table correction section 112 reads out frequency spectrum information |N(f, τ)|2 of mechanical noise from the noise table 107 and multiplies the same by the correction coefficient acquired at step ST14 to correct the same. Consequently, the noise table correction section 112 acquires corrected frequency spectrum information $|N'(f, \tau)|2$ of the mechanical noise at step ST15.

Then at step ST16, the notification block 134 of the noise table correction section 112 notifies the mechanical noise reduction section 106 of the corrected frequency spectrum information $|N'(f, \tau)|2$ of the mechanical noise. The noise table correction section 112 returns the processing to the process at step ST12 after the process at step ST16 and then repeats the processing procedure described above. In other words, the corrected frequency spectrum information $|N'(f, \tau)|2$ of the mechanical noise conveyed from the noise table correction section 112 to the mechanical noise reduction section 106 is successively updated based on the frequency spectrum $X(f, \tau)$ of the input signal.

In the case where a correction coefficient for each frequency is acquired for correction.

Figure 14:
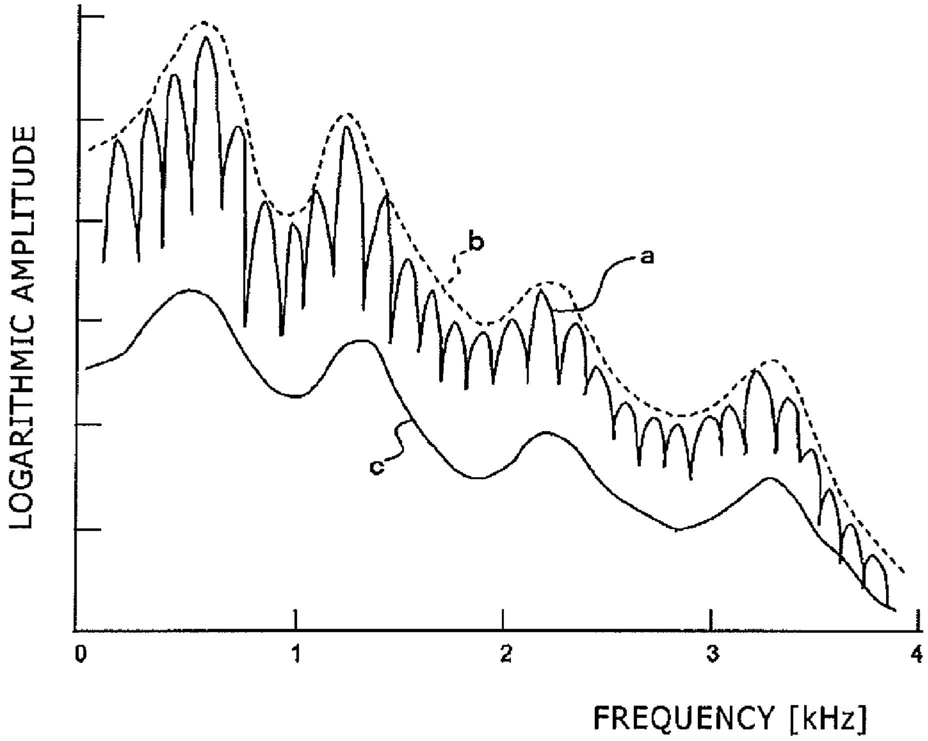
FIG. 14 is a diagrammatic view illustrating a relationship of a noise threshold value and a spectrum envelope in an acoustic masking phenomenon.

Acquisition and correction of a correction coefficient for each frequency by the mathematic operation block 131 of the noise table correction section 112 is described. FIG. 14 illustrates a relationship of a noise threshold value in an auditory masking phenomenon and a spectrum envelope (refer to Sadaoki FURUI, "New Acoustic Sound Engineering," Kindai Kagakusha Co., Ltd., p. 149).

Referring to FIG. 14, a curve a indicates a frequency spectrum, that is, a spectrum fine structure, another curve b a spectrum envelope; and a further curve c a noise threshold value. The noise threshold value represents an amplitude below which noise cannot be perceived by a human being. In other words, noise cannot be heard by a human being if it does not have an amplitude greater than the noise threshold value. Therefore, in a region in which the amplitude of the frequency spectrum of the input signal is great, noise need not be suppressed very much.

Figure 15:
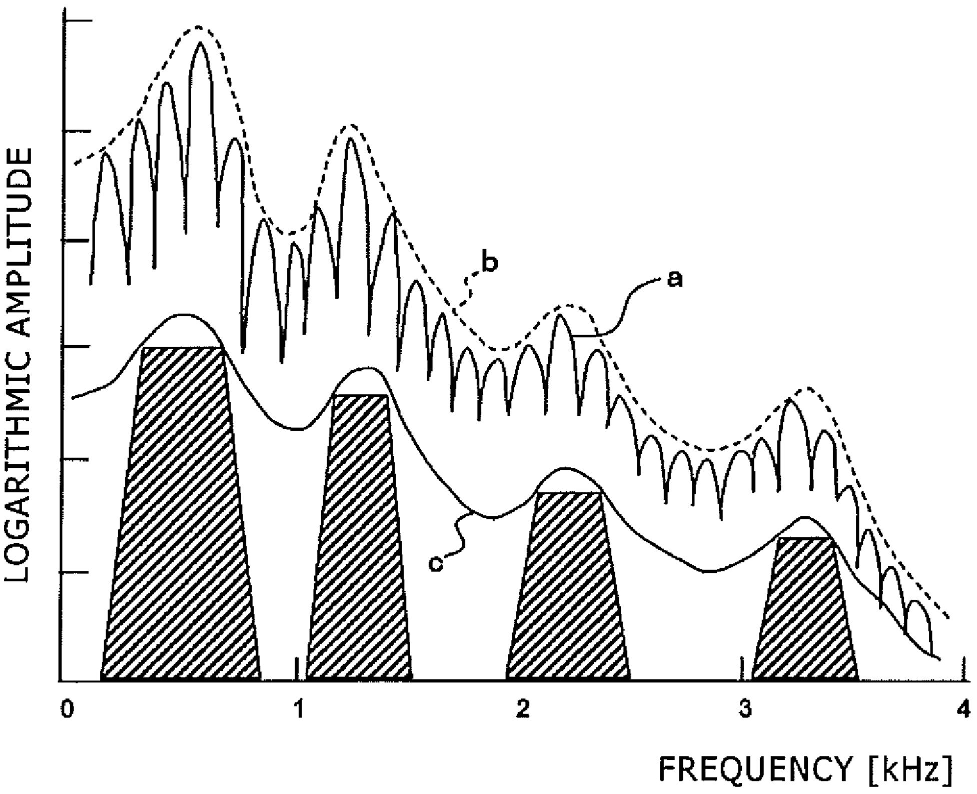
FIG. 15 is a view illustrating that, depending upon a frequency region, noise is less likely to be perceived at some portion even if the noise remains there.

Slanting lines shown in FIG. 15 indicate portions in which, even if noise, that is, mechanical noise, remains, it is less likely to be perceived than in the other portions. There is no necessity to remove all mechanical noise, that is, all driving noise of the motor 203, but by what degree the noise should be suppressed or reduced for each frequency depends upon the characteristic of the input signal. By suppressing the suppression degree of mechanical noise in response to a characteristic of the input signal, degradation of desired sound arising from cancellation of mechanical noise which is not actually perceived can be suppressed.

Figure 16A:
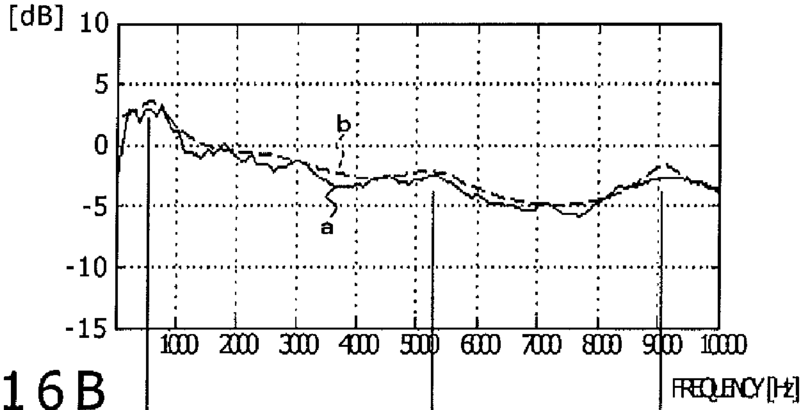
FIGS. 16A and 16B are diagrammatic views illustrating that a mathematic operation block of the mechanical noise reduction section calculates an average spectrum envelope from an average spectrum of a frequency spectrum of an input signal and calculating a correction coefficient from the average spectrum envelope.
Figure 16B:
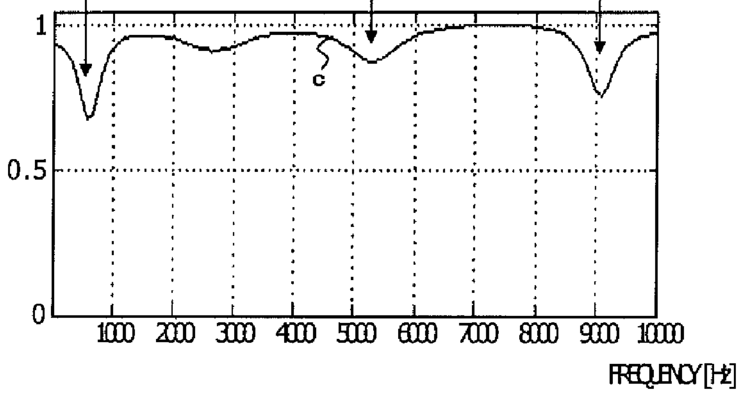

In order to acquire a correction coefficient for each frequency, the mathematic operation block 131 of the noise table correction section 112 calculates an average spectrum for a long period of time, for example, for 1 to 2 seconds, based on a frequency spectrum $X(f, \tau)$ of an input signal. Then, the mathematic operation block 131 calculates an average spectrum envelope from the average spectrum and calculates a correction coefficient from the average spectrum envelope. A curve a of FIG. 16A illustrates an example of an average spectrum, and another curve b of FIG. 16A illustrates an example of an average spectrum envelope. A further curve c of FIG. 16B illustrates an example of a correction coefficient.

Figure 17:
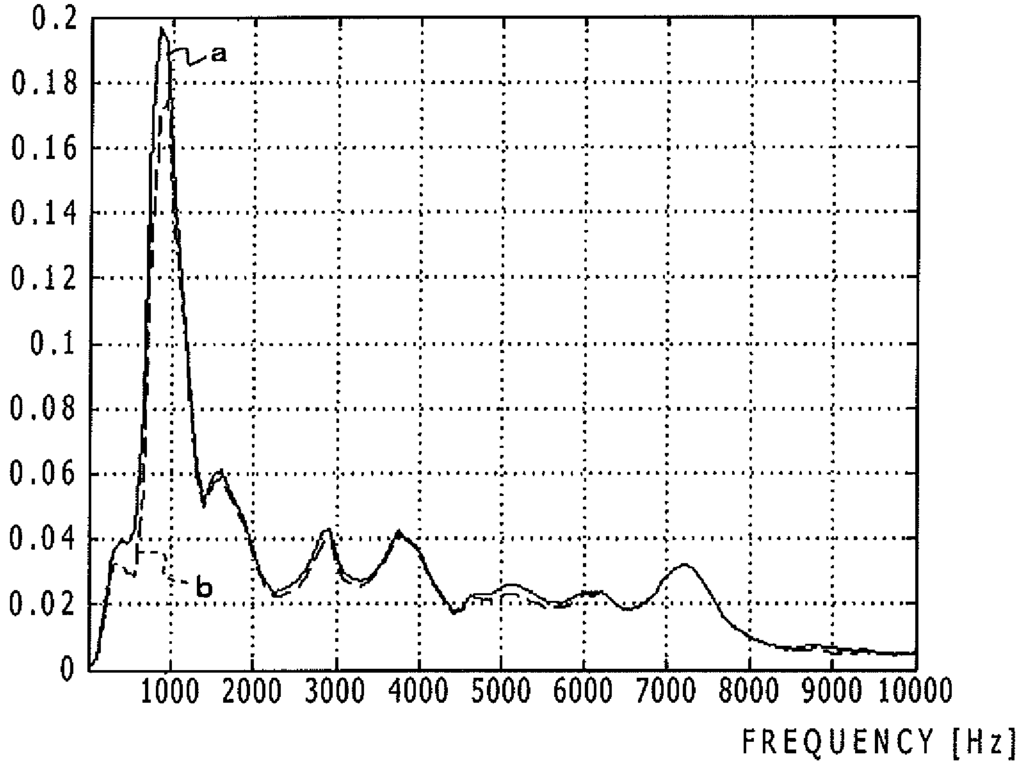
FIG. 17 is a diagrammatic view illustrating an example of spectrum information of mechanical noise stored in a noise table and spectrum information of the mechanical noise after corrected with a correction coefficient for each frequency.

A curve a of FIG. 17 illustrates an example of frequency spectrum information $|N(f, \tau)|2$ of mechanical noise stored in the noise table 107. Another curve b of FIG. 17 illustrates an example of frequency spectrum information $|N'(f, \tau)|2$ of mechanical sound corrected with a correction coefficient indicated by the curve c of FIG. 16B.

The frequency characteristic of the spectrum envelope, that is, a linear predictive filter F(z) is represented by the following expression (5):

$$F(z) = \frac{1}{A(z)} = \frac{1}{1 + \sum_{i=1}^{p} \alpha_i \cdot z^{-i}} \tag{5}$$

where A(z) is an inverse filter (refer to Sadaoki FURUI, "New Acoustic Sound Engineering," Kindai Kagakusha Co., Ltd., pp. 126-127).

In the case where a correction coefficient is to be determined from a spectrum envelope, for example, a frequency characteristic of K(z) represented by the following expression (6) which is obtained by modifying the frequency characteristic of F(z) described hereinabove is calculated:

$$K(z) = \frac{1}{B(z)} = \frac{1}{1 + \sum_{i=1}^{p} \alpha_i \cdot \lambda^i \cdot z^{-i}} \tag{6}$$

where $\lambda$ is a value which satisfies $0<\lambda\leq 1$. As the value of $\lambda$ approaches 1, the correction coefficient indicates flattened variation.

Then, a frequency characteristic of H(z)=K(z)/F(z) represented by the following expression (7), that is, a frequency characteristic of the correction coefficient, is calculated:

$$H(z) = \frac{K(z)}{F(z)} = \frac{1 + \sum_{i=1}^{p} \alpha_i \cdot z^{-i}}{1 + \sum_{i=1}^{p} \alpha_i \cdot \lambda^i \cdot z^{-i}} \tag{7}$$

H(z) makes a filter having a valley around a peak frequency of the spectrum envelope.

Figure 18:
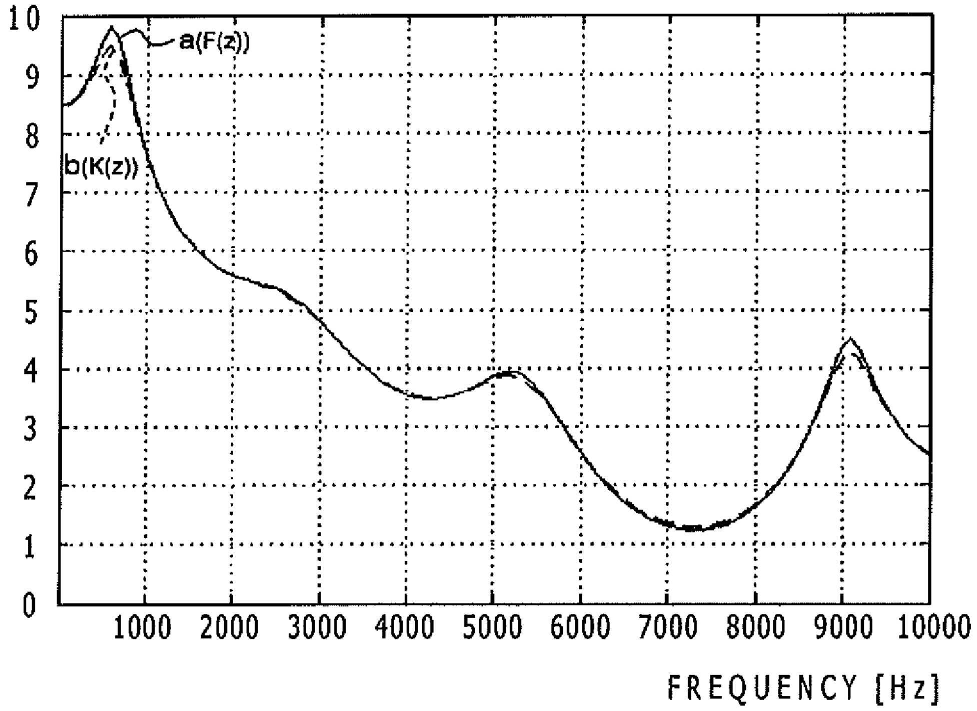
FIG. 18 is a diagrammatic view illustrating an example of a frequency characteristic of a spectrum envelope or linear predictive filter and a frequency characteristic obtained by correcting the frequency characteristic.
Figure 19:
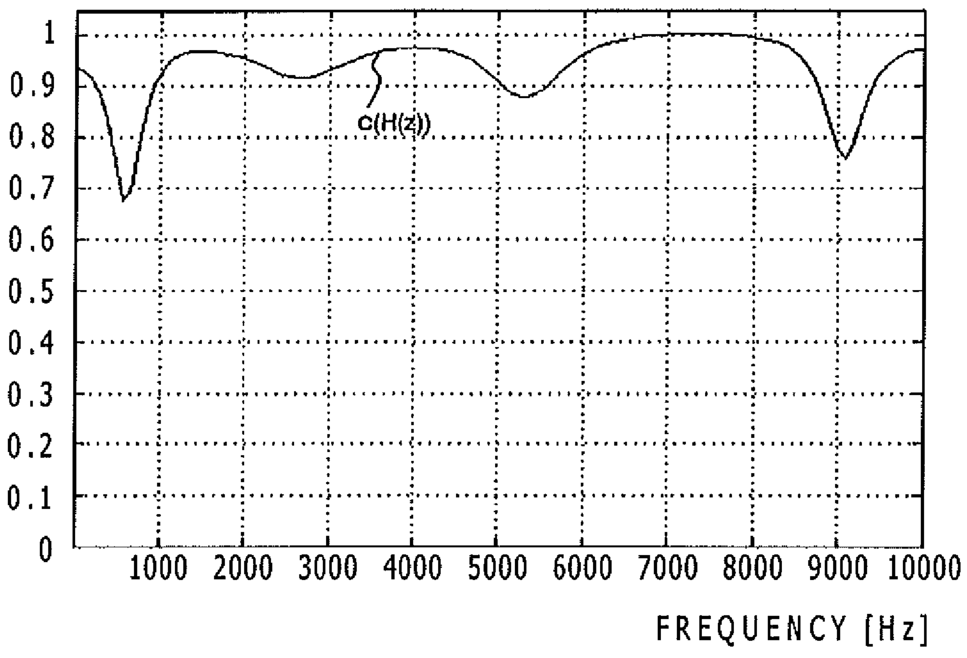
FIG. 19 is a diagrammatic view illustrating an example of a frequency characteristic of $H(z)=K(z)/F(z)$.

A curve a of FIG. 18 illustrates an example of a frequency characteristic of F(z), and another curve b of FIG. 18 illustrates an example of a frequency characteristic of K(z). A curve c of FIG. 19 illustrates an example of a frequency characteristic.

Figure 20:
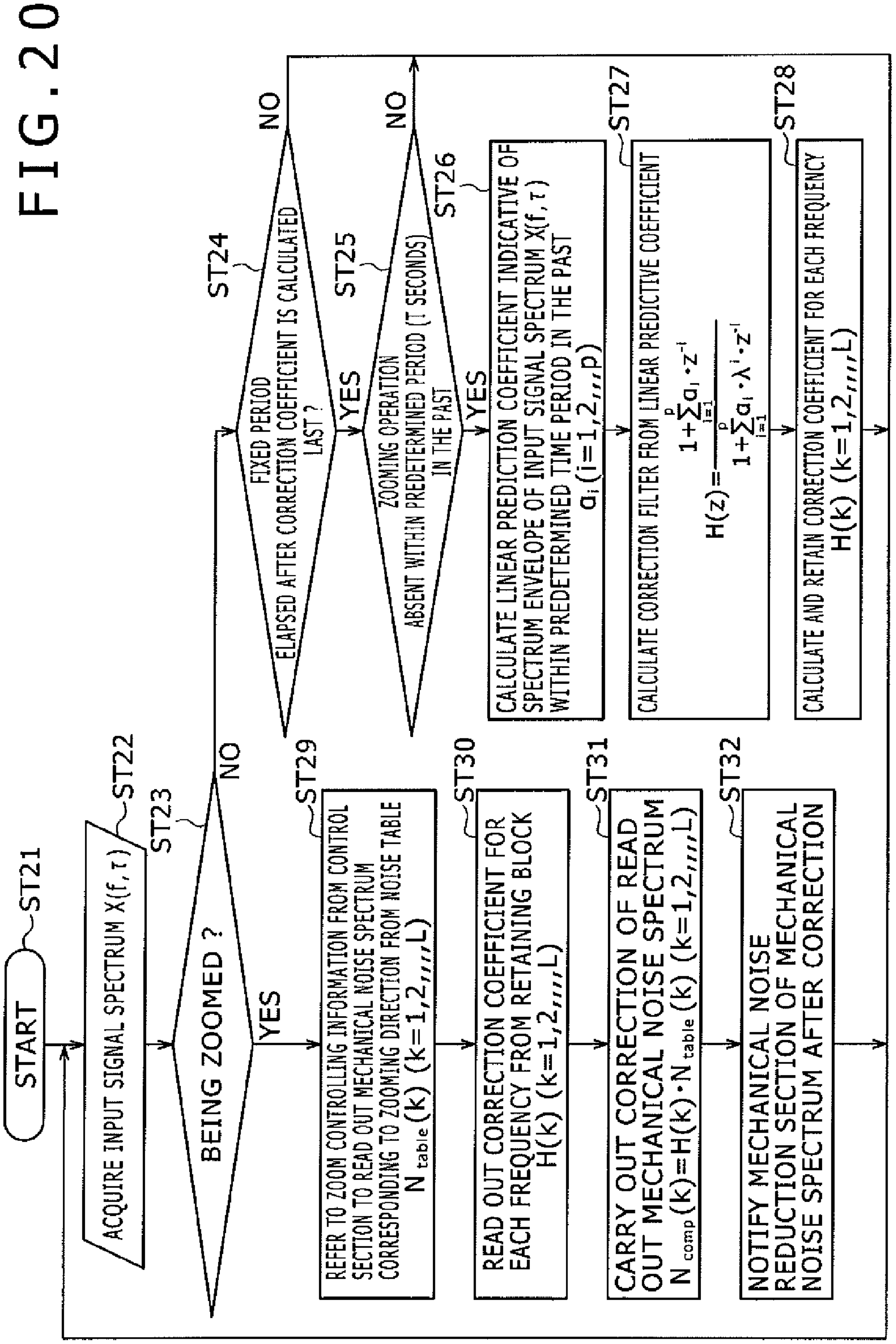
FIG. 20 is a flow chart illustrating an example of a detailed processing procedure of the noise table correction section in the case where a frequency coefficient for each frequency is acquired for correction.

A flow chart of FIG. 20 illustrates an example of a detained processing procedure of the noise table correction section 112 in the case where a correction coefficient for each frequency is acquired for correction. Referring to FIG. 20, the noise table correction section 112 starts its processing at step ST21 and then advances the processing to step ST22. At step ST22, the noise table correction section 112 acquires a frequency spectrum $X(f, \tau)$ of an input signal from the Fourier transform section 105.

Then at step ST23, the noise table correction section 112 decides based on control information from the control section 201 whether or not a zooming operation is being carried out. In the case where a zooming operation is not being carried out, the noise table correction section 112 calculates a correction coefficient based on the frequency spectrum $X(f, \tau)$ of the input signal in which driving noise or mechanical noise of the motor 203 is not included. Therefore, when a zooming operation is not being carried out, the noise table correction section 112 advances the processing to step ST24 in order to calculate a correction coefficient.

At step ST24, the noise table correction section 112 decides whether or not a fixed period of time elapses after a correction coefficient is calculated last. When the fixed interval of time does not elapse, the noise table correction section 112 returns the processing immediately to step ST22 without calculating a correction coefficient. On the other hand, if the fixed period of time elapses, then the noise table correction section 112 returns the processing to step ST25.

At step ST25, the noise table correction section 112 decides whether or not a zooming operation has been carried out within the predetermined period of time, that is, within T seconds, in the past. This is because the noise table correction section 112 calculates a correction coefficient based on the frequency spectrum X(f, τ) of the input signal for a predetermined number of frames obtained in the predetermined period of time in the past. The T seconds are, for example, 1 to 2 seconds. When a zooming operation was carried out within the predetermined period of time in the past, the noise table correction section 112 returns the processing to step ST22 immediately without calculating a correction coefficient. On the other hand, if a zooming operation has not been carried out within the predetermined period of time in the past, then the noise table correction section 112 returns the processing to step ST26.

At step ST26, the noise table correction section 112 determines an average spectrum of the frequency spectrum X(f, τ) of the input signal for a predetermined number of frames within the predetermined period of time in the past, and further calculates a linear predictive coefficient of the spectrum envelope (refer to the expression (5) given hereinabove). Then, at step ST27, the noise table correction section 112 calculates a frequency characteristic of H(z)=K(z)/F(z), that is, a frequency characteristic of the correction coefficient (refer to the expression (7) given hereinabove).

Then at step ST28, the noise table correction section 112, calculates a correction coefficient H(k) (k=1, 2, . . . , L) for each frequency from the frequency characteristic of H(z)=K (z)/F(z) calculated at step ST27 and retains the correction coefficients H(k) into the retaining block 132. Here, "k" is an index indicative of a frequency. The noise table correction section 112 returns the processing to step ST22 after the processing at step S28.

When a zooming operation is being carried out, the noise table correction section 112 reads out frequency spectrum information of mechanical noise from the noise table 107 and notifies the mechanical noise reduction section 106 of corrected frequency spectrum information of the mechanical noise. Therefore, when a zooming operation is not being carried out at step ST23, the noise table correction section 112 returns the processing to step ST29.

At step ST29, the noise table correction section 112 reads out frequency spectrum information Ntable(k) (k=1, 2, . . . , L) of each frequency of mechanical noise corresponding to the zooming direction from the noise table 107 based on controlling information from the control section 201. Then, the noise table correction section 112 reads out a correction coefficient H(k) (k=1, 2, . . . , L) for each frequency retained in the retaining block 132 at step ST30.

Then at step ST31, the noise table correction section 112 multiplies, for each frequency, the frequency spectrum information Ntable(k) of the mechanical noise by the correction coefficient H(k) to carry out correction at step ST31. By this correction, corrected frequency spectrum information Ncomp(k)=H(k)·Ntable(k) (k=1, 2, . . . , L) of mechanical noise is obtained. Then at step ST32, the noise table correction section 112 notifies the mechanical noise reduction section 106 of the corrected frequency spectrum information Ncomp(k) (k=1, 2, . . . , L) of the mechanical noise. The noise table correction section 112 returns the processing to step ST22 after the process at step ST32.

If, during a zooming operation, the corrected frequency spectrum information Ncomp(k) (k=1, 2, . . . , L) of the mechanical noise conveyed to the mechanical noise reduction section 106, then since also the output sound is fluctuated similarly, this is not preferable. Therefore, in the processing procedure of the noise table correction section 112 in accordance with the flow chart of FIG. 20 described hereinabove, the correction coefficient H(k) (k=1, 2, . . . , L) is inhibited from changing during a zooming operation.

In the case where a correction coefficient common to frequencies is acquired for correction.

Acquisition and correction of a correction coefficient common to frequencies by the mathematic operation block 131 of the noise table correction section 112 is described. The correction process can be applied, for example, to a case in which the recording level is compressed by an AGC circuit so that mechanical noise is observed at a level lower than an actual level.

The role of the AGC circuit resides in keeping a fixed sound volume level as far as possible without depending upon the arrangement of a sound source, a recording target and so forth. To this end, the AGC circuit amplifies a signal inputted thereto such that it can pick up sound also of a low level. On the other hand, in the case where sound of an excessively high level is inputted, the AGC circuit compresses the inputted signal so that the input may not be saturated.

Figure 21:
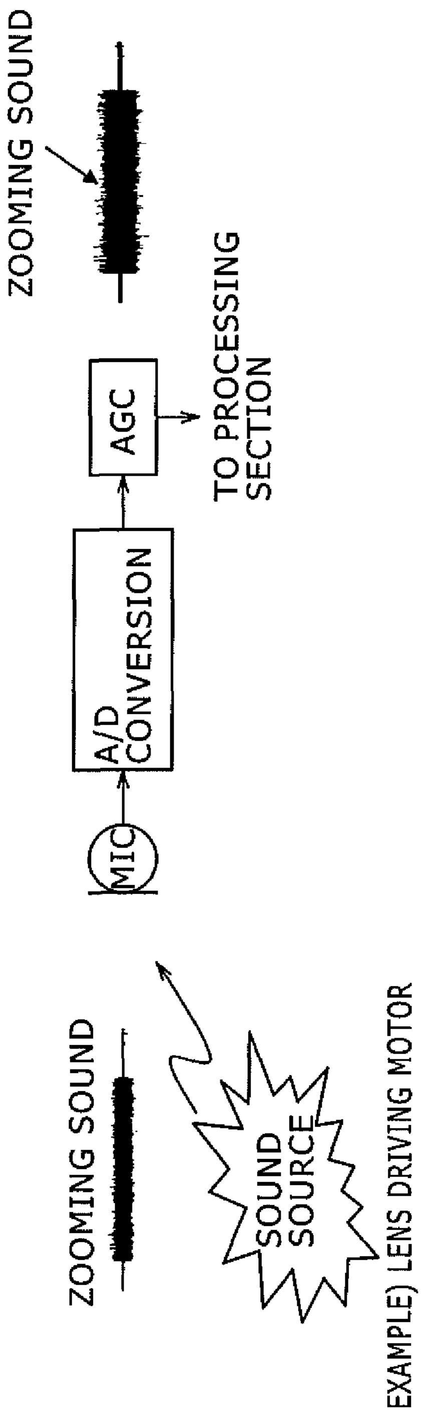
FIG. 21 is a view illustrating an example of a relationship between zooming noise and AGC in the case where only zooming noise is collected by the microphone.

FIG. 21 illustrates an example of a relationship of mechanical noise (hereinafter referred to as zooming noise (driving noise of the zoom motor)) and the AGC. The example relates to a case in which only zooming noise is collected by a microphone. In this instance, since the level of the zooming noise is low, the zooming noise is amplified at a fixed ratio by the AGC circuit such that it is observed in the amplified form.

Figure 22:
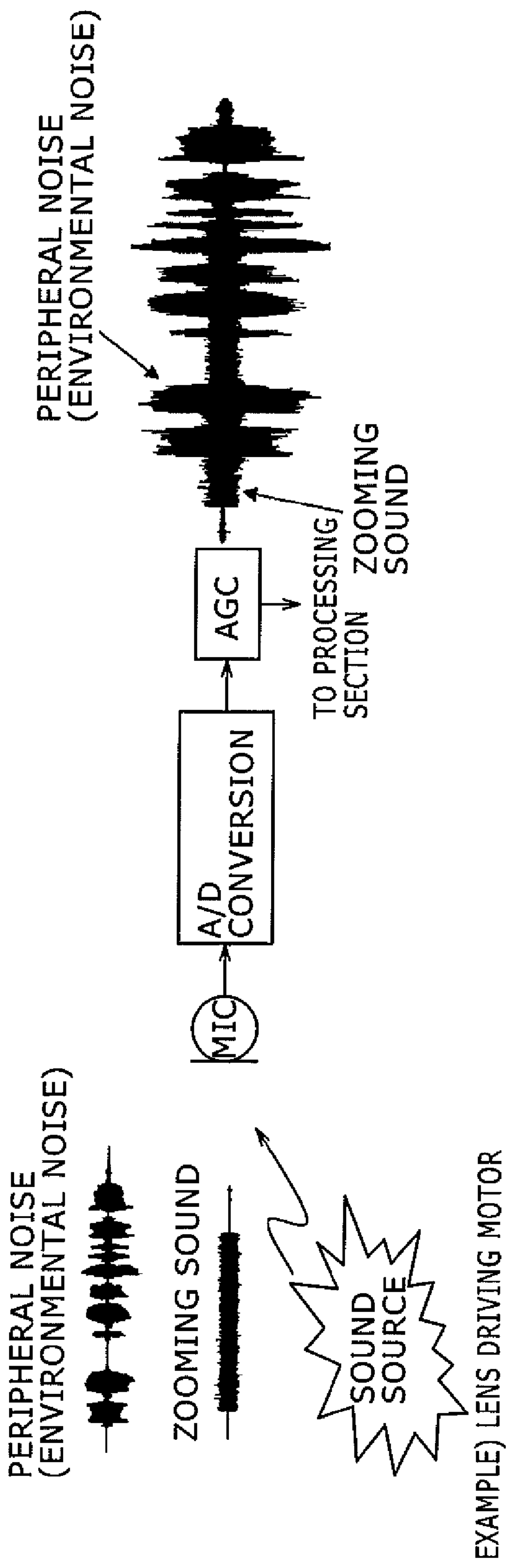
FIG. 22 is a similar view but illustrating an example of a relationship between zooming noise and AGC in the case where zooming noise and rather low peripheral noise or environmental noise are collected by the microphone.

FIG. 22 illustrates another example of a relationship between zooming noise and the AGC. This example relates to another case in which zooming noise and peripheral noise or environmental noise of a rather low level are collected by the microphone. In this instance, since both of the levels of the zooming noise and the peripheral noise are low, both of the zooming noise and the peripheral noise are amplified at a fixed ratio by the AGC such that they are observed in the amplified form.

Figure 23:
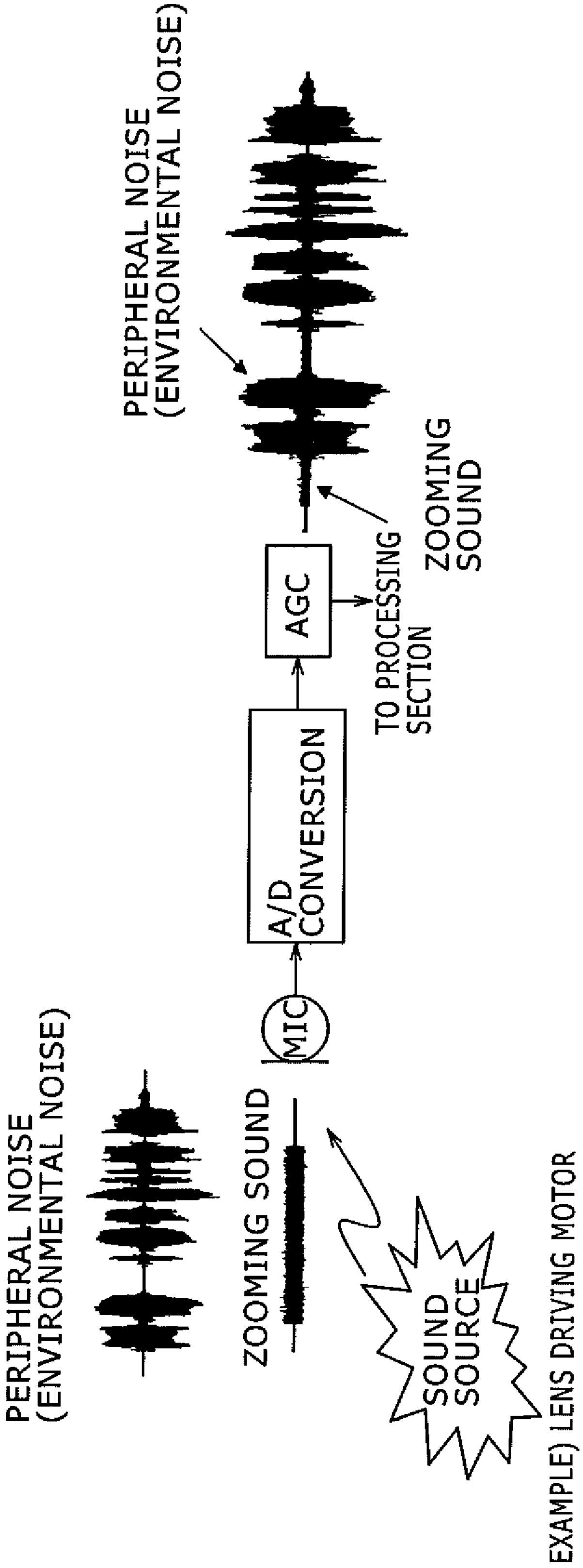
FIG. 23 is a similar view but illustrating an example of a relationship between zooming noise and AGC in the case where zooming noise and considerably high peripheral noise or environmental noise are collected by the microphone.

FIG. 23 illustrates a further example of the relationship between the zooming noise and the AGC. This example relates to a case in which zooming noise and peripheral noise or environmental noise of a considerably high level are collected by the microphone. In this instance, since the level of the peripheral noise is considerably high, the peripheral noise is observed in a compressed state. Together with this, also the zooming noise which originally has the low level is observed in a compressed state.

Figure 24:
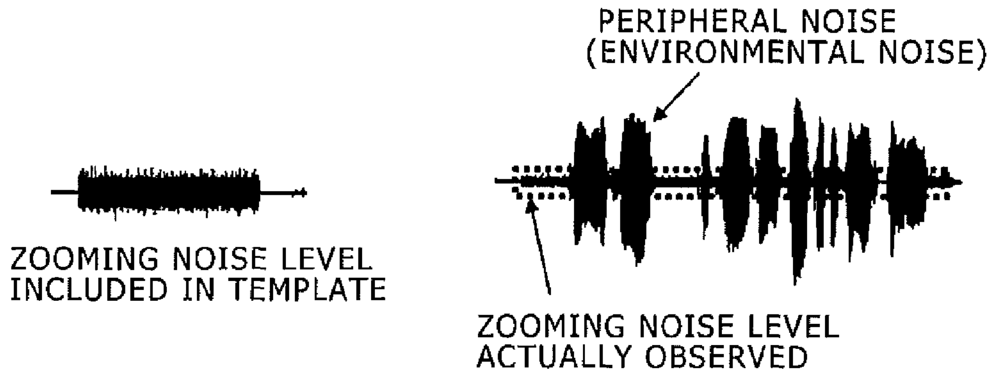
FIG. 24 is a diagrammatic view illustrating a disadvantage in the case where zooming noise provided in a template or noise table is used as it is to suppress zooming noise.

As described above, due to the AGC, zooming noise is sometimes observed in a compressed state (refer to FIG. 23) in comparison with that observed by itself (refer to FIG. 21) depending upon the peripheral noise or environmental noise. In such an instance, the zooming noise is observed at a level lower than the zooming noise level which a template, that is, the noise table, has as seen in FIG. 24. Therefore, in the case where the zooming noise which the template or noise table has is used as it is to suppress the zooming noise, the zooming noise is reduced by more than a necessary amount, and therefore, desired sound is degraded.

In this instance, there is a tendency that the level of all frequencies drops. Therefore, not a spectrum shape but a characteristic amount representative of the level is calculated to carry out generally uniform correction. Here, an average power is determined based on the frequency spectrum X(f, τ) of the input signal, and a correction coefficient common to the frequencies is acquired and used for correction so that the value thereof decreases as the average power increases.

Figure 25:
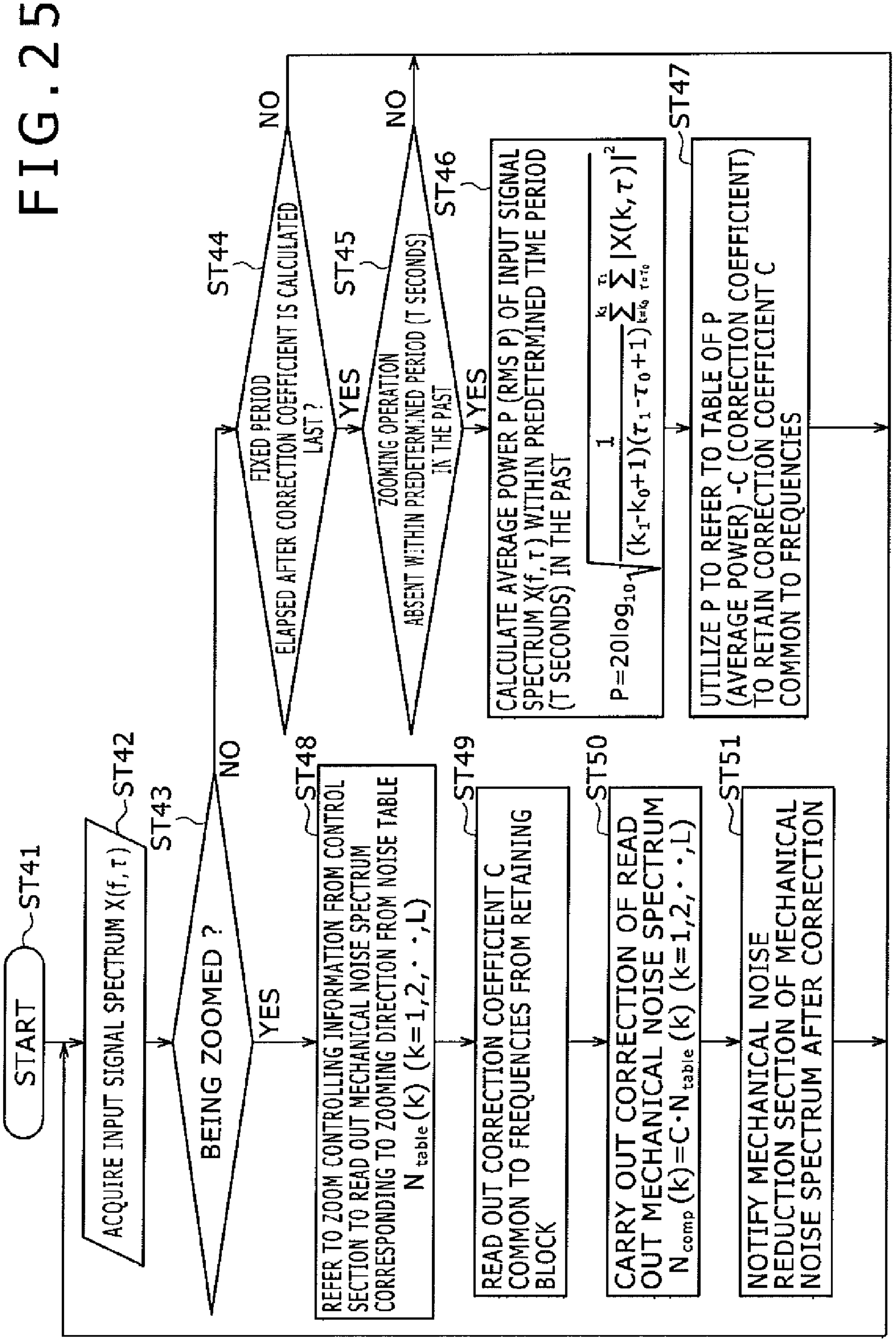
FIG. 25 is a flow chart illustrating an example of a detailed processing procedure of the noise table correction section in the case where a correction coefficient common to different frequencies is acquired and used for correction.

The flow chart of FIG. 25 illustrates an example of a detailed processing procedure of the noise table correction section 112 in the case where a correction coefficient common to frequencies is acquired and used for correction. Referring to FIG. 25, the noise table correction section 112 starts its processing at step ST41 and then advances the processing to step ST42. At step ST42, the noise table correction section 112 acquires a frequency spectrum X(f, τ) of an input signal from the Fourier transform section 105.

Then at step ST43, the noise table correction section 112 decides based on control information from the control section 201 whether or not a zooming operation is being carried out. In the case where a zooming operation is not being carried out, the noise table correction section 112 calculates a correction coefficient based on the frequency spectrum X(f, τ) of the input signal, which does not include a component of driving noise or mechanical noise of the motor 203. Therefore, when a zooming operation is not being carried out, the noise table correction section 112 advances the processing to step ST44 in order to calculate a correction coefficient.

At step ST44, the noise table correction section 112 decides whether or not a fixed period of time elapses after a correction coefficient is calculated last. If the fixed period of time does not elapse, then the noise table correction section 112 returns the processing to step ST42 immediately without calculating a correction coefficient. On the other hand, if the fixed period of time elapses, then the noise table correction section 112 advances the processing to step ST45.

At step ST45, the noise table correction section 112 decides whether or not a zoom operation is carried out within a predetermined period of time, that is, T seconds, in the past. This is because the noise table correction section 112 calculates a correction coefficient based on the frequency spectrum X(f, τ) of the input signal for a predetermined number of frames obtained in the predetermined period of time in the past. For example, the T seconds are 1 to 2 seconds. If a zooming operation is carried out within the predetermined period of time in the past, then the noise table correction section 112 returns the processing to step ST42 immediately without calculating a correction coefficient. On the other hand, if a zooming operation is not carried out within the predetermined period of time in the past, then the noise table correction section 112 advances the processing to step ST46.

At step ST46, the noise table correction section 112 calculates an average power or average energy P (logarithmic RMS P) of the frequency spectrum X(f, τ) of the input signal within the predetermined period of time in the past in accordance with the following expression (8):

$$P = 20\log_{10}\sqrt{\frac{1}{(k_l - k_o | 1)(\tau_l - \tau_o + 1)}\sum_{k=k0}^{k_1}\sum_{\tau=\tau_0}^{\tau_1}|X(k,\tau)|^2} \tag{8}$$

In this instance, for example, only frequency spectra X(f, τ) of frequencies in a frequency region of, for example, 1 to 4 kHz are used.

Figures 26, 27:
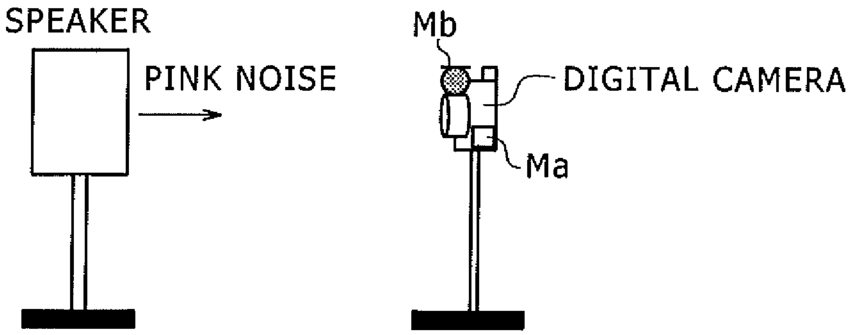
FIG. 26 is a view illustrating an example of a table representative of a corresponding relationship between an average power and a correction coefficient.
FIG. 27 is a view showing an example of an apparatus and illustrating a production method of the table indicative of a corresponding relationship between the average power and the correction coefficient.

Then at step ST47, the noise table correction section 112 utilizes the average power P calculated at step ST46 to refer to a table representative of a corresponding relationship between the average power P and the correction coefficient C to determine a correction coefficient C common to the frequencies and retains the correction coefficient C into the retaining block 132. FIG. 26 illustrates an example of the table indicative of the corresponding relationship between the average power P and the correction coefficient C. A production method of the table is hereinafter described. The noise table correction section 112 returns the processing to step ST42 after the process at step ST47.

When a zooming operation is carried out, the noise table correction section 112 reads out frequency spectrum information of mechanical noise from the noise table 107 and notifies the mechanical noise reduction section 106 of the corrected frequency spectrum information of the mechanical noise. Therefore, when a zooming operation is not carried out at step ST43, the noise table correction section 112 advances the processing to step ST48.

At step ST48, the noise table correction section 112 reads out frequency spectrum information Ntable(k) (k=1, 2, . . . , L) of the frequencies of mechanical noise corresponding to the zooming direction from the noise table 107 based on control information from the control section 201. Then, the noise table correction section 112 reads out the correction coefficient C common to the frequencies retained in the retaining block 132 at step ST49.

Then at step ST50, the noise table correction section 112 multiplies, for each frequency, the frequency spectrum information Ntable(k) (k=1, 2, . . . , L) of the frequencies of mechanical noise by the correction coefficient C to carry out correction. By the correction, corrected frequency spectrum information Ncomp(k)=C·Ntable(k) (k=1, 2, . . . , L) of the frequencies of mechanical noise is obtained. Then, the noise table correction section 112 notifies the mechanical noise reduction section 106 of the corrected frequency spectrum information Ncomp(k) (k=1, 2, . . . , L) of the frequencies of mechanical noise at step ST51. The noise table correction section 112 returns the processing to step ST42 after the process at step ST51.

If the corrected frequency spectrum information Ncomp(k) (k=1, 2, . . . , L) of the frequencies of mechanical noise conveyed to the mechanical noise reduction section 106 during a zooming operation fluctuates, then also the output sound similarly fluctuates unfavorably. Therefore, the processing procedure of the noise table correction section 112 in accordance with the flow chart of FIG. 25 described hereinabove is configured such that change of the correction coefficient C is inhibited during a zooming operation.

Figure 28A:
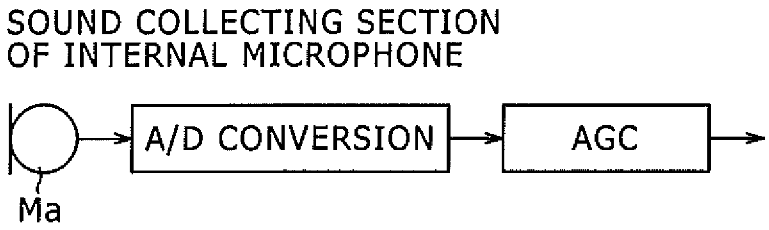
FIGS. 28A and 28B are block diagrams showing a configuration of sound collecting sections for an internal microphone and an external microphone, respectively, and illustrating a production method of the table indicative of a corresponding relationship between the average power and the correction coefficient.
Figure 28B:
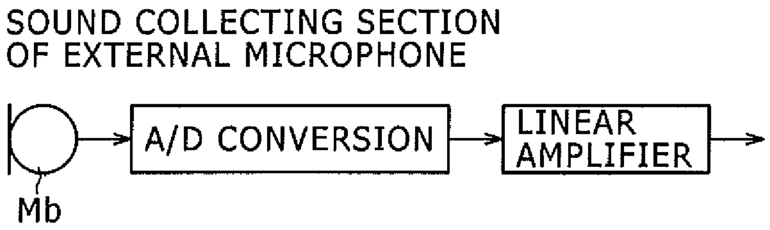

Production method of a table indicative of a corresponding relationship of the average power P and the correction coefficient C Here, an example of a method of producing the table indicative of a corresponding relationship of the average power P and the correction coefficient C (refer to FIG. 26) is described. Referring to FIG. 27, separately from an internal microphone Ma of a digital camera, an external microphone Mb is installed, in the digital camera. As regards a sound collecting section of the internal microphone Ma, an AGC circuit is provided at the succeeding stage as seen in FIG. 28A. On the other hand, as regards a sound collecting section of the external microphone Mb, a linear amplifier is provided at the succeeding stage in place of an AGC circuit as seen in FIG. 28B. In other words, as regards the sound collecting section of the external microphone Mb, amplification is carried out at a fixed ratio, and level compression is not carried out.

As seen in FIG. 27, for example, pink noise is reproduced from the speaker. In this instance, signals of various levels from a signal level at which the AGC circuit carries out only amplification to another signal level at which compression is carried out. Then, the reproduction level of the speaker and the observed signal level are plotted on a graph.

Figure 29:
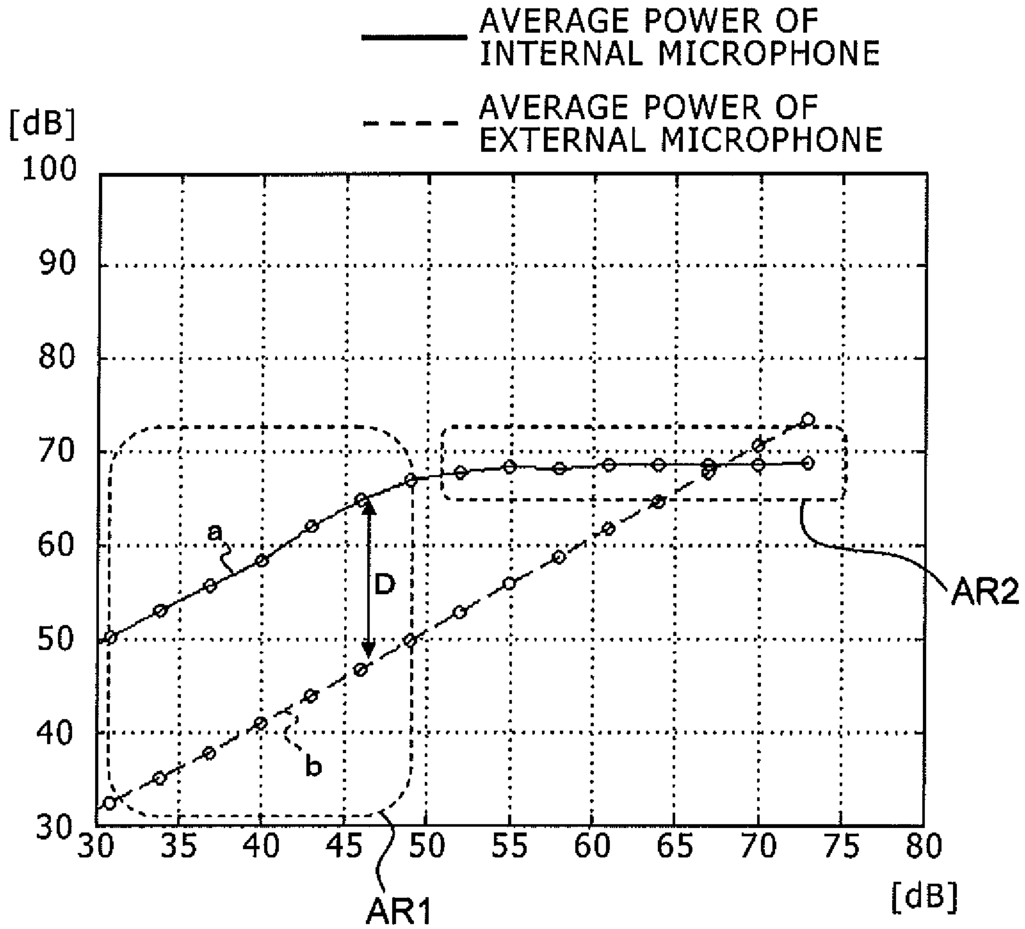
FIGS. 29 to 32 are diagrams illustrating production methods of tables each indicative of a corresponding relationship between an average power and a correction coefficient.

FIG. 29 shows an example of a plotted graph. Referring to FIG. 29, the axis of abscissa indicates a dB value of an average power of the reproduction signal of the speaker. The axis of ordinate indicates dB values of an average power of an observed signal of the internal microphone Ma and the external microphone Mb. A solid line a indicates an observed signal of the internal microphone Ma, and a broken line b indicates an observed signal of the external microphone Mb.

In a region, that is, in a linearly increasing region, in which the AGC carries out amplification at a fixed ratio as indicated by a broken line framework AR1, not only the observed signal of the internal microphone Ma but also the observed signal of the external microphone Mb increase at a fixed ratio. In a region indicated by a broken line framework AR2 in which level compression of the AGC occurs, that is, in a level compression region, although the observed signal of the external microphone Mb increases linearly, the observed signal of the internal microphone Ma is fixed.

Figure 30:
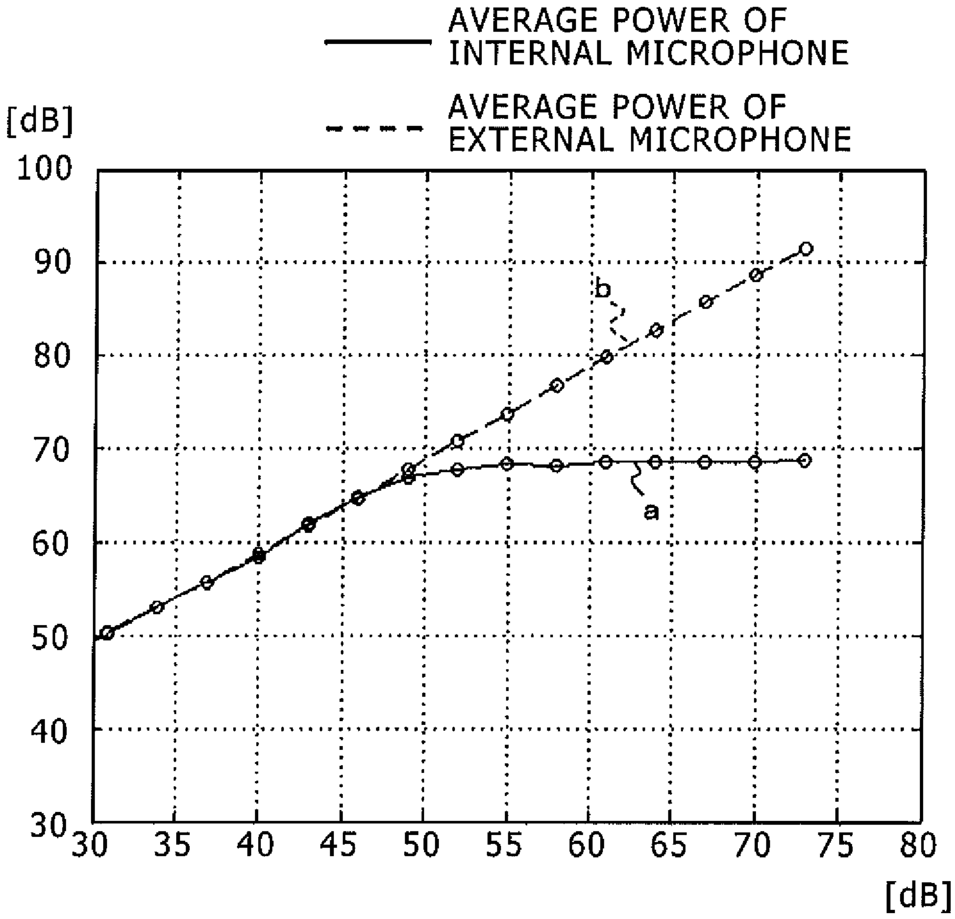

The difference D between the observed signal of the internal microphone Ma and the observed signal of the external microphone Mb in the linearly increasing region simply is a characteristic difference between the microphone and the amplifier at the succeeding stage. Therefore, if this portion is corrected, then the level difference in the case where level compression of the AGC is carried out can be seen. FIG. 30 illustrates a state in which the difference D between the observed signal of the internal microphone Ma and the observed signal of the external microphone Mb in the linearly increasing region is corrected.

Figure 31:
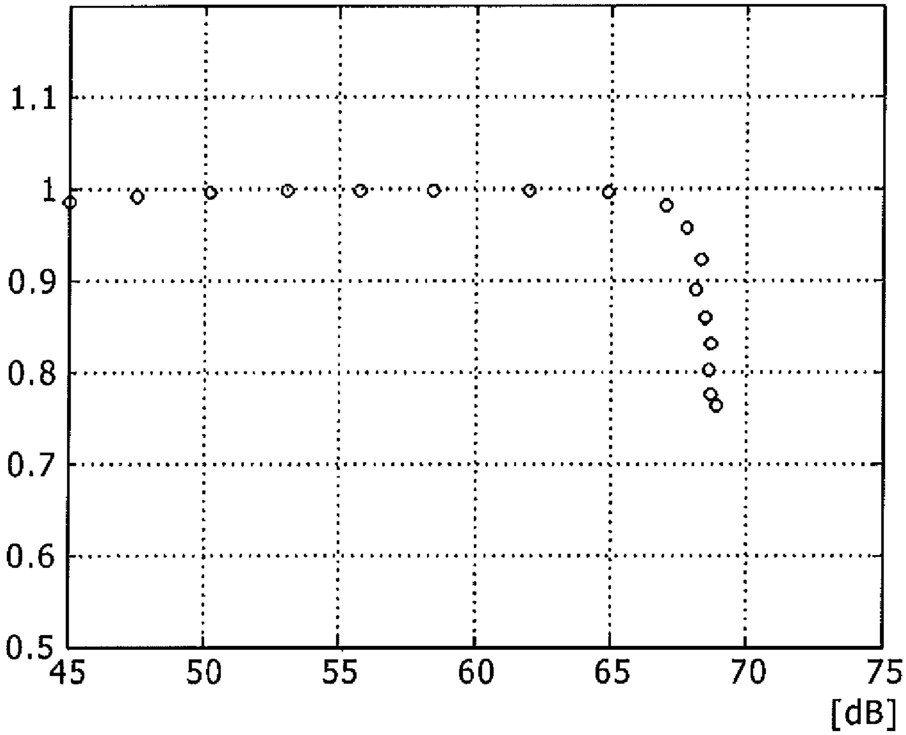

If the difference in power or energy between the observed signal of the internal microphone Ma and the observed signal of the external microphone Mb is represented by a ratio based on FIG. 30, then such a graph as illustrated in FIG. 31 is obtained. Referring to FIG. 31, the axis of abscissa indicates a dB value of an average power of the internal microphone Ma. The axis of ordinate indicates a ratio in power, that is, a ratio of the average power of the internal microphone Ma to the average power of the external microphone Mb.

Figure 32:
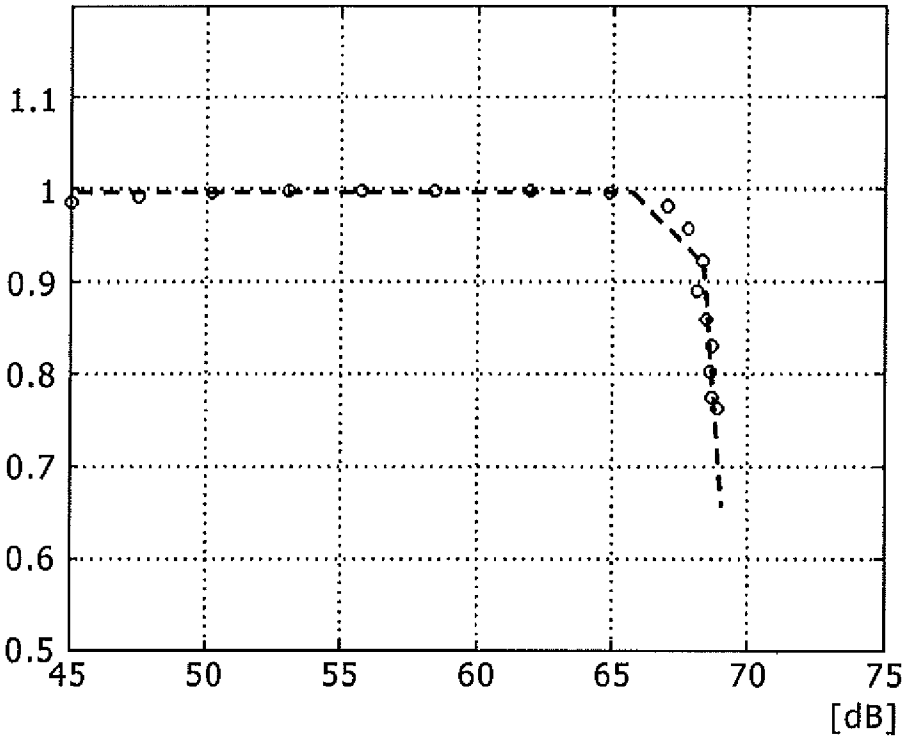

By linearly interpolating discrete data illustrated in FIG. 31, such level compression values of the AGC in the dB domain as illustrated in FIG. 32 can be obtained. The table illustrating a corresponding relationship between the average power P and the correction coefficient C illustrated in FIG. 26 is produced from a relationship between the average power (axis of abscissa) of the internal microphone Ma and the ratio (axis of ordinate) in average power illustrated in FIG. 32. In this instance, the average power of the internal microphone Ma corresponds to the average power P of the table, and the ratio in average power corresponds to the correction coefficient C.

It is to be noted that, in the processing procedure of the noise table correction section 112 in accordance with the flow chart of FIG. 25 described hereinabove, an average power P (logarithmic RMS P) of the frequency spectrum X(f, τ) of the input signal within the predetermined period of time in the past is calculated at step ST46. In short, the average power P of the input signal is acquired by signal processing in the frequency domain.

However, also it seems a possible idea to otherwise use a sample x(t) of the time domain of the input signal within the predetermined period of time in the past to calculate an average power P, that is, a logarithmic RMS P, in accordance with an expression similar to the expression (8) and utilize the average power P to obtain a correction coefficient C. In this instance, the average power P of the input signal is acquired by signal processing of the time domain.

Referring back to FIG. 11, the noise table correction section 112 corrects the frequency spectrum information |N(f, τ)|2 of mechanical noise stored in the noise table 107 based on the frequency spectrum X(f, τ) of the input signal obtained by the Fourier transform section 105. Then, the noise table correction section 112 notifies the mechanical noise reduction section 106 of the corrected frequency spectrum information |N'(f, τ)|2 of mechanical noise.

The mechanical noise reduction section 106 uses the corrected frequency spectrum information |N'(f, τ)|2 of mechanical noise to correct the frequency spectrum X(f, τ) obtained by the Fourier transform section 105 to suppress the mechanical noise. In particular, the mechanical noise reduction section 106 of the sound system 100 shown in FIG. 1 uses the frequency spectrum information |N(f, τ)|2 of mechanical noise read out from the noise table 107 as it is. However, the mechanical noise reduction section 106 of the sound system 100A shown in FIG. 11 uses the frequency spectrum information |N'(f, τ)|2 of mechanical noise corrected by the noise table correction section 112. In the sound system 100A shown in FIG. 11, the configuration of the other part is similar to that of the sound system 100 shown in FIG. 1.

Operation of the sound system 100A of the imaging apparatus which includes a video shooting function with sound shown in FIG. 11 during video shooting is described briefly. The microphone 101 collects peripheral noise to obtain a sound signal. This sound signal is converted from an analog signal into a digital signal by the A/D converter 102 and is supplied to the framing section 104 through the AGC circuit 103. The framing section 104 divides an output sound signal of the AGC circuit 103 into frames of a predetermined time length in order to carry out processing for each frame.

The framed signals of frames obtained by the framing section 104 are successively supplied to the Fourier transform section 105. The Fourier transform section 105 carries out a fast Fourier transform (TFT) process for the framed signals to convert them into a frequency spectrum X(f, τ) of the frequency domain. This frequency spectrum X(f, τ) is supplied to the spectrum changeover section 108, mechanical noise reduction section 106 and noise table correction section 112.

The mechanical noise reduction section 106 carries out, during a zooming operation, a mechanical noise reduction process based on zoom controlling information, that is, presence or absence of zooming and the zooming direction, from the control section 201. In this instance, the mechanical noise reduction section 106 multiplies the frequency spectrum X(f, τ) by the gain function G(f, τ) to obtain a frequency spectrum Y(f, τ) corrected such that mechanical noise, that is, driving noise of the motor 203, is suppressed. This frequency spectrum Y(f, τ) is supplied to the spectrum changeover section 108.

The noise table correction section 112 corrects the frequency spectrum information |N(f, τ)|2 of mechanical noise stored in the noise table 107 based on the frequency spectrum X(f, τ) of the input signal obtained by the Fourier transform section 105. In particular, the frequency spectrum information |N(f, τ)|2 of mechanical noise is corrected with the correction coefficient obtained based on the information regarding the input signal such as a frequency characteristic, power and so forth. The mechanical noise reduction section 106 is notified of and uses the corrected frequency spectrum information |N'(f, τ)|2 of mechanical noise.

When a zooming operation is not being carried out, the spectrum changeover section 108 selects the frequency spectrum X(f, τ) supplied from the Fourier transform section 105. This is because, at this time, the motor 203 is not driven and the frequency spectrum X(f, τ) does not include a component of mechanical noise, that is, driving noise of the motor 203. On the other hand, when a zooming operation is being carried out, the spectrum changeover section 108 selects the frequency spectrum Y(f, τ) obtained by the mechanical noise reduction section 106 and corrected so as to suppress the mechanical noise, that is, driving noise of the motor 203.

The frequency spectrum X(f, τ) or the frequency spectrum Y(f, τ) from the spectrum changeover section 108 is supplied to the inverse Fourier transform section 109. The inverse Fourier transform section 109 carries out an inverse fast Fourier transform (IFFT) process for the frequency spectrum outputted from the spectrum changeover section 108 for each frame to restore framed signals of the time domain.

The framed signals are supplied to the waveform synthesis section 110. The waveform synthesis section 110 synthesizes the framed signals of the frames to restore a sound signal which is continuous in a time series. This sound signal is supplied to the recording section 111. The recording section 111 records the sound signal supplied from the waveform synthesis section 110 into a recording medium such as a disk or a memory, for example, together with an image signal obtained by the image system.

As described hereinabove, in the sound system 100A of the imaging apparatus including a video shooting function with sound shown in FIG. 11, when a zooming operation is being carried out, the mechanical noise reduction section 106 carries out a mechanical noise reduction process. The spectrum changeover section 108 selects the frequency spectrum Y(f, τ) corrected so as to suppress mechanical noise, that is, the driving noise of the motor 203. Therefore, when a zooming operation is being carried out, a sound signal whose mechanical noise, which is driving noise of the motor 203, is suppressed can be recorded.

Further, in the sound system 100A shown in FIG. 11, the mechanical noise reduction section 106 carries out correction of the frequency spectrum by multiplying, for each frequency, the frequency spectrum X(f, τ) of the input signal by the gain read out from the gain function table 121. In this instance, the gain function G(f, τ) to be stored into the gain function table 121 can be set freely in an arbitrary form. In other words, while the dispersion of mechanical noise exhibits various characteristics, a gain function G(f, τ) suitable for each characteristic can be set in the gain function table 121. Consequently, a fixed noise reduction effect can be implemented by a simple and easy configuration irrespective of a dispersion in mechanical noise among different individuals, and an output of high quality can be obtained.

Further, in the sound system 100A shown in FIG. 11, the mechanical noise reduction section 106 does not use the frequency spectrum information |N(f, τ)|2 of mechanical noise stored in the noise table 107 as it is. In particular, the noise table correction section 112 uses the frequency spectrum information |N(f, τ)|2 of mechanical noise corrected based on the information regarding the input signal such as a frequency characteristic, power and so forth. Therefore, excessive suppression of suppressing also mechanical noise which is not actually perceived can be prevented from being carried out, and degradation of desired sound by excessive suppression can be prevented. In other words, mechanical noise can be reduced while degradation of desired sound of the user is suppressed to the utmost in response to a surrounding environment.

<3. Third Embodiment>

Figure 33:
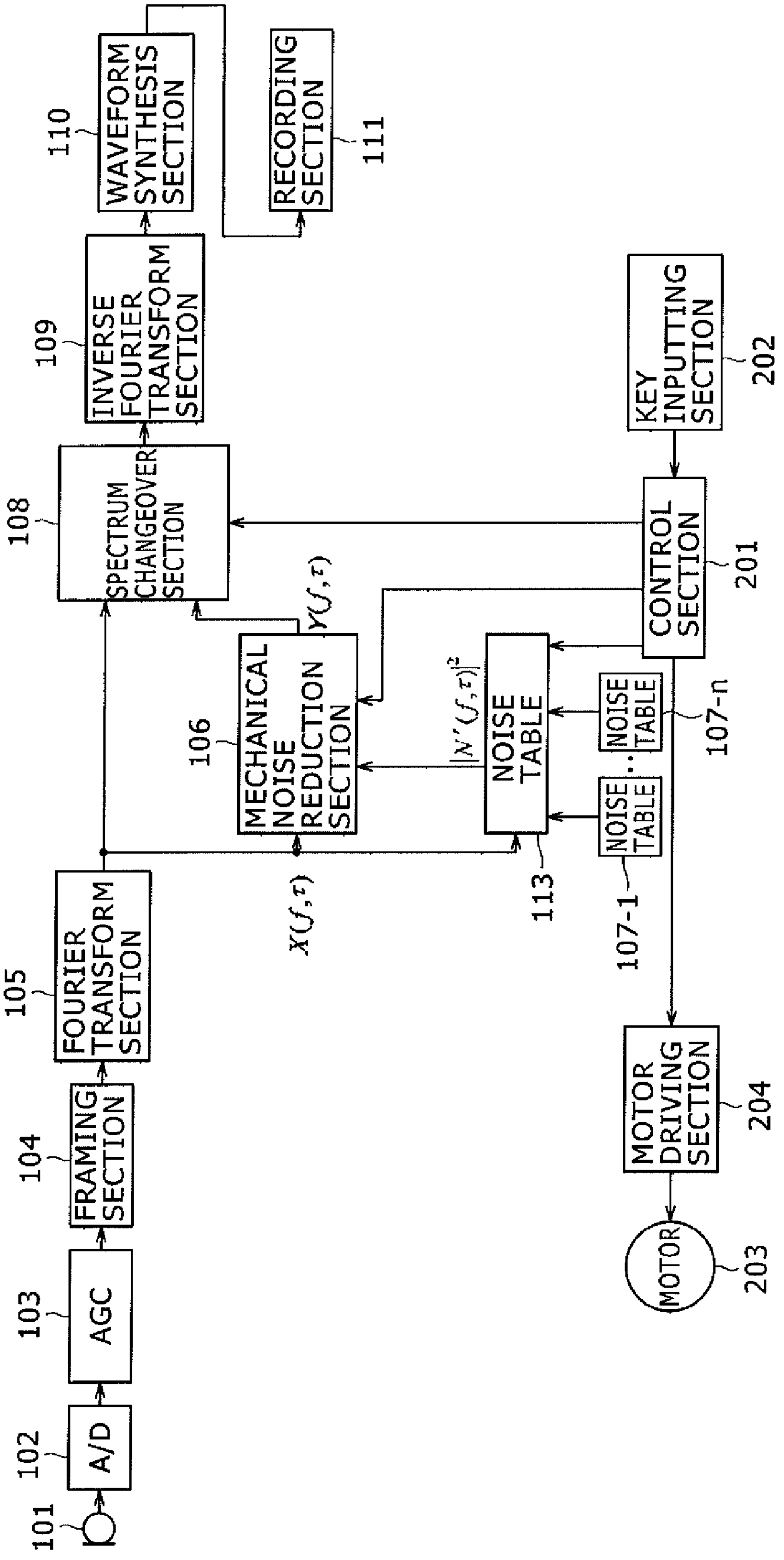
FIG. 33 is a block diagram showing an example of a configuration of a sound system of an imaging apparatus which includes a video shooting function with sound according to a third embodiment of the disclosure.

Sound system of an imaging apparatus including a video shooting function with sound FIG. 33 shows an example of a configuration of a sound system 100B of an imaging apparatus which includes a video shooting function with sound according to a third embodiment of the present disclosure. The sound system 100B includes several common components to those of the sound system 100 and the sound system 100A described hereinabove with reference to FIGS. 1 and 11, respectively.

Referring to FIG. 33, the sound system 100B shown includes a microphone 101, an A/D converter 102, an AGC (Automatic Gain Control) circuit 103, a framing section 104, and a Fourier transform section 105. The sound system 100B further includes a mechanical noise reduction section 106, noise tables 107-1 to **107-*n*, a noise table changeover section 113, a spectrum changeover section 108, an inverse Fourier transform section 109, a waveform synthesis section 110, and a recording section 111**.

The noise tables 107-1 to **107-*n* have corrected frequency spectrum information |Ni(f, τ)|2 (i=1, 2, . . . , n) of mechanical noise stored therein. The corrected frequency spectrum information |Ni(f, τ)|2 (i=1, 2, . . . , n) is corrected in advance with the values Ci (i=1, 2, . . . , n) of the correction coefficients C of a P (average power P)—C (correction coefficient) table (refer to FIG. 26). When the frequency spectrum information of mechanical noise collected in advance, which corresponds to driving noise of the motor 203**, is |N(f, τ)|2, |Ni(f, τ)|2 (i=1, 2, . . . , n) is represented by |Ni(f, τ)|2=Ci·|N(f, τ)|2.

It is to be noted that driving noise generated by the motor 203 is different depending upon a zooming operation in the telephoto direction and a zooming operation in the wide-angle direction. Therefore, in the noise tables 107-1 to **107-*n***, corrected frequency spectrum information of mechanical noise which corresponds to zooming operations in the telephoto direction and the wide-angle direction is stored.

The noise table changeover section 113 determines a noise table to be used by the mechanical noise reduction section 106, that is, a used noise table, to read out corrected frequency spectrum information of mechanical noise from among the noise tables 107-1 to **107-*n*. The noise table changeover section 113 carries out the determination of a used noise table based on the frequency spectrum X(f, τ) of the input signal obtained by the Fourier transform section 105. Then, the noise table changeover section 113 reads out the corrected frequency spectrum information of mechanical noise from the thus determined used noise table and notifies the mechanical noise reduction section 106 of the read out frequency spectrum information. This noise table changeover section 113** configures a spectrum information changing section.

In this instance, the noise table changeover section 113 carries out a noise table changeover process based on the zoom controlling information from the control section 201 such as presence or absence of zooming and the zooming direction. Upon a zooming operation, the noise table changeover section 113 carries out a noise table changeover process upon driving of the motor 203. On the other hand, upon a zooming operation in the telephoto direction or the wide-angle direction, the noise table changeover section 113 reads out frequency spectrum information corresponding to the direction from the determined used noise table and notifies the mechanical noise reduction section 106 of the frequency spectrum information.

Figure 34:
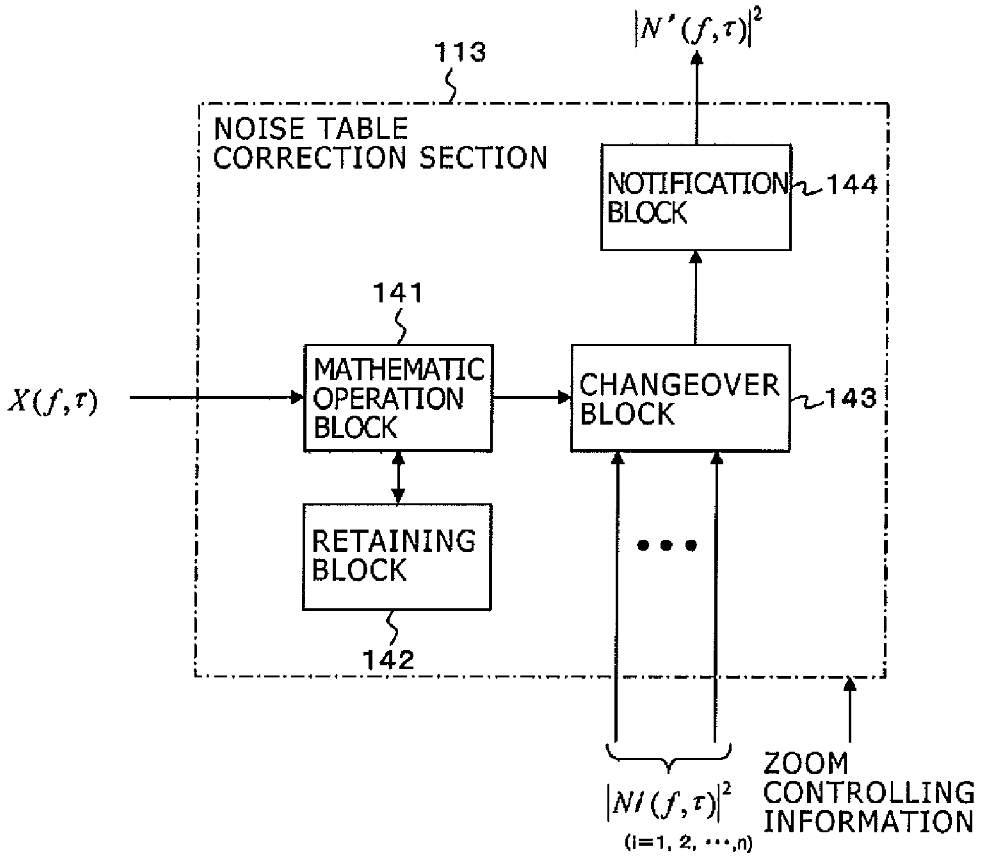
FIG. 34 is a block diagram showing an example of a configuration of a noise table changeover section provided in the sound system.

FIG. 34 shows an example of a configuration of the noise table changeover section 113. Referring to FIG. 34, the noise table changeover section 113 includes a mathematic operation block 141, a retaining block 142, a changeover block 143 and a notification block 144. The mathematic operation block 141 determines an average power P of the frequency spectrum X(f, τ) of the input signal. Then, the mathematic operation block 141 refers to the P-C table (refer to FIG. 26) to acquire a value of the correction coefficient C corresponding to the average power P and determines a noise table in which frequency spectrum information of mechanical noise corrected with this value is stored as the used noise table.

It is to be noted that it seems a possible idea to produce in advance a table indicative of a relationship between the average power P and a used noise table. In this instance, the mathematic operation block 141 can simply determine a used noise table based on the table.

The retaining block 142 retains data necessary for a mathematic operation process by the mathematic operation block 141 or used noise table information as a result of such mathematic operation. The changeover block 143 changes over the noise table from which corrected frequency spectrum information of mechanical noise is to be read out to a noise table indicated by the used noise table information retained in the retaining block 142. The notification block 144 reads out the corrected frequency spectrum information |N'(f, τ)|2 of mechanical noise from the noise table changed over by the changeover block 143 and notifies the mechanical noise reduction section 106 of the frequency spectrum information τ)|2. The mechanical noise reduction section 106 uses the corrected frequency spectrum information |N'(f, τ)|2 of mechanical noise conveyed from the noise table changeover section 113 in this manner.

Figure 35:
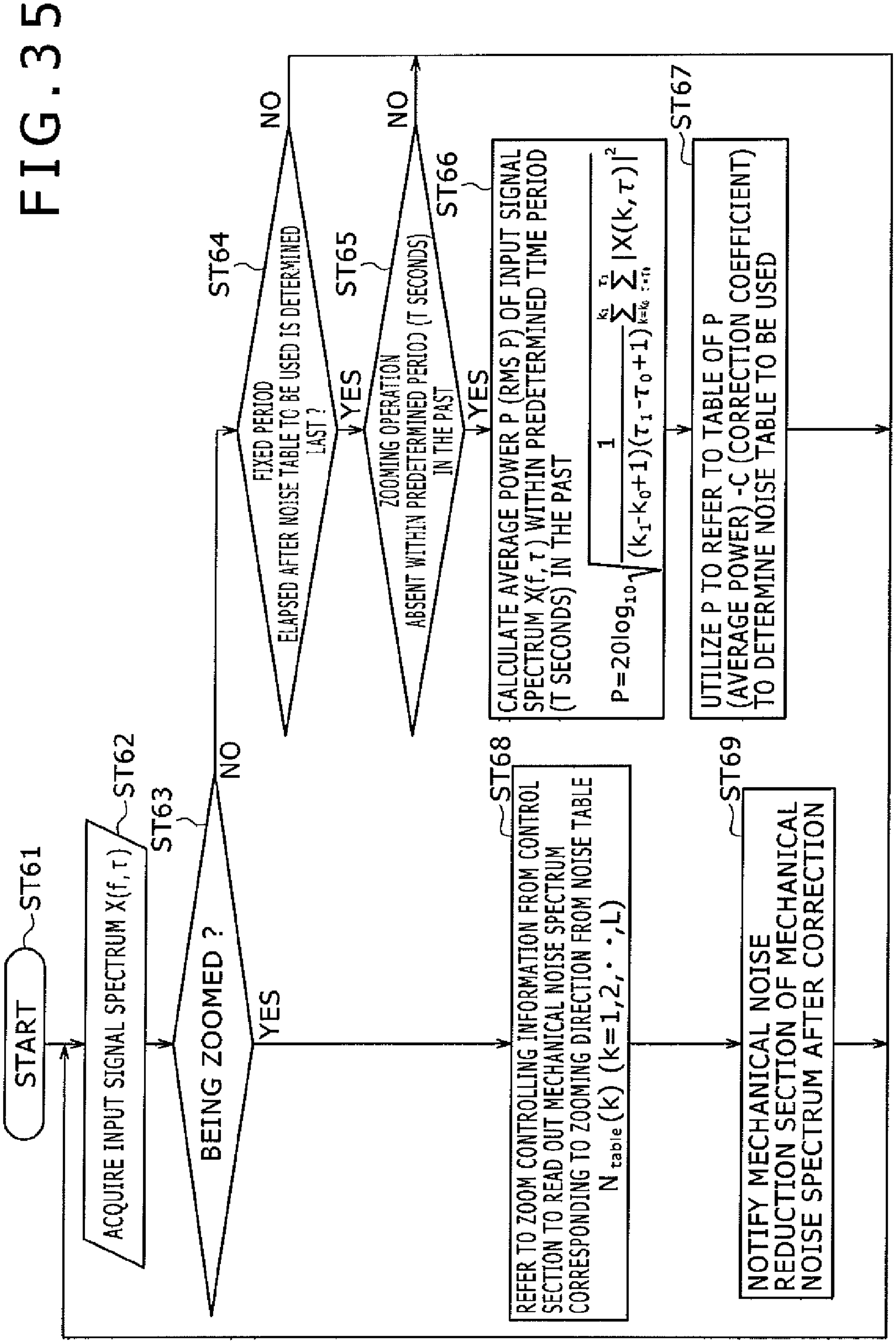
FIG. 35 is a flow chart illustrating an example of a detailed processing procedure of the noise table changeover section.

The flow chart of FIG. 35 illustrates an example of a detailed processing procedure of the noise table changeover section 113. Referring to FIG. 35, the noise table changeover section 113 starts its processing at step ST61 and then advances the processing to step ST62. At step ST62, the noise table changeover section 113 acquires a frequency spectrum X(f, τ) of an input signal from the Fourier transform section 105.

Then at step ST63, the noise table changeover section 113 decides based on control information from the control section 201 whether or not a zooming operation is being carried out. If a zooming operation is not being carried out, then the noise table changeover section 113 determines a used noise table based on the frequency spectrum X(f, τ) of the input signal which does not include a component of driving noise or mechanical noise of the motor 203. Therefore, when a zooming operation is not being carried out, the noise table changeover section 113 advances the processing to step ST64 in order to calculate a correction coefficient.

At step ST64, the noise table changeover section 113 decides whether or not a fixed period of time elapses after a used noise table was determined last. If the fixed period of time does not elapse, then the noise table changeover section 113 returns the processing to step ST62 immediately without determining a used noise table. On the other hand, if the fixed period of time elapses, then the noise table changeover section 113 advances the processing to step ST65.

At step ST65, the noise table changeover section 113 decides whether or not a zooming operation has been carried out within a predetermined period of time, that is, within T seconds, in the past. This is because the noise table changeover section 113 determines a used noise table based on the frequency spectrum X(f, τ) of the input signal of a predetermined number of frames obtained within the predetermined period of time in the past. For example, the T seconds are 1 to 2 seconds. If a zooming operation has been carried out within the predetermined period of time in the past, then the noise table changeover section 113 returns the processing to step ST62 immediately without determining a used noise table. On the other hand, if a zooming operation has not been carried out within the predetermined period of time in the past, then the noise table changeover section 113 advances the processing to step ST66.

At step ST66, the noise table changeover section 113 calculates an average power or average energy P (logarithmic RMS P) of the frequency spectrum X(f, τ) of the input signal within the predetermined period of time in the past in accordance with the following expression (9):

$$P = 20\log_{10}\sqrt{\frac{1}{(k_l - k_o + 1)(\tau_l - \tau_o + 1)}\sum_{k=k0}^{k_1}\sum_{\tau=\tau_0}^{\tau_1}|X(k,\tau)|^2} \tag{9}$$

In this instance, only the frequency spectrum X(f, τ) of frequencies in the frequency domain of, for example, 1 to 4 kHz is used.

Then at step ST67, the noise table changeover section 113 utilizes the average power P calculated at step ST66 to refer to the table (refer to FIG. 26) indicative of a corresponding relationship between the average power P and the correction coefficient C to acquire a value of the correction coefficient C. Then at step ST67, the noise table changeover section 113 determines a noise table in which frequency spectrum information of mechanical noise corrected with the value of this correction coefficient C is stored is determined as the used noise table. The noise table changeover section 113 returns the processing to step ST62 after the process at step ST67.

When a zooming operation is being carried out, the noise table changeover section 113 reads out corrected frequency spectrum information of mechanical noise from the used noise table from among the noise tables 107-1 to **107-*n* and notifies the mechanical noise reduction section 106 of the frequency spectrum information. Therefore, when a zooming operation is not being carried out at step ST63, the noise table changeover section 113 advances the processing to step ST68**.

At step ST68, the noise table changeover section 113 reads out corrected frequency spectrum information Ntable(k) (k=1, 2, . . . , L) for the frequencies of mechanical noise corresponding to the zooming direction from the used noise table based on controlling information from the control section 201. Then at step ST69, the noise table changeover section 113 notifies the mechanical noise reduction section 106 of the read out corrected frequency spectrum information Ntable(k) (k=1, 2, . . . , L) for the frequencies of mechanical noise. The noise table changeover section 113 returns the processing to step ST62 after the process at step ST69.

If the corrected frequency spectrum information Ntable(k) (k=1, 2, . . . , L) for the frequencies of mechanical noise conveyed to the mechanical noise reduction section 106 fluctuates during a zooming operation, then also the output sound similarly fluctuates unfavorably. Therefore, in the processing procedure of the noise table changeover section 113 in accordance with the flow chart of FIG. 35 described hereinabove, change of the used noise table is inhibited during a zooming operation.

It is to be noted that, in the processing procedure of the noise table changeover section 113 in accordance with the flow chart of FIG. 35 described hereinabove, an average power P (logarithmic RMS P) of the frequency spectrum X(f, τ) of the input signal within the predetermined period of time in the past is calculated at step ST66. In short, the average power P of the input signal is acquired by signal processing in the frequency domain.

However, also it may seem a possible idea to otherwise use samples x(t) in the time domain of the input signal within the predetermined period of time in the past to calculate an average power P (logarithmic RMS P) in accordance with an expression similar to the expression (9) and utilize the average power P to determine a used noise table. In this instance, the average power P of the input signal is acquired by signal processing in the time domain.

Referring back to FIG. 33, the noise table changeover section 113 determines a used noise table for reading out corrected frequency spectrum information of mechanical noise to be used by the mechanical noise reduction section 106 from among the noise tables 107-1 to **107-*n* as described hereinabove. Then, the noise table changeover section 113 reads out the corrected frequency spectrum information |N'(f, τ)|2 of mechanical noise from the used noise table and notifies the mechanical noise reduction section 106** of the corrected frequency spectrum information |N'(f, τ)|2 of mechanical noise.

The mechanical noise reduction section 106 uses the corrected frequency spectrum information |N'(f, τ)|2 of mechanical noise to correct the frequency spectrum X(f, τ) obtained by the Fourier transform section 105 to suppress the mechanical noise. In particular, the mechanical noise reduction section 106 of the sound system 100A shown in FIG. 11 uses the frequency spectrum information |N'(f, τ)|2 of mechanical noise corrected by the noise table correction section 112. However, the mechanical noise reduction section 106 of the sound system 100B shown in FIG. 33 uses the corrected frequency spectrum information |N'(f, τ)|2 of mechanical noise read out from the used noise table. In the sound system 100B shown in FIG. 33, the other part is configured similarly to those of the sound systems 100 and 100A shown in FIGS. 1 and 11.

Operation of the sound system 100B of the imaging apparatus including a video shooting function with sound shown in FIG. 33 during video shooting is described. The microphone 101 collects peripheral noise to produce a sound signal. The sound signal is converted from an analog signal into a digital signal by the A/D converter 102 and is supplied to the framing section 104 through the AGC circuit 103. The framing section 104 divides the output sound signal from the AGC circuit 103 into frames of a predetermined time length in order to carry out processing for each frame.

The framed signals of frames obtained by the framing section 104 are successively supplied to the Fourier transform section 105. The Fourier transform section 105 carries out a fast Fourier transform (FFT) process for the framed signals to convert them into a frequency spectrum X(f, τ) of the frequency domain. The frequency spectrum X(f, τ) is supplied to the spectrum changeover section 108, mechanical noise reduction section 106 and noise table changeover section 113.

The mechanical noise reduction section 106 carries out, during a zooming operation, a mechanical noise reduction process based on zooming controlling information such as presence or absence of zooming or the zooming direction from the control section 201. In this instance, the mechanical noise reduction section 106 multiplies the frequency spectrum X(f, τ) by the gain function G(f, τ) to obtain a frequency spectrum Y(f, τ) corrected so as to suppress mechanical noise or driving noise of the motor 203. The frequency spectrum Y(f, τ) is supplied to the spectrum changeover section 108.

The noise table changeover section 113 determines a used noise table for reading out corrected frequency spectrum information of mechanical noise to be used by the mechanical noise reduction section 106 from among the noise tables 107-1 to **107-*n*. This determination is carried out based on the average power P of the input signal obtained by the Fourier transform section 105. The mechanical noise reduction section 106 is notified of and uses the corrected frequency spectrum information |N'(f, τ)|2 of mechanical noise read out from the used noise table from the noise table changeover section 113**.

When a zooming operation is not being carried out, the spectrum changeover section 108 selects the frequency spectrum X(f, τ) supplied from the Fourier transform section 105. This is because, at this time, the motor 203 is not in a driven state, the frequency spectrum X(f, τ) does not include a component of mechanical noise, that is, driving noise of the motor 203. On the other hand, when a zooming operation is being carried out, the spectrum changeover section 108 selects the frequency spectrum Y(f, τ) corrected so as to suppress the mechanical noise, that is, driving noise of the motor 203, obtained by the mechanical noise reduction section 106.

The frequency spectrum X(f, τ) from the spectrum changeover section 108 or the corrected frequency spectrum Y(f, τ) is supplied to the inverse Fourier transform section 109. The inverse Fourier transform section 109 carries out, for each frame, an inverse fast Fourier transform (IFFT) process for the frequency spectrum outputted from the spectrum changeover section 108 to restore framed signals of the time domain.

The framed signals are supplied to the waveform synthesis section 110. The waveform synthesis section 110 synthesizes the framed signals of frames to restore a sound signal which is continuous in a time series. The sound signal is supplied to the recording section 111. The recording section 111 records the sound signal supplied thereto from the waveform synthesis section 110 on a recording medium such as a disk or a memory, for example, together with an image signal obtained by the image system.

As described hereinabove, in the sound system 100B of the imaging apparatus including a video shooting function with sound shown in FIG. 33, when a zooming operation is being carried out, the mechanical noise reduction section 106 carries out a mechanical noise reduction process. Further, in the sound system 100B, when a zooming operation is being carried out, the spectrum changeover section 108 selects a frequency spectrum Y(f, τ) corrected so as to suppress mechanical noise, that is, driving noise of the motor 203. Therefore, when a zooming operation is being carried out, a sound signal whose mechanical noise, which is driving noise of the motor 203, is suppressed can be recorded.

Further, in the sound system 100B shown in FIG. 33, the mechanical noise reduction section 106 multiplies a frequency spectrum X(f, τ) of an input signal by a gain read out from the gain function table 121 to carry out correction of the frequency spectrum. In this instance, the gain function G(f, τ) to be stored into the gain function table 121 can be set freely in an arbitrary form. In particular, while a dispersion of mechanical noise exhibits various characteristics, a gain function G(f, τ) suitable for each characteristic can be set to the gain function table 121. Consequently, a fixed noise reduction effect can be implemented by a simple and easy configuration irrespective of a dispersion in mechanical noise among different individuals, and an output of high quality can be obtained.

Further, in the sound system 100B shown in FIG. 33, the mechanical noise reduction section 106 uses the corrected frequency vector information |N(f, τ)|2 of mechanical noise read out from the used noise table determined based on the average power of the input signal. Therefore, excessive suppression of suppressing also mechanical noise which is not actually perceived can be prevented from being carried out, and degradation of desired sound by excessive suppression can be prevented. In other words, mechanical noise can be reduced while degradation of desired sound of the user is suppressed to the utmost in response to a surrounding environment.

<4. Modifications>

It is to be noted that, in the embodiments described hereinabove, the spectrum changeover section 108 is provided. When a zooming operation is not being carried out, the spectrum changeover section 108 reads out a frequency spectrum X(f, τ) from the Fourier transform section 105, but when a zooming operation is being carried out, the spectrum changeover section 108 extracts a corrected frequency spectrum Y(f, τ) from the mechanical noise reduction section 106.

However, if the mechanical noise reduction section 106 controls the gain function G(f, τ) for the multiplication with the frequency spectrum X(f, τ) to "1" when a zooming operation is not being carried out, then the output frequency spectrum Y(f, τ) of the mechanical noise reduction section 106 can always be used. In this instance, the output frequency spectrum Y(f, τ) of the mechanical noise reduction section 106 is supplied directly to the inverse Fourier transform section 109, and the spectrum changeover section 108 can be eliminated.

Figure 37:
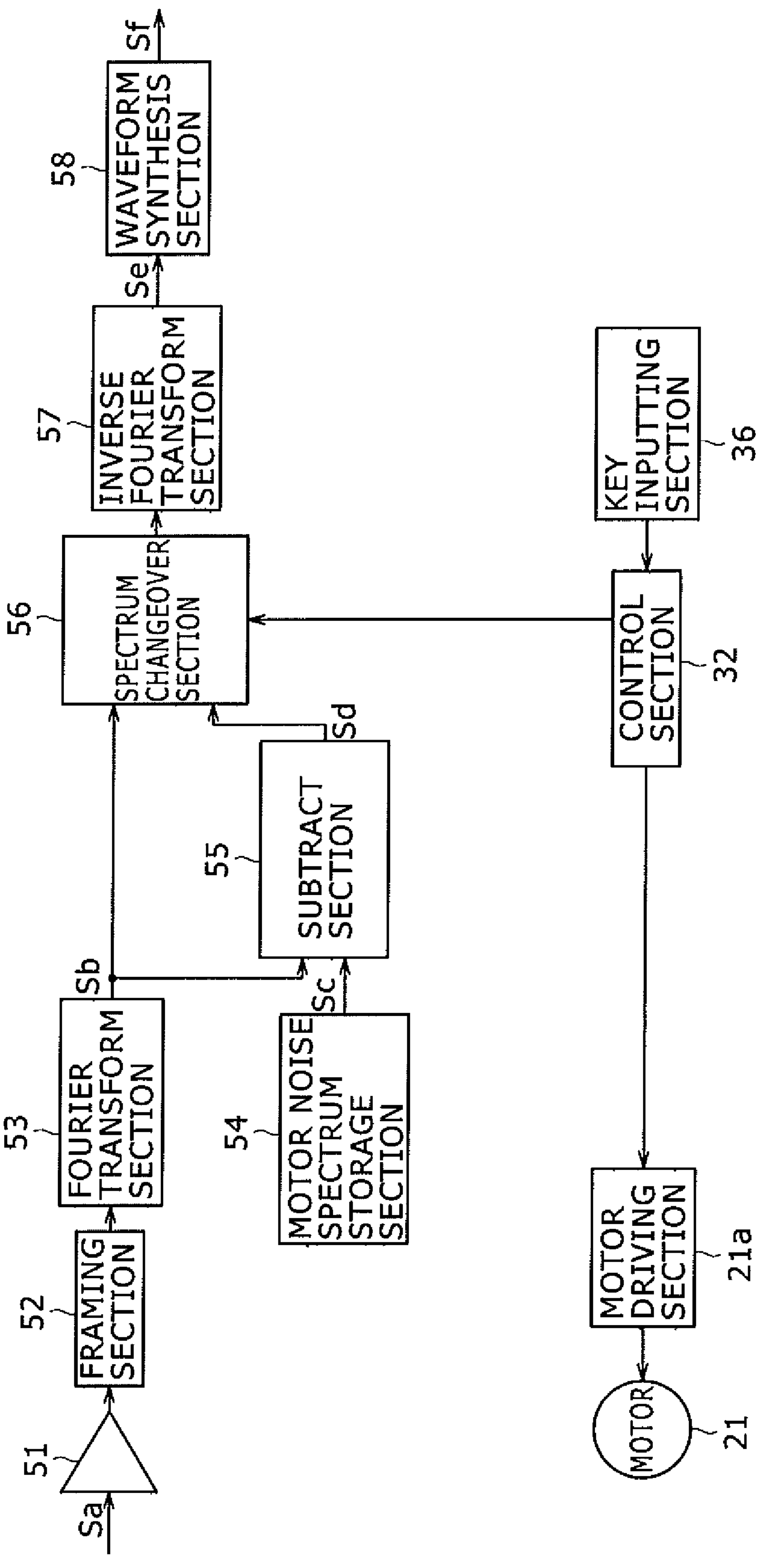
FIG. 37 is a block diagram showing an example of a configuration of a sound recording apparatus in the past having a noise removing function.
Figure 38:
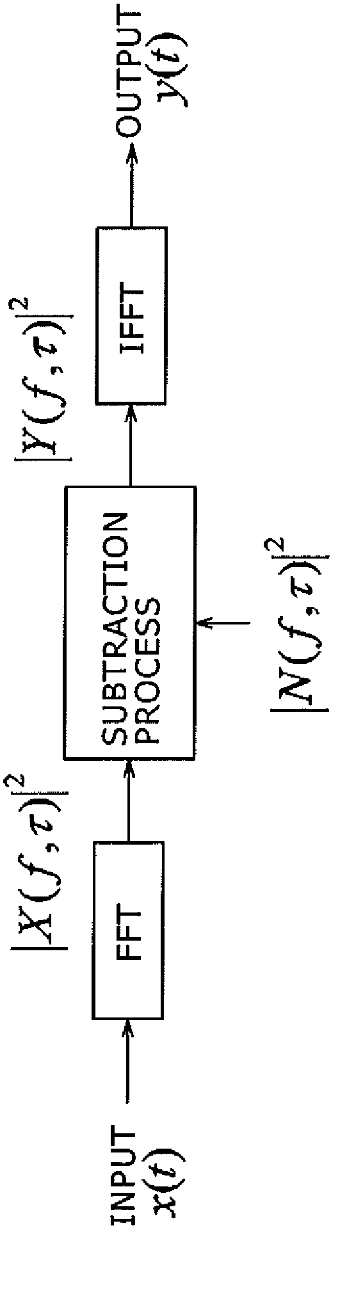
FIG. 38 is a block diagram illustrating a spectral subtraction method.
Figure 39:
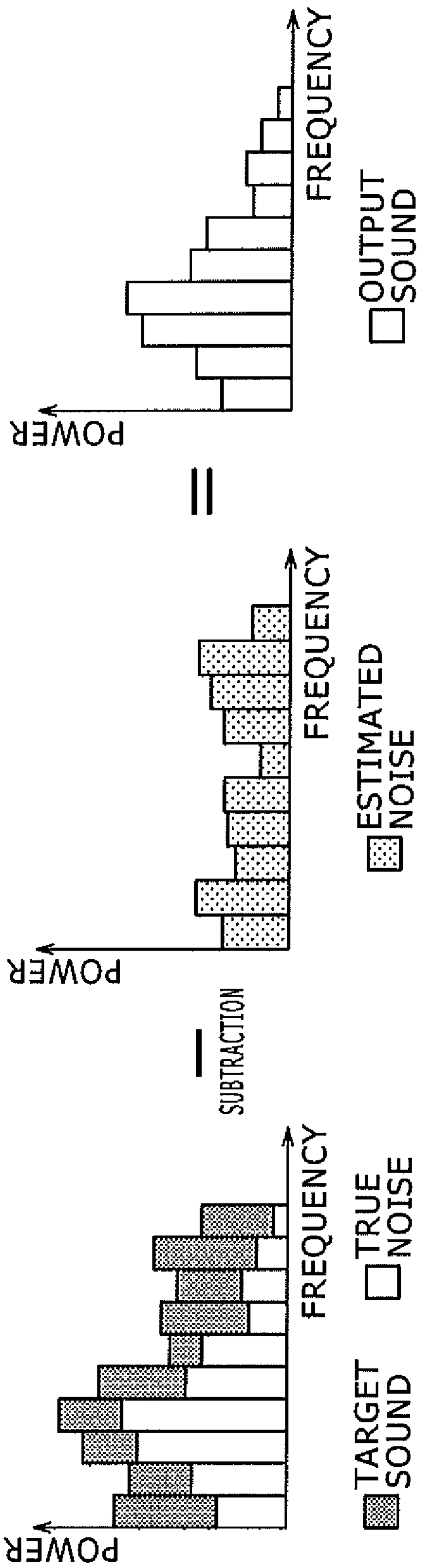
FIG. 39 is a diagram illustrating the spectral subtraction method in the case where a correct result is obtained.
Figure 40:
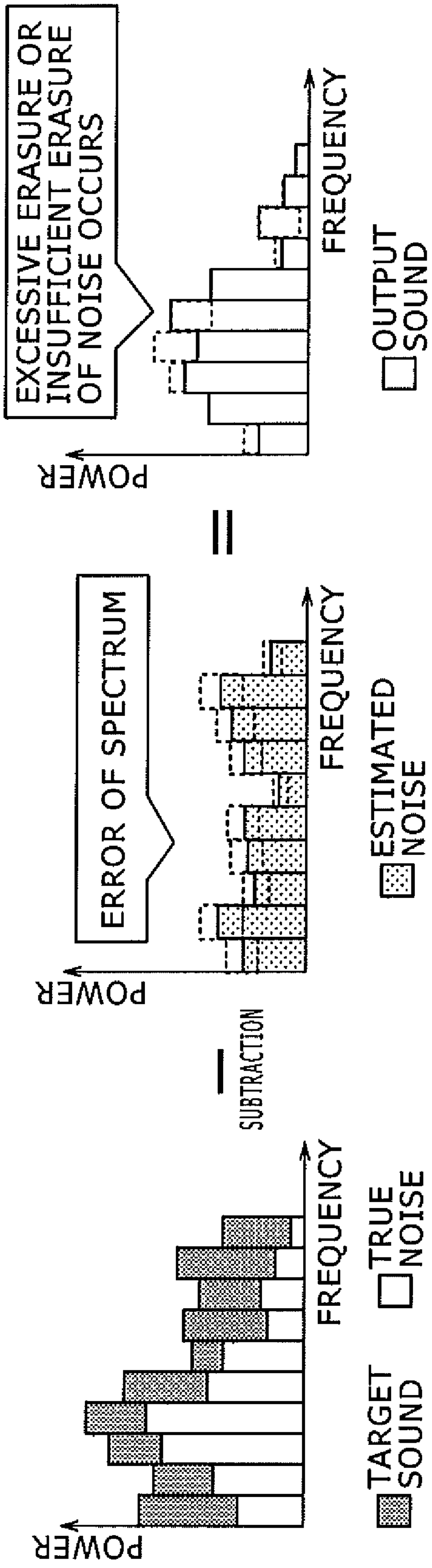
FIG. 40 is a similar view but illustrating the spectral subtraction method in the case where an erroneous result is obtained.
Figure 41:
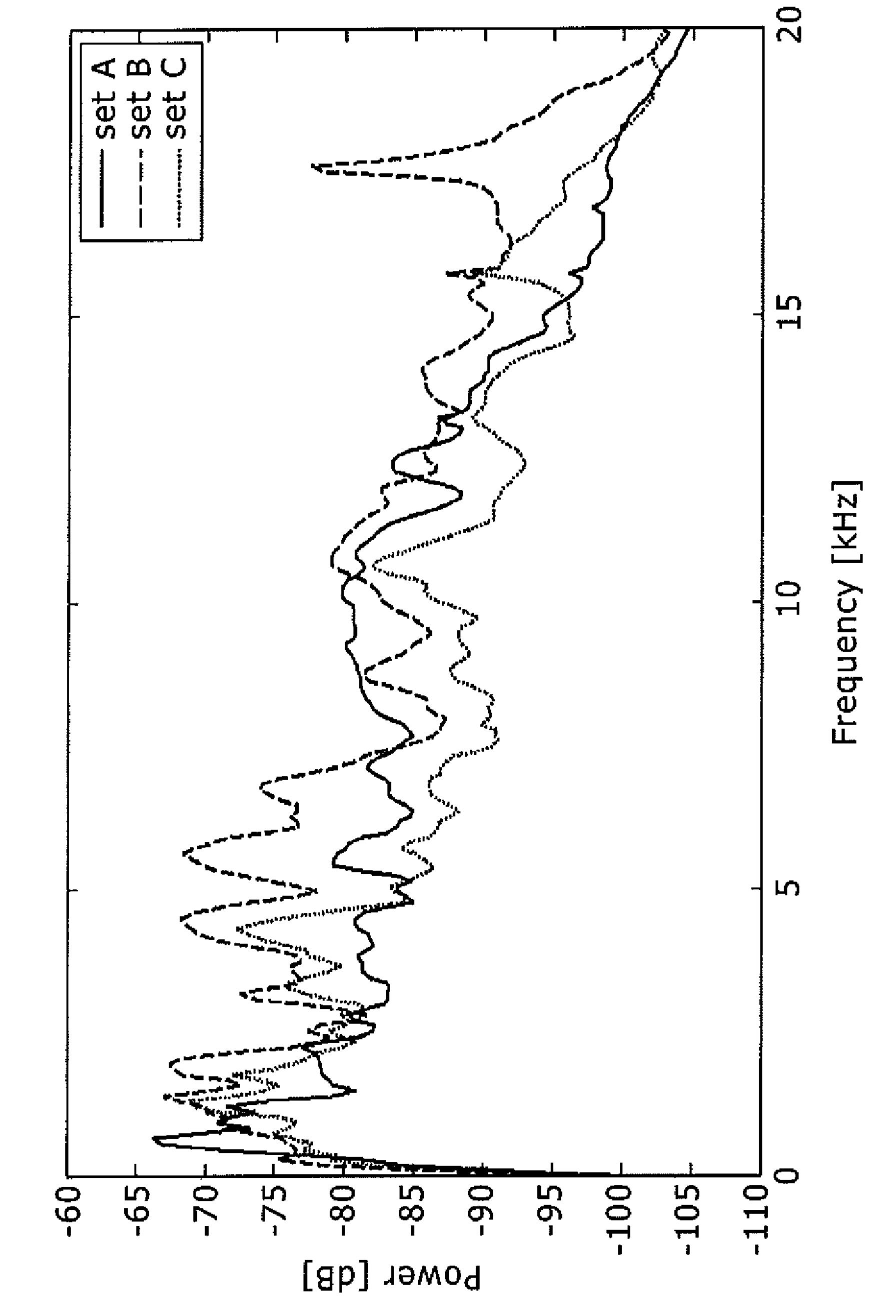
FIG. 41 is a diagram illustrating frequency spectra of zooming noise or mechanical noise actually recorded by three imaging apparatuses having a video shooting function with sound.

Further, the sound system 100A described hereinabove with reference to FIG. 11 includes the mechanical noise reduction section 106 which corrects a frequency spectrum X(f, τ) with a gain read out from the gain function table 121. However, a similar configuration can be applied also with some other sound system which utilizes frequency spectrum information of mechanical noise collected and recorded in advance to suppress mechanical noise like, for example, a sound system which uses the spectrum subtraction method to suppress mechanical noise (refer to FIG. 37).

For example, frequency spectrum information of mechanical noise to be supplied to the subtract section may be corrected by and supplied from a correction section similar to the noise table correction section 112 of the sound system 100A shown in FIG. 11. By the configuration just described, a similar effect to that by the sound system 100A shown in FIG. 11 can be achieved. In particular, excessive suppression of suppressing also mechanical noise which is not actually perceived can be prevented from being carried out, and degradation of desired sound by excessive suppression can be prevented. In other words, mechanical noise can be reduced while degradation of desired sound of the user is suppressed to the utmost in response to a surrounding environment.

Also the sound system 100B described hereinabove with reference to FIG. 33 includes the mechanical noise reduction section 106 which corrects the frequency spectrum X(f, τ) with a gain read out from the gain function table 121. However, a similar configuration can be applied also with some other sound system which utilizes frequency spectrum information of mechanical noise collected and recorded in advance to suppress mechanical noise like, for example, a sound system which uses the spectrum subtraction method to suppress mechanical noise (refer to FIG. 37).

For example, corrected frequency spectrum information of mechanical noise may be supplied to the subtract section from a changeover section similar to the noise table changeover section 113 of the sound system 100B shown in FIG. 33. By the configuration just described, a similar effect to that by the sound system 100B shown in FIG. 33 can be achieved. In particular, excessive suppression of suppressing also mechanical noise which is not actually perceived can be prevented from being carried out, and degradation of desired sound by excessive suppression can be prevented. In other words, mechanical noise can be reduced while degradation of desired sound of the user is suppressed to the utmost in response to a surrounding environment.

Further, in the embodiments described above, the mechanical noise to be suppressed is driving noise of the motor 203 or zooming noise. However, naturally the mechanical noise to be suppressed is not limited to this. For example, driving noise of a focusing motor, driving noise of motors for panning and tiling and so forth may be suppressed.

Figure 36:
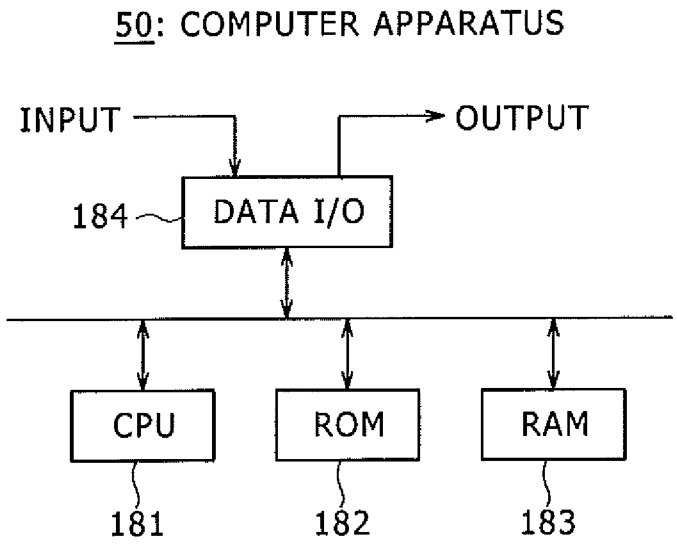
FIG. 36 is a block diagram illustrating an example of a configuration of a computer apparatus which carries out a noise suppression process by software.

Further, the functioning configuration for mechanical noise suppression in the embodiments described hereinabove may be configured by hardware or similar processing may be carried out by software. FIG. 36 shows an example of a configuration of a computer apparatus 50 which carries out the processing described above by software. Referring to FIG. 36, the computer apparatus 50 shown includes a CPU (Central Processing Unit) 181, a ROM (Read-Only Memory) 182, a RAM (Random Access Memory) 183 and a data inputting and outputting section (data I/O) 184.

The ROM 182 stores therein a processing program of the CPU 181 and necessary data such as frequency spectrum information of mechanical noise collected and recorded in advance. The RAM 183 functions as a working area of the CPU 181. The CPU 181 reads out the processing program stored in the ROM 182 as occasion demands, and the read out processing program is transferred to and developed in the RAM 183. Then, the CPU 181 reads out the developed processing program to execute a mechanical noise suppression process.

In the computer apparatus 50, an input sound signal, that is, an output signal of a microphone, is inputted through the data I/O 184 and accumulated into the RAM 183. A mechanical noise suppression process similar to that in the embodiments described hereinabove is carried out for the input sound signal accumulated in the RAM 183 by the CPU 181. Then, an output sound signal in which mechanical noise is suppressed as a result of the processing is outputted to the outside through the data I/O 184.

The present disclosure can be applied to an imaging apparatus having a mechanical noise generating source which generates mechanical noise in relation to a particular imaging operation such as, for example, a digital camera with a video shooting function with noise.

While preferred embodiments of the present disclosure have been described using specific terms, such description is for illustrative purpose only, and it is to be understood that changes and variations may be made without departing from the spirit or scope of the following claims.

What is claimed is:

1. A mechanical noise suppression apparatus, comprising:
one or more processors operable to:
- divide an input signal into frames of a predetermined time length;
- transform the frames into a frequency spectrum of a frequency domain;
- calculate, for each frequency of the frequency spectrum, a power ratio between the frequency spectrum of the frames of the input signal and a frequency spectrum of mechanical noise based on frequency spectrum information of the mechanical noise;
- acquire a correction coefficient based on a linear predictive coefficient representing a spectrum envelope of the frequency spectrum of the input signal;
- multiply the frequency spectrum information of the mechanical noise by the acquired correction coefficient to correct the frequency spectrum information of the mechanical noise to be used;
- determine, for each frequency of the frequency spectrum, a gain corresponding to the calculated power ratio from a gain function table in which set values of the gain corresponding to individual values of the power ratio are stored;

multiply, for each frequency of the frequency spectrum, the frequency spectrum of the frames of the input signal by the gain to obtain a corrected frequency spectrum;

convert the corrected frequency spectrum of the frames into frames of a time domain; and perform frame synthesis of the frames to obtain an output signal in which the mechanical noise is suppressed.

2. The mechanical noise suppression apparatus according to claim 1, wherein each of the set values of the gain stored in said gain function table is low when the power ratio is in the proximity of 0 dB and smoothly increases as the power ratio increases from the proximity of 0 dB such that a gradient thereof does not become discontinuous.

3. The mechanical noise suppression apparatus according to claim 2, wherein each of the set values of the gain stored in said gain function table smoothly increases as the power ratio decreases from the proximity of 0 dB such that the gradient thereof does not become discontinuous.

4. The mechanical noise suppression apparatus according to claim 1, wherein the mechanical noise appears in relation to a specific imaging operation of an imaging apparatus which has a peripheral sound recording function.

5. A mechanical noise suppression method, comprising:

dividing an input signal into frames of a predetermined time length;

transforming the frames into a frequency spectrum of a frequency domain;

calculating, for each frequency of the frequency spectrum, a power ratio between the frequency spectrum of the frames of the input signal and a frequency spectrum of the mechanical noise based on frequency spectrum information of the mechanical noise, wherein the frequency spectrum information of the mechanical noise is corrected by acquiring a correction coefficient based on a linear predictive coefficient representing a spectrum envelope of the frequency spectrum of the input signal, and multiplying the frequency spectrum information of the mechanical noise by the acquired correction coefficient;

determining, for each frequency of the frequency spectrum, a gain corresponding to the calculated power ratio from a gain function table in which set values of the gain corresponding to individual values of the power ratio are stored;

multiplying, for each frequency of the frequency spectrum, the frequency spectrum of the frames of the input signal by the gain to obtain a corrected frequency spectrum;

converting the corrected frequency spectrum of the frames into frames of a time domain; and performing frame synthesis of the frames to obtain an output signal in which the mechanical noise is suppressed.

6. A non-transitory computer-readable storage medium having stored thereon, a computer program having at least one code section, the at least one code section being executable by one or more processors for causing a computer to perform the steps comprising:

dividing an input signal into frames of a predetermined time length;

transforming the frames into a frequency spectrum of a frequency domain;

calculating, for each frequency of the frequency spectrum, a power ratio between the frequency spectrum of the frames of the input signal and a frequency spectrum of mechanical noise based on frequency spectrum information of the mechanical noise, wherein the frequency spectrum information of the mechanical noise is corrected by acquiring a correction coefficient based on a linear predictive coefficient representing a spectrum envelope of the frequency spectrum of the input signal, and multiplying the frequency spectrum information of the mechanical noise by the acquired correction coefficient;

determining, for each frequency of the frequency spectrum, a gain corresponding to the calculated power ratio from a gain function table in which set values of the gain corresponding to individual values of the power ratio are stored;

multiplying, for each frequency of the frequency spectrum, the frequency spectrum of the frames by the gain to obtain a corrected frequency spectrum;

converting the corrected frequency spectrum of the frames into frames of a time domain; and performing frame synthesis of the frames to obtain an output signal in which the mechanical noise is suppressed.

7. An imaging apparatus having a peripheral sound recording function, the imaging apparatus comprising:

one or more processors operable to:

divide an input signal of peripheral sound obtained from a microphone into frames of a predetermined time length;

transform the frames into a frequency spectrum of a frequency domain;

calculate, for each frequency of the frequency spectrum, a power ratio between the frequency spectrum of the frames of the input signal and a frequency spectrum of mechanical noise based on frequency spectrum information of the mechanical noise, wherein the frequency spectrum information of the mechanical noise is corrected by acquiring a correction coefficient based on a linear predictive coefficient representing a spectrum envelope of the frequency spectrum of the input signal, and multiplying the frequency spectrum information of the mechanical noise by the acquired correction coefficient;

determine, for each frequency of the frequency spectrum, a gain corresponding to the calculated power ratio from a gain function table in which set values of the gain corresponding to individual values of the power ratio are stored;

multiply, for each frequency of the frequency spectrum, the frequency spectrum of the frames by the gain to obtain a corrected frequency spectrum;

convert the corrected frequency spectrum of the frames into frames of a time domain;

perform frame synthesis of the frames to obtain an output signal in which the mechanical noise is suppressed; and record the output signal.

8. A mechanical noise suppression apparatus, comprising:

a framing section adapted to divide an input signal into frames of a predetermined time length;

a Fourier transform section adapted to transform framed signals into a frequency spectrum of a frequency domain;

a mechanical noise reduction section adapted to correct the frequency spectrum of the input signal based on frequency spectrum information of mechanical noise to suppress the mechanical noise;

a spectrum information changing section adapted to change the frequency spectrum information of the mechanical noise to be used by said mechanical noise reduction section based on information regarding the input signal, wherein the spectrum information changing section corrects the frequency spectrum information of the mechanical noise stored in a noise table based on information regarding the input signal to change the frequency spectrum information of the mechanical noise to be used by the mechanical noise reduction section, wherein the spectrum information changing section calculates a parameter representative of a characteristic amount of peripheral sound based on the information regarding the input signal, acquires a correction coefficient based on the calculated parameter, and multiplies the frequency spectrum information of the mechanical noise stored in the noise table by the acquired correction coefficient to correct the frequency spectrum information of the mechanical noise, and wherein the parameter representative of the characteristic amount is a linear predictive coefficient representative of a spectrum envelope of the frequency spectrum of the input signal, and wherein the spectrum information changing section acquires, based on the linear predictive coefficient representative of the spectrum envelope, a correction coefficient for each frequency such that the value thereof decreases in a corresponding relationship to a mountain portion of the spectrum envelope and multiplies, for each frequency of the frequency spectrum, the frequency spectrum information of the mechanical noise by the acquired correction coefficient to correct the frequency spectrum information of the mechanical noise;

an inverse Fourier transform section adapted to return the frequency spectrum corrected by said mechanical noise reduction section into framed signals of a time domain; and a frame synthesis section adapted to perform frame synthesis of the framed signals of frames obtained by said inverse Fourier transform section to obtain an output signal in which the mechanical noise is suppressed.

9. The mechanical noise suppression apparatus according to claim 8, wherein the characteristic amount parameter is an average power of the input signal, and the one or more processors acquire, based on the average power of the input signal, a correction coefficient common to different frequencies such that the value thereof is low when the average power is high and multiplies the frequency spectrum information of the mechanical noise for each frequency by the acquired correction coefficient to correct the frequency spectrum information of the mechanical noise.

10. The mechanical noise suppression apparatus according to claim 8, further comprising a plurality of noise tables which store the frequency spectrum information of the mechanical noise which is used in a case in which the average power of the input signal is different from each other, and wherein said spectrum information changing section changes over the noise table from which the frequency spectrum information of the mechanical noise is to be read out over based on the average power of the input signal to change the frequency spectrum information of the mechanical noise to be used by said mechanical sound reduction section.

11. The mechanical noise suppression apparatus according to claim 8, wherein the mechanical noise is generated in relation to a specific imaging operation in an imaging apparatus which has a peripheral sound recording function.

12. A mechanical noise suppression method, comprising:

dividing an input signal into frames of a predetermined time length;

transforming the frames into a frequency spectrum of a frequency domain;

correcting the frequency spectrum of the frames of the input signal based on frequency spectrum information of mechanical noise to suppress the mechanical noise, wherein the frequency spectrum information of the mechanical noise to be used is corrected by:

calculating a parameter representative of a characteristic amount of peripheral sound based on information regarding the input signal, wherein the parameter representative of the characteristic amount is a linear predictive coefficient representing a spectrum envelope of the frequency spectrum of the input signal;

acquiring a correction coefficient for each frequency based on the linear predictive coefficient representing the spectrum envelope of the frequency spectrum of the input signal such that a value thereof decreases in a corresponding relationship to a peak curve portion of the spectrum envelope; and multiplying, for each frequency of the frequency spectrum, the frequency spectrum information of the mechanical noise by the acquired correction coefficient to correct the frequency spectrum information of the mechanical noise;

converting the corrected frequency spectrum of the frames into frames of a time domain; and performing frame synthesis of the frames to obtain an output signal in which the mechanical noise is suppressed.

13. A non-transitory computer-readable storage medium having stored thereon, a computer program having at least one code section, the at least one code section being executable by one or more processors for causing a computer to perform the steps comprising:

dividing an input signal into frames of a predetermined time length;

transforming the frames into a frequency spectrum of a frequency domain;

correcting the frequency spectrum of the frames of the input signal based on frequency spectrum information of mechanical noise to suppress the mechanical noise, wherein the frequency spectrum information of the mechanical noise to be used is corrected by:

calculating a parameter representative of a characteristic amount of peripheral sound based on information regarding the input signal, wherein the parameter representative of the characteristic amount is a linear predictive coefficient representing a spectrum envelope of the frequency spectrum of the input signal;

acquiring a correction coefficient for each frequency based on the linear predictive coefficient representing the spectrum envelope of the frequency spectrum of the input signal such that a value thereof decreases in a corresponding relationship to a mountain portion of the spectrum envelope; and multiplying, for each frequency of the frequency spectrum, the frequency spectrum information of the mechanical noise by the acquired correction coefficient to correct the frequency spectrum information of the mechanical noise;

converting the corrected frequency spectrum of the frames into frames of a time domain; and performing frame synthesis of the frames to obtain an output signal in which the mechanical noise is suppressed.

14. An imaging apparatus having a peripheral sound recording function, the imaging apparatus comprising:

one or more processors operable to:

divide an input signal of peripheral sound obtained by sound collection by a microphone into frames of a predetermined time length;

transform the frames into a frequency spectrum of a frequency domain;

correct the frequency spectrum of the frames of the input signal based on frequency spectrum information of mechanical noise to suppress the mechanical noise, wherein the frequency spectrum information of the mechanical noise to be used is corrected by:

calculating a parameter representative of a characteristic amount of peripheral sound based on information regarding the input signal, wherein the parameter representative of the characteristic amount is a linear predictive coefficient representing a spectrum envelope of the frequency spectrum of the input signal;

acquiring a correction coefficient for each frequency based on the linear predictive coefficient representing the spectrum envelope of the frequency spectrum of the input signal such that a value thereof decreases in a corresponding relationship to a peak curve portion of the spectrum envelope; and multiplying, for each frequency of the frequency spectrum, the frequency spectrum information of the mechanical noise by the acquired correction coefficient to correct the frequency spectrum information of the mechanical noise;

convert the corrected frequency spectrum of the frames into frames of a time domain;

perform frame synthesis of the frames to obtain an output signal in which the mechanical noise is suppressed; and record the output signal.

15. The mechanical noise suppression method according to claim 12, wherein the frequency spectrum information of the mechanical noise to be used is corrected based on power of the input signal.

16. The mechanical noise suppression apparatus according to claim 1, wherein the one or more processors are operable to selectively output one of: the frequency spectrum of the frames of the input signal or the corrected frequency spectrum before conversion into time domain.

17. The mechanical noise suppression apparatus according to claim 1, wherein the one or more processors are operable to store the frequency spectrum information of the mechanical noise corresponding to zooming operation in a plurality of directions.

18. The mechanical noise suppression apparatus according to claim 1, wherein the one or more processors are operable to calculate the correction coefficient by:

calculating an average spectrum for a predetermined time based on the frequency spectrum of the input signal;

calculating an average spectrum envelope from the average spectrum; and calculating the correction coefficient from the average spectrum envelope.

* * * * *